United States Patent
Itou

(10) Patent No.: US 9,436,520 B2
(45) Date of Patent: Sep. 6, 2016

(54) INFORMATION PROCESSING DEVICE AND BARRIER SYNCHRONIZATION METHOD

(71) Applicant: FUJITSU LIMITED, Kawasaki-shi, Kanagawa (JP)

(72) Inventor: Shigeki Itou, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 423 days.

(21) Appl. No.: 13/937,258

(22) Filed: Jul. 9, 2013

(65) Prior Publication Data

US 2014/0026138 A1 Jan. 23, 2014

(30) Foreign Application Priority Data

Jul. 20, 2012 (JP) ................................. 2012-161392

(51) Int. Cl.
*G06F 9/52* (2006.01)
*G06F 9/38* (2006.01)

(52) U.S. Cl.
CPC ................. *G06F 9/522* (2013.01); *G06F 9/52* (2013.01); *G06F 9/38* (2013.01)

(58) Field of Classification Search
None
See application file for complete search history.

(56) References Cited

U.S. PATENT DOCUMENTS

| | | |
|---|---|---|
| 2002/0121555 A1 | 9/2002 | Cipolla et al. |
| 2006/0212868 A1 | 9/2006 | Takayama et al. |
| 2010/0095090 A1 | 4/2010 | Unno et al. |
| 2011/0078417 A1* | 3/2011 | Fahs .................. G06F 9/30145 712/216 |
| 2012/0179896 A1 | 7/2012 | Salapura et al. |

FOREIGN PATENT DOCUMENTS

| | | |
|---|---|---|
| JP | 2001-51966 | 2/2001 |
| JP | 2004-529414 | 9/2004 |
| JP | 2006-259821 | 9/2006 |
| WO | WO 02/069095 A2 | 9/2002 |
| WO | 2008/155806 A1 | 12/2008 |
| WO | 2010/109761 A1 | 9/2010 |

OTHER PUBLICATIONS

Yamada, Kaito et al., "An Evaluation of Barrier Synchronization Mechanism Considering Hierarchical Processor Grouping", Technical Report of IEICE, The Institute of Electronics, Information and Communication Engineers, vol. 108, No. 28, ICD2008-20, pp. 1-6 (May 2008), English Abstract.

(Continued)

*Primary Examiner* — Qing Wu
(74) *Attorney, Agent, or Firm* — Fujitsu Patent Center

(57) ABSTRACT

An information processing device includes a plurality of barrier banks, and one or more processors including at least one of the plurality of barrier banks. Each of barrier banks includes one or more hardware threads and a barrier synchronization mechanism. The barrier synchronization mechanism includes a bottom unit having a barrier state, and a bitmap indicating that each of the one or more hardware threads has arrived at a synchronization point, and a top unit having a non-arrival counter indicating the number of barrier banks yet to be synchronized. The bottom unit notifies of bottom unit synchronization completion when all the one or more hardware threads have arrived at a barrier synchronization point. The non-arrival counter decrements its value by 1 upon receipt of the bottom unit synchronization completion, and the top unit sets the barrier state to a value indicating synchronization completion when the non-arrival counter decrements to 0.

2 Claims, 52 Drawing Sheets

(56) References Cited

OTHER PUBLICATIONS

Yamada, Kaito et al., "An Evaluation of Barrier Synchronization Mechanism Considering Hierarchical Processor Grouping", Technical Report of IEICE, The Institute of Electronics, Information and Communication Engineers, vol. 108, No. 28, ICD2008-20, pp. 1-6 (May 2008), Partial English Translation.

Japanese Office Action mailed Nov. 10, 2015 for corresponding Japanese Patent Application No. 2012-161392, with Partial English Translation, 7 pages.
US Supplemental Notice of Allowance issued on Feb. 16, 2016 in related U.S. Appl. No. 14/926,597, 6 pages.
US Corrected Notice of Allowance issued on Apr. 12, 2016 in related U.S. Appl. No. 14/926,597, 6 pages.
US Notice of Allowance issued on Feb. 5, 2016 in related U.S. Appl. No. 14/926,597, 8 pages.

* cited by examiner

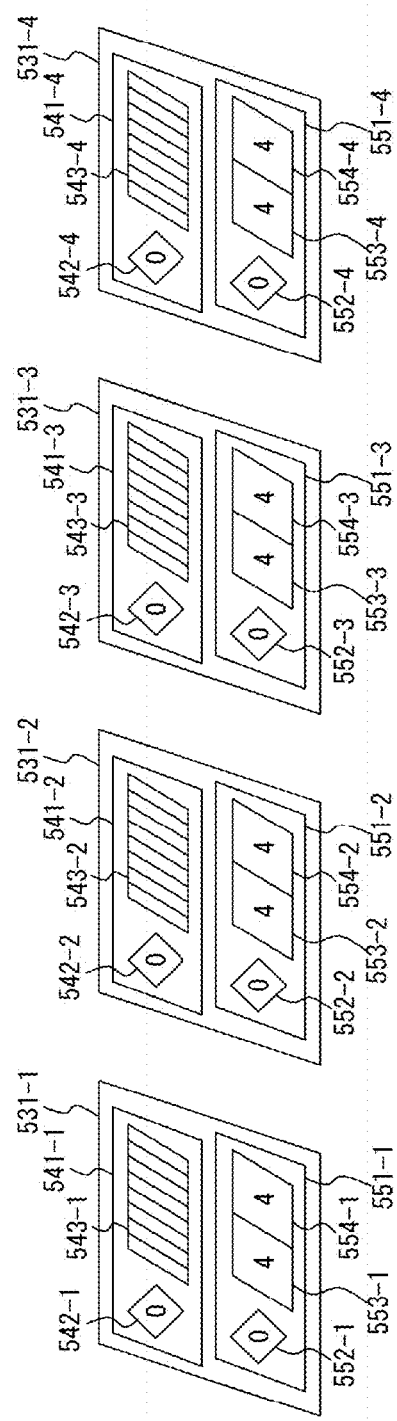
F I G. 4 A

```
                        BINARY NOTATION
         TARGET_ID   0000_0100
         TARGET_MASK 0000_1011
                     │ CALCULATING ALL
                     │ COMBINATIONS OF
                     │ PORTIONS OF
                     │ TARGET_MASK 1 PORTION
                     ↓ AND TARGET_ID
                       0000_0100
                       0000_0101
                       0000_0110
                       0000_0111
                       0000_1100
                       0000_1101
                       0000_1110
                       0000_1111
```

SETTING SYNCID AS ADDITIONAL CONDITION
IF DESTINATION IS SPECIFIED ONLY WITH ID AND MASK, THEY ARE APPLIED ONLY TO LIMITED RANGE CORRESPONDING TO 2^n NODES. ARBITRARY RANGE CAN BE SPECIFIED BY COMBINING WITH SYNCID.

F I G. 7 B

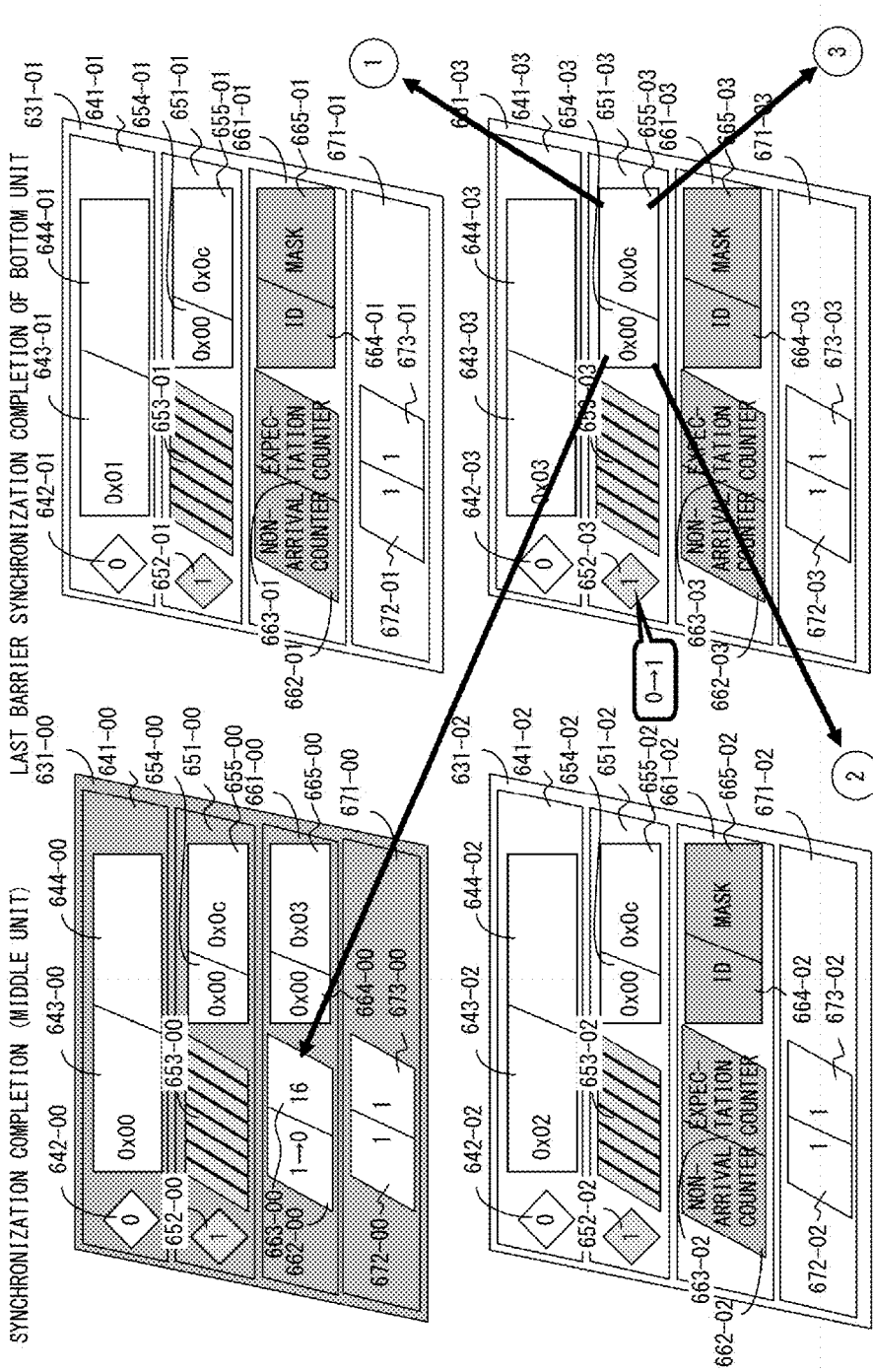

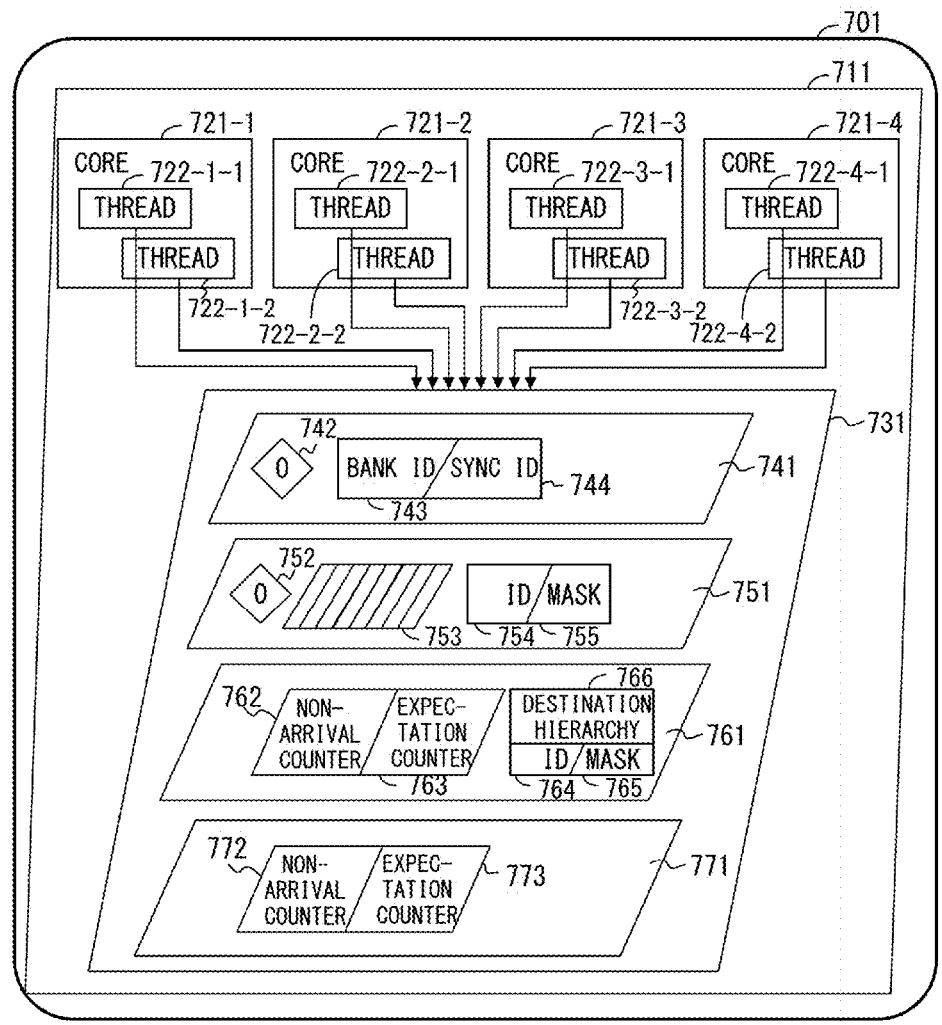
F I G. 13

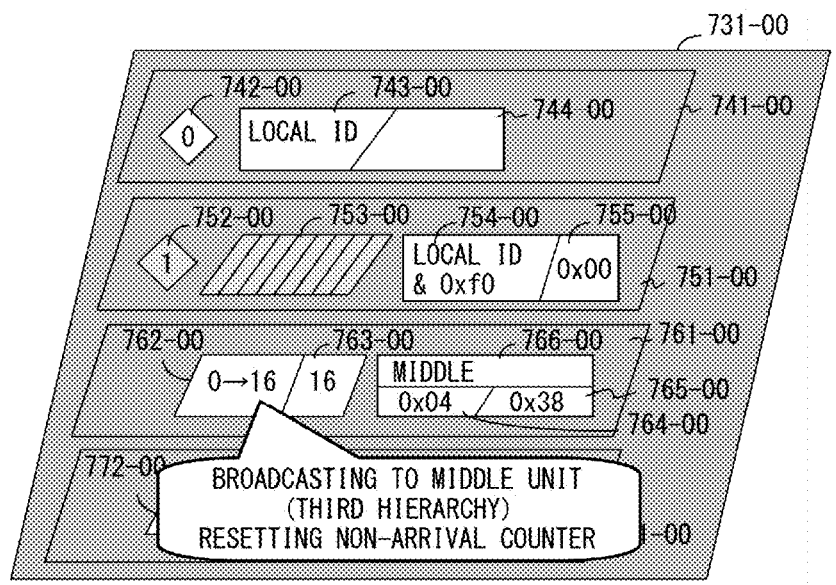
F I G. 1 6 B

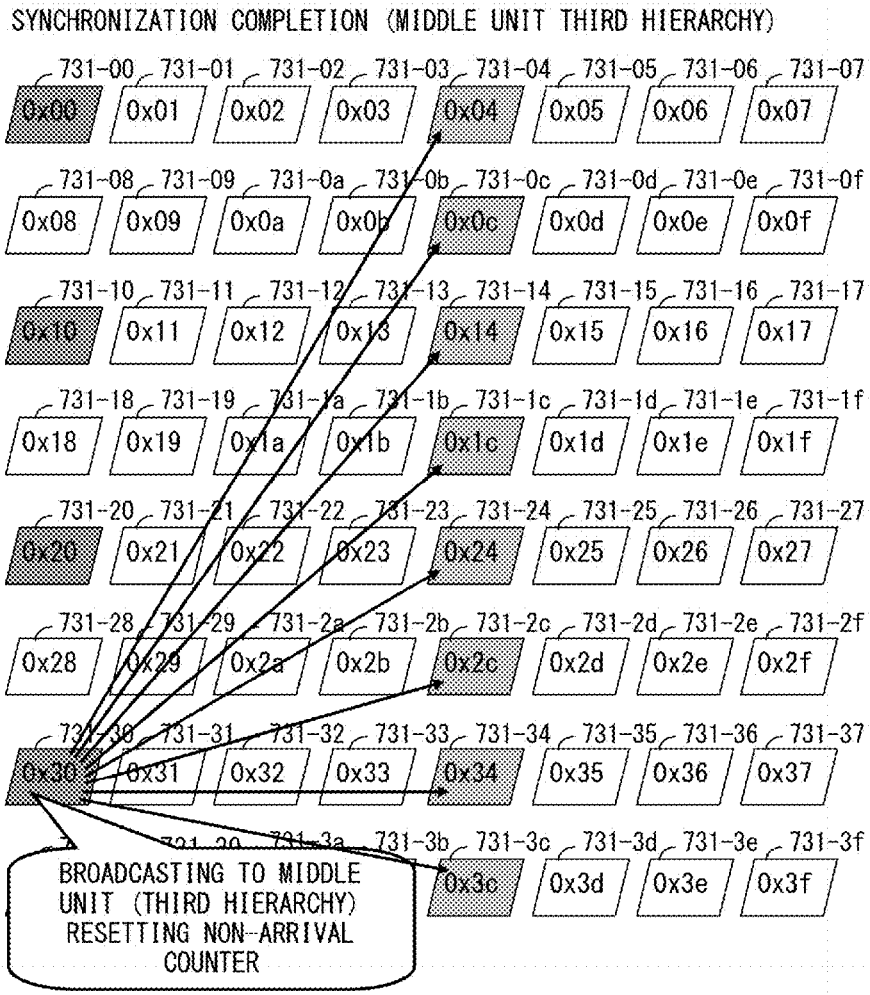
F I G. 1 7 A

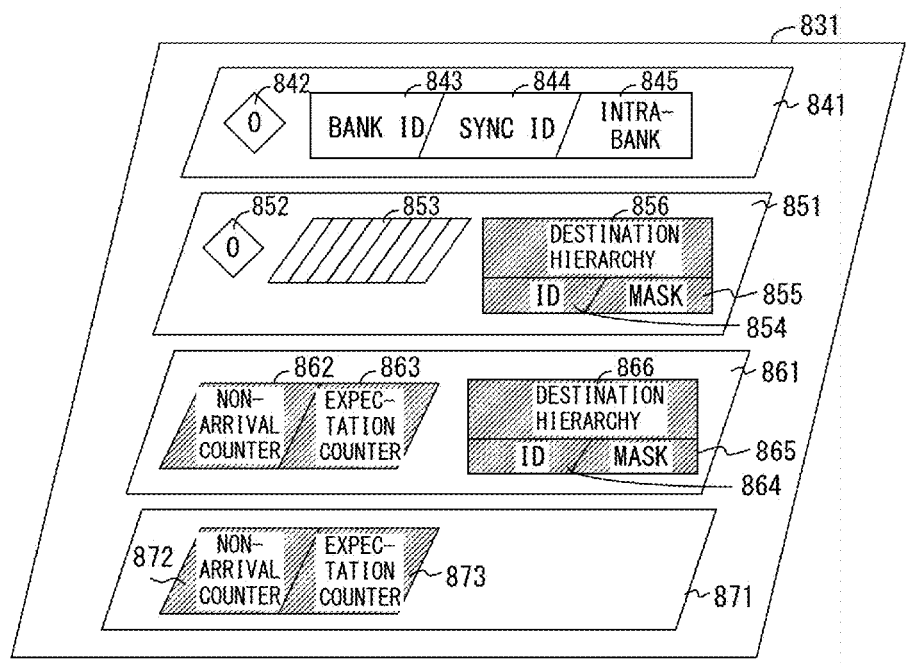
F I G. 21A

INFORMATION PROCESSING DEVICE AND BARRIER SYNCHRONIZATION METHOD

CROSS-REFERENCE TO RELATED APPLICATION

This application is based upon and claims the benefit of priority of the prior Japanese Patent Application No. 2012-161392, filed on Jul. 20, 2012, the entire contents of which are incorporated herein by reference.

FIELD

The embodiments discussed herein are related to an information processing device and a barrier synchronization method.

BACKGROUND

Currently, parallel processing is executed for high performance computing.

"Parallel processing" in computers is for making one task run in a plurality of processor cores. This is a technique for improving a processing efficiency by using the fact that a task for solving a problem can in most cases be divided into smaller tasks.

To execute parallel processing for one task, "synchronization" for making processes of processor cores wait for one another is requested. A barrier in parallel processing is one synchronization method, by which execution of a thread or a process is suspended at a particular point in a source code in order to wait for other threads or processes, and the execution is resumed when all the other threads have arrived at a barrier.

FIGS. 1A to 1C illustrate conventional synchronization within a barrier bank.

FIG. 1A illustrates an initial state, FIG. 1B illustrates the synchronization being performed, and FIG. 1C illustrates completion of the synchronization.

In the barrier bank 1001, which is a minimum range of barrier synchronization, processor cores 1002-$a$ ($a$=1 to 4) and a barrier synchronization mechanism 1003 are provided. The barrier bank 1001 is provided within a central processing unit (CPU).

Each of the processor cores 1002-$a$ has a simultaneous multi-threading function, and has hardware threads 1004-$a$-$b$ ($b$=1, 2) for executing a thread.

In FIG. 1, one processor core provides two hardware threads. Software (such as an operating system (OS)) that issues a software thread handles each of the hardware threads 1004-$a$-$b$ as a logical CPU (virtual CPU).

The barrier synchronization mechanism 1003 has a barrier state 1005 and a bitmap group 1006.

The barrier state 1005 is information used to control the barrier synchronization. A value of the barrier state 1005 is "0" or "1".

The bitmap group 1006 includes a plurality of bitmaps. Each of the bitmaps is information indicating that the hardware thread 1004 has arrived at a barrier synchronization point. The same number of bitmaps are prepared as the number of hardware threads 1004 within the barrier bank 1001, and they are respectively allocated to the hardware threads 1004. Namely, each of the bitmaps indicates that an allocated hardware thread 1004 has arrived at a barrier synchronization point. A value of each of the bitmaps is "0" or "1".

In the initial state illustrated in FIG. 1A, the barrier state 1005 and all the bitmaps are "0".

Assume that each of the hardware threads 1004 executes a thread and the hardware threads 1004-1-1, 1004-3-1 and 1004-4-2 have arrived at a barrier synchronization point in FIG. 1B.

The hardware threads 1004-1-1, 1004-3-1 and 1004-4-2 read the barrier state 1005, and respectively write a value obtained by inverting the read value to the respectively allocated bitmaps. Here, the hardware threads 1004-1-1, 1004-3-1 and 1004-4-2 respectively write "1" to the bitmaps respectively allocated to the local hardware threads.

Hereinafter, the hardware threads 1004-1-2, 1004-2-1, 1004-2-2, 1004-3-2 and 1004-4-1 arrive at the barrier synchronization point, and respectively write "1" to the bitmaps allocated to the local hardware threads.

In FIG. 1C, the barrier synchronization mechanism 1003 changes the barrier state 1005 to "1" upon detecting that all the bitmaps are written to "1".

Each of the hardware threads 1004 verifies that the barrier state 1005 has become equal to the written value (namely, "1") of the bitmap, and resumes the process up to the next barrier synchronization point.

Conventionally, the barrier synchronization is implemented by an centralized barrier synchronization management mechanism.

The centralized barrier synchronization management mechanism has a problem such that, as the number of threads for which barrier synchronization is performed increases, the degree of complexity of the barrier synchronization management mechanism grows, the degree of realization of the mechanism decreases, and the number of threads—requested to be simultaneously processed grows, leading to a longer processing time.

[Patent Document 1] Japanese Laid-open Patent Publication No. 2006-259821

[Patent Document 2] Japanese National Publication of International Patent Application No. 2004-529414

[Non-patent Document 1] "Evaluation of Barrier Synchronization Mechanism Considering Hierarchical Processor Grouping", Kaito YAMADA, et al., IEICE Technical Report, Vol. 108, No. 28, ICD2008-20, pp. 19-24, May, 2008.

SUMMARY

According to an aspect of the invention, an information processing device includes a plurality of barrier banks, and one or more processors including at least one of the plurality of barrier banks.

Each of the plurality of barrier banks includes one or more hardware threads configured to execute a thread, and a barrier synchronization mechanism configured to perform barrier synchronization of the plurality of barrier banks.

The barrier synchronization mechanisms include a bottom unit having a barrier state indicating whether or not the synchronization is complete and a bitmap indicating that each of the one or more hardware threads has arrived at a synchronization point, and a top unit having a non-arrival counter indicating the number of barrier banks yet to be synchronized among the plurality of barrier banks for which the barrier synchronization is to be performed.

The bottom unit checks the bitmap, and notifies the plurality of barrier banks of a bottom unit synchronization completion when all the one or more hardware threads have arrived at a barrier synchronization point.

The non-arrival counter decrements its value by 1 upon receipt of the bottom unit synchronization completion.

The top unit sets the barrier state to a value indicating the synchronization completion when the non-arrival counter decrements to 0.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4A illustrates synchronization among barrier banks according to the first embodiment.

FIGS. 7A and 7B illustrate the notification of barrier synchronization completion.

FIGS. 10A to 10D illustrates the synchronization among barrier banks according to the second embodiment.

FIG. 13 illustrates a configuration of a CPU according to a third embodiment.

FIGS. 16A and 16B illustrate the synchronization among barrier banks according to the third embodiment.

FIGS. 17A and 17B illustrate the synchronization among barrier banks according to the third embodiment.

FIG. 21A illustrates a first setting example of a barrier synchronization mechanism according to the fourth embodiment.

DESCRIPTION OF EMBODIMENTS

Embodiments are described below with reference to the drawings.

Figure 1A:
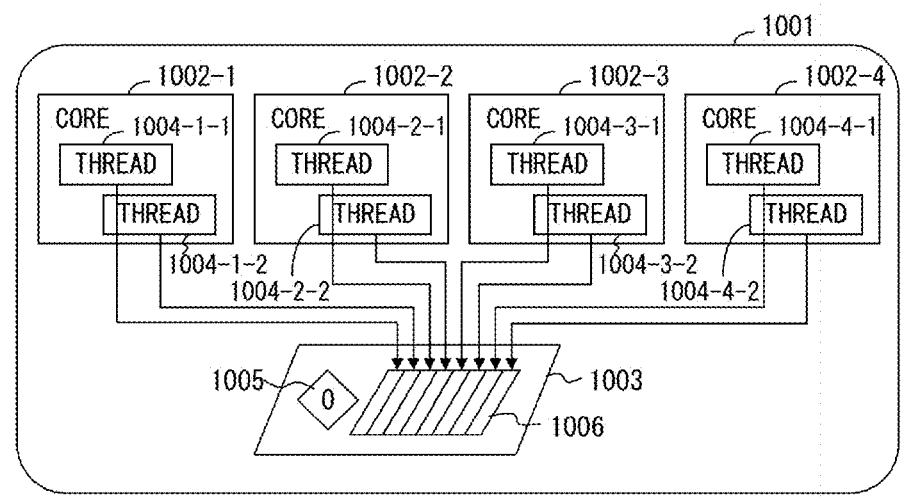
FIG. 1A illustrates conventional synchronization within a barrier bank.
Figure 1B:
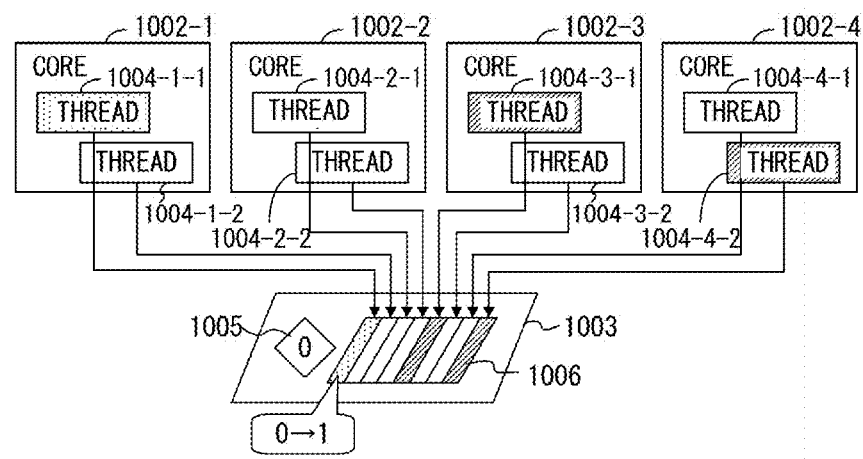
FIG. 1B illustrates the conventional synchronization within the barrier bank.
Figure 1C:
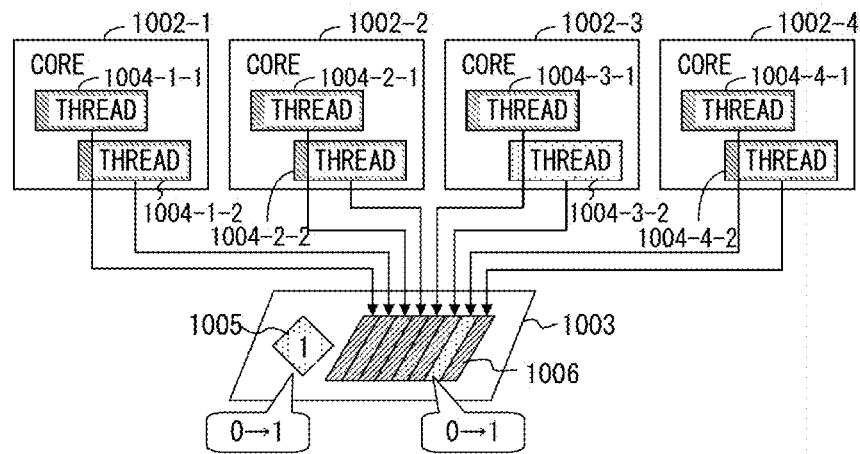
FIG. 1C illustrates the conventional synchronization within the barrier bank.
Figure 2:
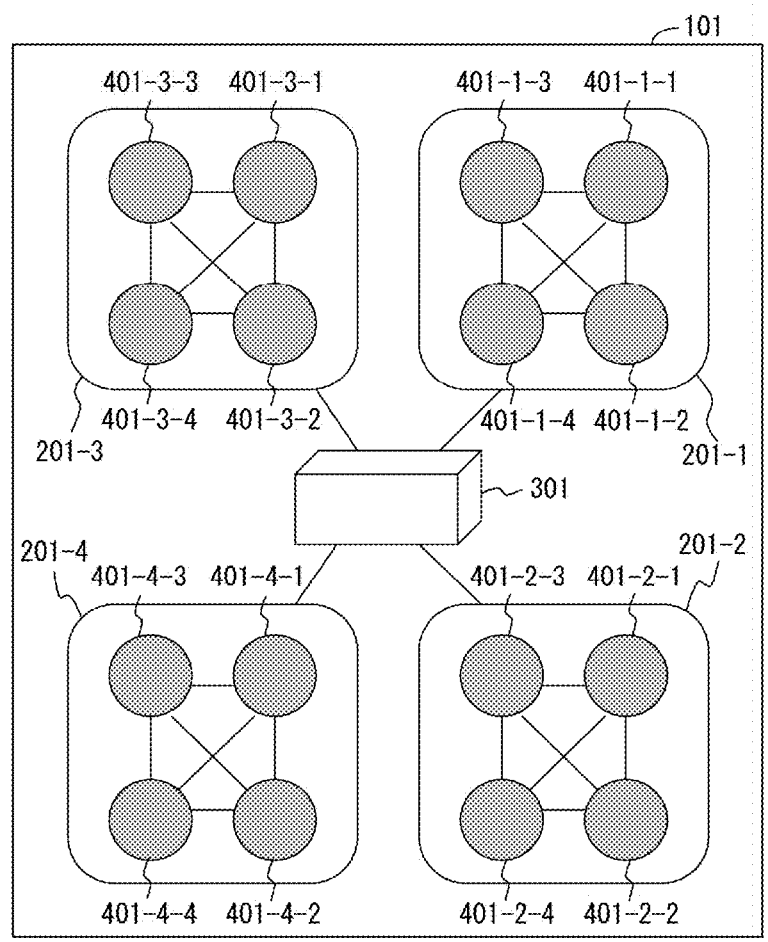
FIG. 2 illustrates a configuration of a server according to an embodiment.

FIG. 2 illustrates a configuration of a server according to an embodiment.

The server 101 includes system boards 201-$i$ ($i$=1 to 4) and a switch 301. The server 101 is one example of an information processing device (computer). A configuration of the server 101 is common in the following embodiments.

The system boards 201-$i$ are interconnected by communication paths via the switch 301.

The system boards 201-$i$ respectively include CPUs 401-$i$-$j$ ($j$=1 to 4).

The CPUs 401-$i$-$j$ included in the same system board 201-$i$ are interconnected by a bus.

Each of the CPUs 401 includes one or more processor cores, each of which has one or more hardware threads.

First Embodiment

A first embodiment refers to synchronization of barrier banks of two hierarchies.

Figure 3:
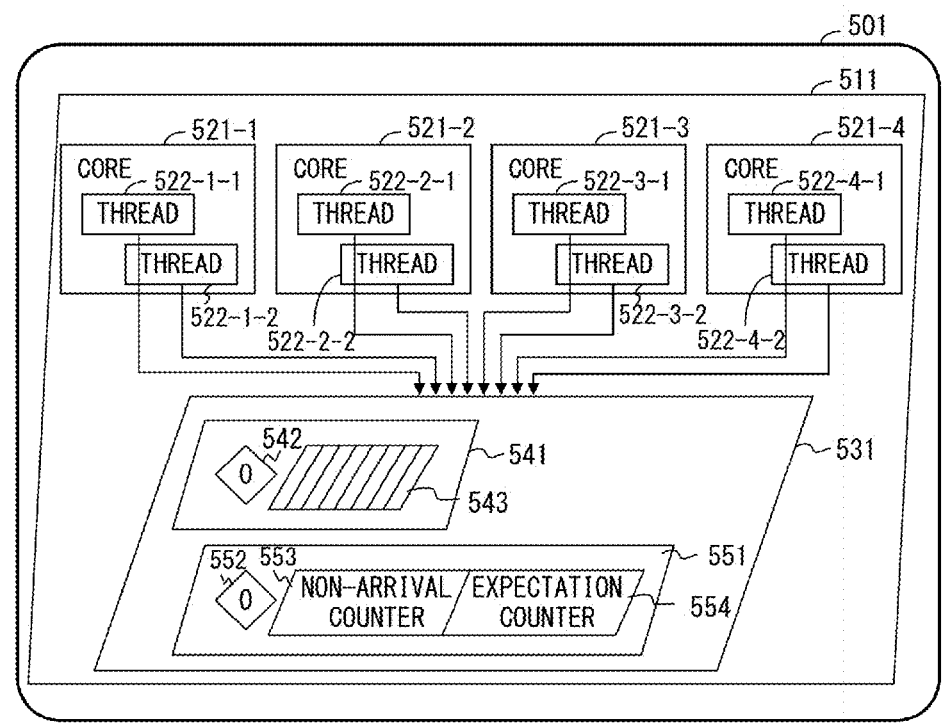
FIG. 3 illustrates a configuration of a CPU according to a first embodiment.

FIG. 3 illustrates a configuration of a CPU according to the first embodiment.

A CPU 501 corresponds to each of the CPUs 401 of FIG. 2.

The CPU 501 includes processor cores 521-$a$ ($a$=1 to 4) and a barrier synchronization mechanism 531. Moreover, the processor cores 521-$a$ and the barrier synchronization mechanism 531 are included in a barrier bank 511, which is a minimum unit of barrier bank synchronization. The processor cores 521-$a$ and the barrier synchronization mechanism 531 are interconnected by a bus.

The processor cores 521-$a$ respectively have a simultaneous multi-threading function, and have hardware threads 522-$a$-$b$ ($b$=1, 2) for executing a thread.

In FIG. 3, one processor core provides two hardware threads. Software (such as an operating system (OS)) that issues a software thread handles each of the hardware threads 522-$a$-$b$ as a logical CPU (virtual CPU).

The hardware threads 522 respectively execute a thread, read a top unit barrier state 552 when a corresponding hardware thread has arrived at a barrier synchronization point, and write a value obtained by inverting the read value to an allocated bitmap.

Moreover, the hardware threads 522 respectively check the top unit barrier state 552 with polling, determine that the synchronization is complete if the top unit barrier state 552 is equal to the value written to the bitmap, and execute the thread up to the next barrier synchronization point.

The barrier synchronization mechanism 531 controls the barrier synchronization, and is implemented, for example, with a hardware circuit and a processor.

The barrier synchronization mechanism 531 includes a bottom unit 541 and a top unit 551.

The bottom unit 541 includes a bottom unit barrier state 542 and a bitmap group 543.

The bottom unit barrier state 542 is information used to control the barrier synchronization. The bottom unit barrier state is "0" or "1".

The bitmap group 543 includes a plurality of bitmaps. Each of the bitmaps is information indicating that a corresponding hardware thread 522 has arrived at a barrier synchronization point. The same number of bitmaps are prepared by as the number of hardware threads 522 within the barrier bank 511, and are respectively allocated to the hardware threads 522. Namely, each of the bitmaps indicates that the allocated hardware thread 522 has arrived at a barrier synchronization point. A value of each of the bitmaps is "0" or "1".

The bottom unit 541 inverts the value of the bottom unit barrier state 542 if values of the all bitmaps of the bitmap group 543 become equal and different from the bottom unit barrier state 542. Namely, the bottom unit barrier state 542 become equal to the values of the bitmaps of the bitmap group 543. The bottom unit 541 transmits (broadcasts) bottom unit barrier synchronization completion to barrier synchronization mechanisms 531 within a specified range.

The top unit 551 includes a top unit barrier state 552, a top unit non-arrival counter 553, and a top unit expectation counter 554.

The top unit barrier state 552 is information used to control the barrier synchronization. The top unit barrier state 552 indicates whether or not synchronization among all barrier banks for which barrier synchronization is to be performed is complete. The top unit barrier state 552 is "0" or "1". In FIG. 3, the top unit barrier state 552 is "0".

The top unit non-arrival counter 553 counts the number of barrier banks that have not been synchronized (namely, all the hardware threads have not arrived at a barrier synchronization point within a barrier) bank among barrier banks to be synchronized, and holds the counted value. The top unit non-arrival counter 553 decrements its value by 1 upon receipt of the bottom unit barrier synchronization completion. The top unit non-arrival counter 553 is reset to the value of the top unit expectation counter 554 if the top unit non-arrival counter 553 decrements to "0".

The top unit expectation counter 554 is information indicating the number of barrier banks to be synchronized and holds its value.

The top unit 551 checks the top unit non-arrival counter 553, and inverts the value of the top unit barrier state 552 upon detecting that the top unit non-arrival counter 553 is "0".

Figure 4B:
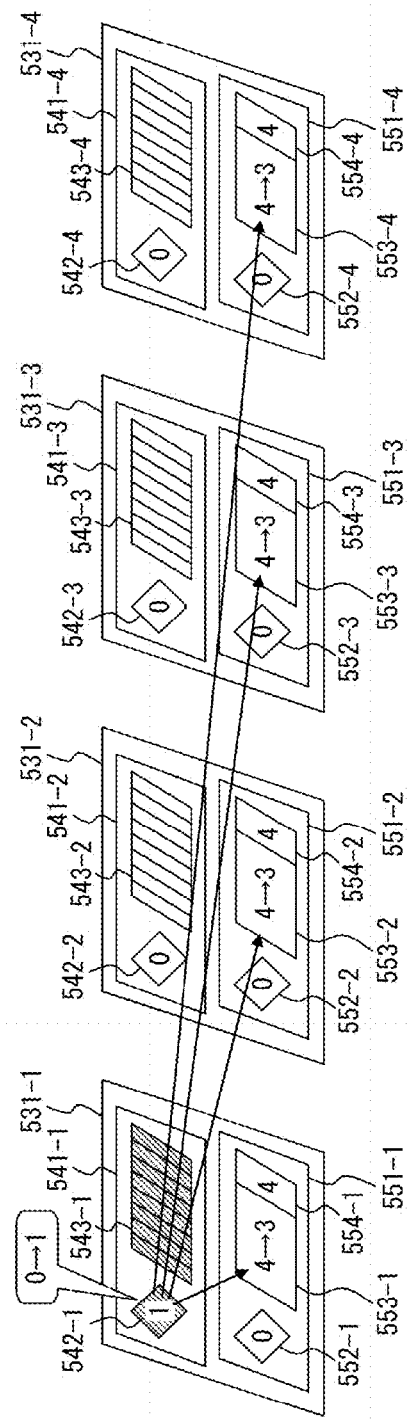
FIG. 4B illustrates the synchronization among barrier banks according to the first embodiment.
Figure 4C:
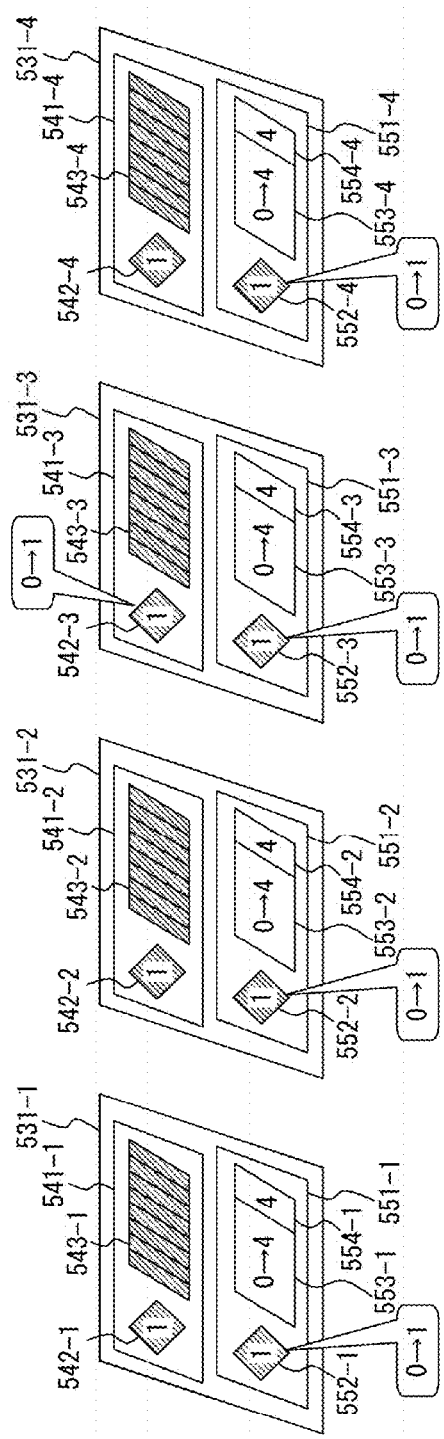
FIG. 4C illustrates the synchronization among barrier banks according to the first embodiment.

FIGS. 4A to 4C illustrate synchronization among barrier banks according to the first embodiment.

FIG. 4A illustrates an initial state, FIG. 4B illustrates synchronization being performed, and FIG. 4C illustrates completion of the synchronization.

FIG. 4 explains a process of synchronization among four barrier banks.

In the first embodiment, barrier synchronization of two hierarchies is performed.

Four barrier synchronization mechanisms 531-$i$ ($i$=1 to 4) of FIG. 4 respectively belong to different barrier banks. Note that the barrier banks may be present within the same CPU or in different CPUs.

Each of the barrier banks of FIG. 4 is similar to the barrier bank 511 of FIG. 3. For simplification of the drawing, FIG. 4 illustrates only the barrier synchronization mechanisms 531-$i$ within the barrier banks, and does not illustrate processor cores.

Each of the barrier synchronization mechanisms 531-$i$ includes a bottom unit 541-$i$ and a top unit 551-$i$.

The bottom unit 541-$i$ includes a bottom unit barrier state 542-$i$ and a bitmap group 543-$i$.

The top unit 551-$i$ includes a top unit barrier state 552-$i$, a top unit non-arrival counter 553-$i$, and a top unit expectation counter 554-$i$.

The barrier synchronization mechanisms 531-$i$, the bottom unit 541-$i$, the top unit 551-$i$, the bottom unit barrier state 542-$i$, the bitmap group 543-$i$, the top unit barrier state 552-$i$, the top unit non-arrival counter 553-$i$, and the top unit expectation counter 554-$i$ illustrated in FIG. 4, respectively correspond to the barrier synchronization mechanism 531, the bottom unit 541, the top unit 551, the bottom unit barrier state 542, the bitmap group 543, the top unit barrier state 552, the top unit non-arrival counter 553 and the top unit expectation counter 554 illustrated in FIG. 3.

In the initial state of FIG. 4A, the bottom unit barrier state 542-$i$, the top unit barrier state 552-$i$ and the bitmaps of the bitmap group 543-$i$ are "0". Moreover, the top unit non-arrival counter 553-$i$ and the top unit expectation counter 554-$i$ are "4".

Threads start to be executed respectively in the barrier banks in the initial state of FIG. 4A.

Assume that all the bitmaps of the bitmap group 543-1 have changed to "1" in FIG. 4B.

The bottom unit 541-1 detects that all the bitmaps are "1", and sets the bottom unit barrier state 542-1 to "1". Then, the bottom unit 541-1 transmits (broadcasts) bottom unit barrier synchronization completion to all the barrier banks for which barrier synchronization is to be performed. The bottom unit barrier synchronization completion indicates that the synchronization within the barrier bank is complete.

The top unit non-arrival counter 553-$i$ that has received the bottom unit barrier synchronization completion decrements its value by 1. As a result, the top unit non-arrival counter 553-$i$ decrements to "3" as illustrated in FIG. 4B.

Similarly, all the bitmaps of the bitmap groups 543-2 and 543-4 have been changed to "1", and the bottom units 541-2 and 542-4 broadcast the bottom unit barrier synchronization completion to all the barrier banks for which the barrier synchronization is to be performed, so that the top unit non-arrival counter 553-$i$ decrements its value.

In FIG. 4C, all the bitmaps of the bitmap group 543-3 have lastly changed to "1", and the bottom unit 541-3 broadcasts bottom unit barrier synchronization completion to all the barrier banks for which the barrier synchronization is to be performed, so that the top unit non-arrival counter 553-$i$ decrements to "0".

The top unit 551-$i$ checks the top unit non-arrival counter 553-$i$, and inverts the value of the top unit barrier state 552-$i$ upon detecting that the top unit non-arrival counter 553-$i$ is "0". Here, the top unit 551-$i$ changes the top unit barrier state 552-$i$ from "0" to "1".

Since the top unit non-arrival counter 553-$i$ decrements to "0", the value of the top unit non-arrival counter 553-$i$ is reset to the same value as the top unit expectation counter 554-$i$. Consequently, the top unit non-arrival counter 553-$i$ is again changed to "4".

Hardware threads connected to the barrier synchronization mechanism 531-$i$ check the top unit barrier state 552-$i$ via polling, determine that the entire barrier synchronization is complete since the value of the top unit barrier state 552-*i* becomes equal to the values written to the bitmaps, and execute the thread up to the next barrier synchronization point.

The barrier synchronization mechanism 531-*i* broadcasts the bottom unit synchronization completion to all the barrier synchronization mechanisms 531-*i*, and all the top unit 551-*i* of the barrier synchronization mechanisms 531-*i* performs the same operation. Accordingly, whichever barrier synchronization mechanism is synchronized last, the synchronization completion can be reported to all the barrier synchronization mechanisms in the shortest communication time.

With the barrier synchronization mechanism according to the first embodiment, synchronization of barrier banks can be implemented with a simple configuration.

With the barrier synchronization mechanism according to the first embodiment, each barrier synchronization mechanism processes synchronization completion of hardware threads within a barrier bank to which the local barrier synchronization mechanism belongs, and processes a notification of barrier synchronization completion of other barrier bank synchronization mechanisms. As a result, a load is lightened compared with a conventional centralized barrier synchronization management mechanism, and thereby the length of processing time can be reduced.

If bitmaps are used for the top unit 541 similarly to the bottom unit 551, the number of requested resources also grows with an increase in the number of barrier banks to be synchronized.

With the barrier synchronization mechanism according to the first embodiment, a counter is used in a top unit, whereby the number of resources can be prevented from being increased even if the number of barrier banks to be synchronized grows.

Second Embodiment

A second embodiment refers to synchronization among barrier banks of three hierarchies.

Figure 5:
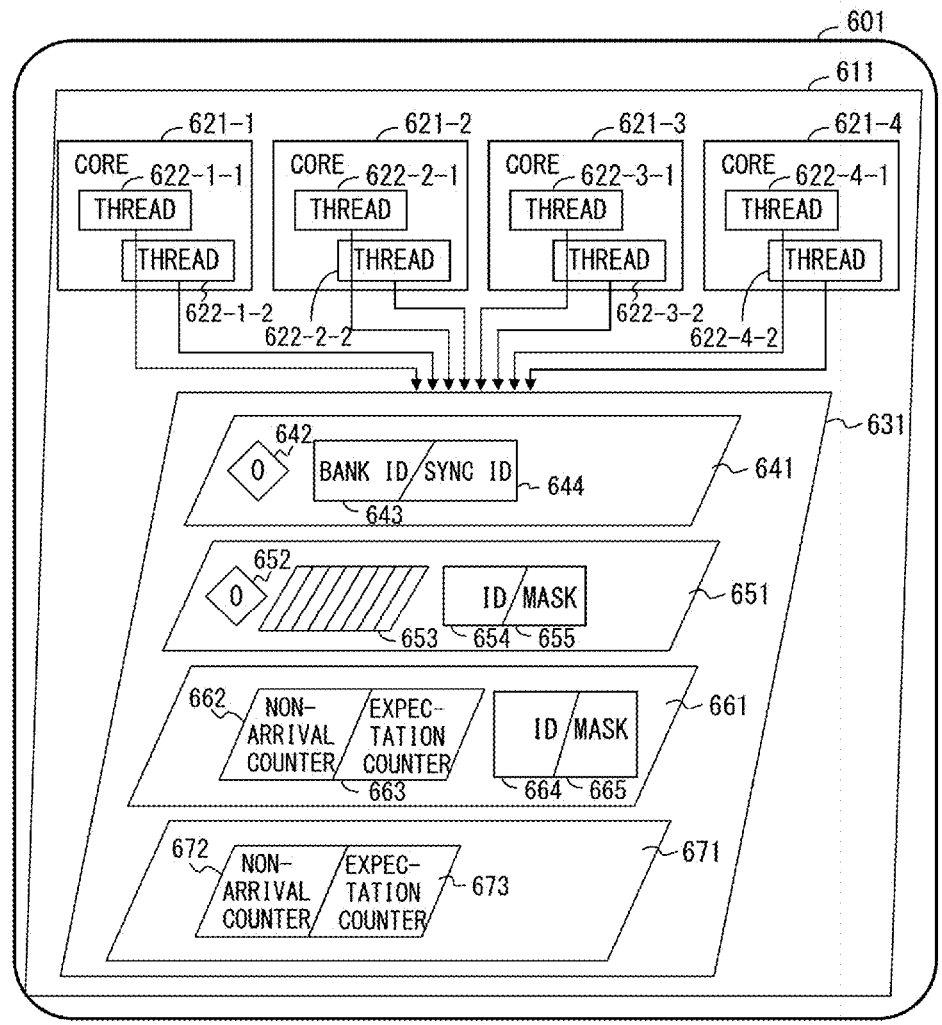
FIG. 5 illustrates a configuration of a CPU according to a second embodiment.

FIG. 5 illustrates a configuration of a CPU according to the second embodiment.

The CPU 601 corresponds to the CPU 401 of FIG. 2.

The CPU 601 includes processor cores 621-*a* (a=1 to 4) and a barrier synchronization mechanism 631. Moreover, the processor cores 621-*a* and the barrier synchronization mechanism 631 are included in a barrier bank 611, which is a minimum unit of barrier bank synchronization. The processor cores 621-*a* and the barrier synchronization mechanism 631 are interconnected by a bus.

Each of the processor cores 621-*a* has a simultaneous multi-threading function, and includes hardware threads 622-*a*-*b* (b=1, 2) for executing a thread.

In FIG. 5, one processor core provides two hardware threads. Software (such as an operating system (OS)) for issuing a software thread handles each of the hardware threads 622-*a*-*b* as a logical CPU (virtual CPU).

The hardware threads 622 respectively execute a thread, read a shared unit barrier state 642 when the corresponding hardware thread has arrived at a barrier synchronization point, and write a value obtained by inverting the read value to an corresponding bitmap 653.

Additionally, the hardware threads 622 respectively check the shared unit barrier state 642 via polling, determine that the synchronization is complete if the value of the shared unit barrier state 642 is equal to the value written to the bitmap 653, and execute the thread up to the next barrier synchronization point.

The barrier synchronization mechanism 631 controls the barrier synchronization, and is implemented, for example, with a hardware circuit and a processor.

The barrier synchronization mechanism 631 includes a shared unit 641, a bottom unit 651, a middle unit 661, and a top unit 671.

The shared unit 641 includes the shared unit barrier state 642, a BANKID 643, and a SYNCID 644.

The shared unit barrier state 642 is information used to control the barrier synchronization. The shared unit barrier state 642 is information indicating whether or not the synchronization of all barrier banks for which the barrier synchronization is to be performed is complete. The shared unit barrier state 642 is "0" or "1".

The BANKID 643 is an identifier (ID) for identifying the barrier synchronization mechanism 631.

The SYNCID 644 is an identifier (ID) for identifying a group to which the barrier synchronization mechanism 631 belongs.

The bottom unit 651 includes a bottom unit barrier state 652, a bitmap group 653, a bottom unit target ID 654, and a bottom unit target mask 655.

The bottom unit barrier state 652 is information used to control the barrier synchronization. The bottom unit barrier state 652 is "0" or "1".

The bitmap group 653 includes a plurality of bitmaps. Each of the bitmaps is information indicating that a corresponding hardware thread 622 has arrived at a barrier synchronization point. The same number of bitmaps are prepared as the number of hardware threads 622 within the barrier bank 611, and respectively allocated to the hardware threads 622. Namely, each of the bitmaps indicates that the allocated hardware thread 622 has arrived at a barrier synchronization point. The value of each of the bitmaps is "0" or "1".

The bottom unit target ID 654 is information indicating a barrier synchronization mechanism to which the bottom unit 651 broadcasts bottom unit barrier synchronization completion.

The bottom unit target mask 655 is information for specifying a position of a don't-care bit for the bottom unit target ID 654. Namely, the bottom unit target mask 655 indicates a position of a bit that can take an arbitrary value in the bottom unit target ID 654.

The bottom unit 651 inverts the value of the bottom unit barrier state 652 if values of all the bitmaps of the bitmap group 653 become equal and different from the bottom unit barrier state 652. Namely, the value of the bottom unit barrier state 652 becomes equal to the value of the bitmaps of the bitmap group 653. Then, the bottom unit 651 broadcasts bottom unit barrier synchronization completion to a barrier synchronization mechanism specified using the bottom unit target ID 654 and the bottom unit target mask 655. If a SYNCID 644 is set, the bottom unit 651 adds the SYNCID 644 to the bottom unit barrier synchronization completion, and broadcasts the bottom unit barrier synchronization completion.

The middle unit 661 includes a middle unit non-arrival counter 662, a middle unit expectation counter 663, a middle unit target ID 664, and a middle unit target mask 665.

The middle unit non-arrival counter 662 counts the number of barrier synchronization mechanisms that have not transmitted bottom unit barrier synchronization completion among barrier synchronization mechanisms for which the barrier synchronization is checked by the middle unit 661, and holds the counted value. The middle unit non-arrival counter 662 decrements its value by 1 upon receipt of the bottom unit barrier synchronization completion.

The middle unit expectation counter 663 is information indicating the number of barrier synchronization mechanisms for which the barrier synchronization is checked by the middle unit 661 and holds its value.

The middle unit target ID 664 is information indicating a barrier synchronization mechanism to which the middle unit 661 broadcasts barrier synchronization completion.

The middle unit target mask 665 is information for specifying a position of a don't-care bit for the middle unit target ID 664. Namely, the middle unit target mask 665 indicates a position of a bit that can take an arbitrary value in the middle unit target ID 664.

If the middle unit non-arrival counter 662 decrements to "0", the middle unit 661 broadcasts middle unit barrier synchronization completion to barrier synchronization mechanisms specified using the middle unit target ID 664 and the middle unit target mask 665. Moreover, the middle unit 661 resets the value of the middle unit non-arrival counter 662 to that of the middle unit expectation counter 663 if the middle unit non-arrival counter 662 decrements to "0".

The top unit 671 includes a top unit non-arrival counter 672 and a top unit expectation counter 673.

The top unit non-arrival counter 672 counts the number of barrier synchronization mechanisms that have not transmitted middle unit barrier synchronization completion among barrier synchronization mechanisms for which the barrier synchronization is checked by the top unit 671, and holds the counted value. The top unit non-arrival counter 672 decrements its value by 1 upon receipt of the middle unit barrier synchronization completion.

The top unit non-arrival counter 672 decrements its value by 1 if an added SYNCID matches a SYNCID 644 when the SYNCID is added to the middle unit barrier synchronization completion. The top unit non-arrival counter 672 does not decrement its value if the added SYNCID does not match the SYNCID 644 when the SYNCID is added to the middle unit barrier synchronization completion. Namely, the top unit non-arrival counter 672 executes a process by regarding the middle unit barrier synchronization completion as a valid or invalid signal depending on whether or not the SYNCID added to the middle unit barrier synchronization completion matches the SYNCID 644.

The top unit expectation counter 673 is information indicating the number of barrier synchronization mechanisms the barrier synchronization of which is checked by the top unit 671 and hold its value.

The top unit 671 inverts the value of the shared unit barrier state 642 if the top unit non-arrival counter 672 decrements to "0". Moreover, the top unit 671 resets the value of the top unit non-arrival counter 672 to that of the top unit expectation counter 673 if the top unit non-arrival counter 672 decrements to "0".

Here, specification of a broadcasting range using a target ID, a target mask, and a SYNCID is described. The target ID and the target mask, which are described here, are the bottom unit target ID 654 and the bottom unit target mask 655, or the middle unit target ID 664 and the middle unit target mask 665. A notification of barrier synchronization completion is made by the bottom unit 651 or the middle unit 661.

Figure 6:
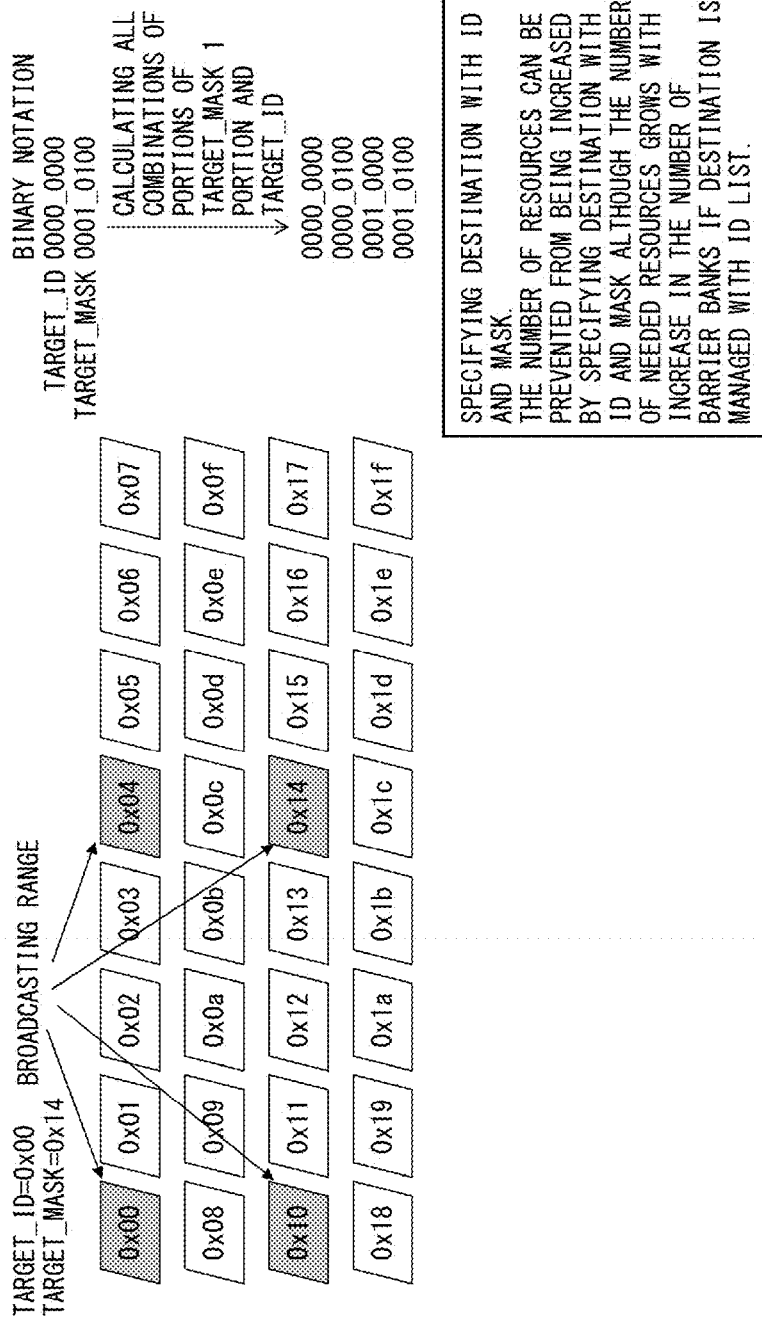
FIG. 6 illustrates a notification of barrier synchronization completion.
Figure 7A:
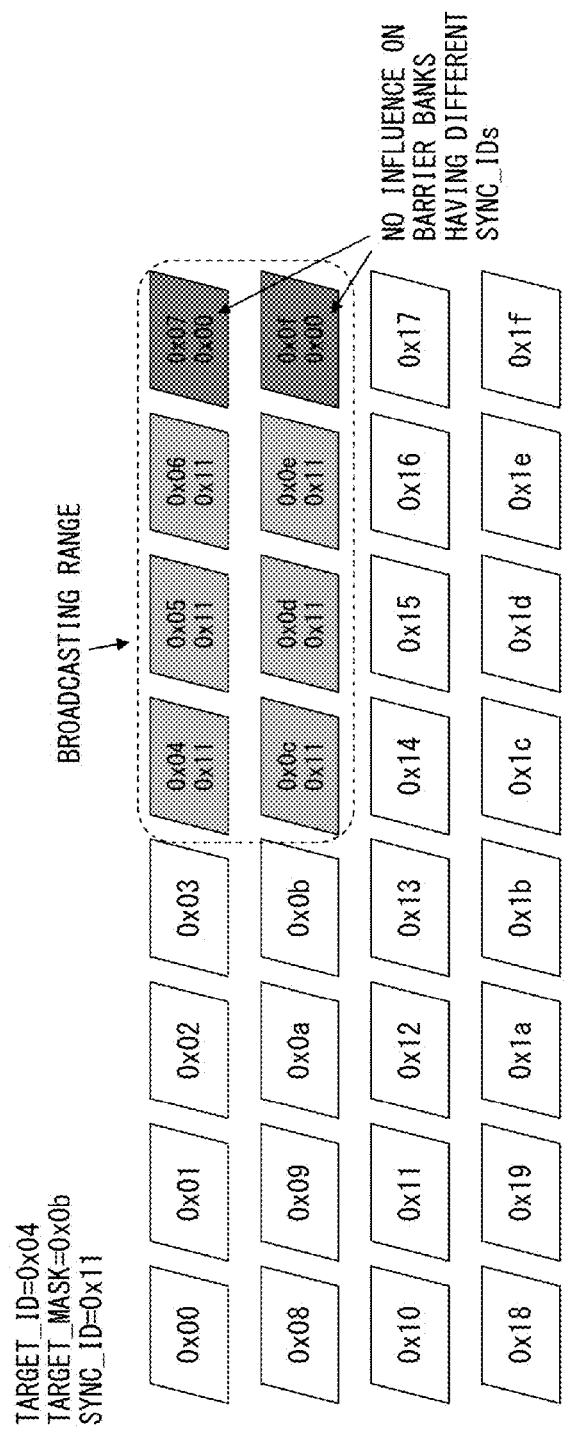
Figure 8A:
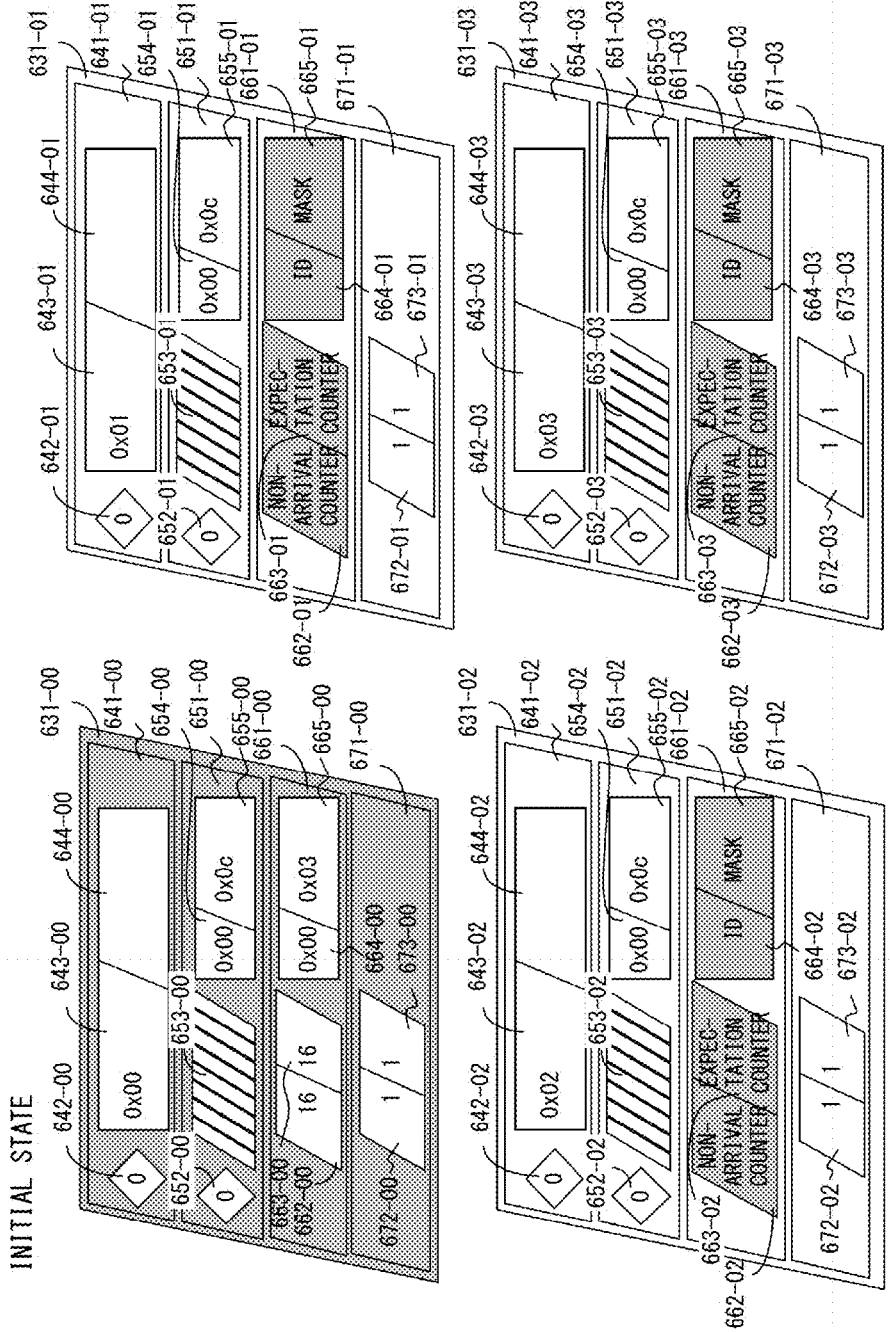
FIGS. 8A to 8D illustrate synchronization among barrier banks according to a second embodiment.
Figure 8B:
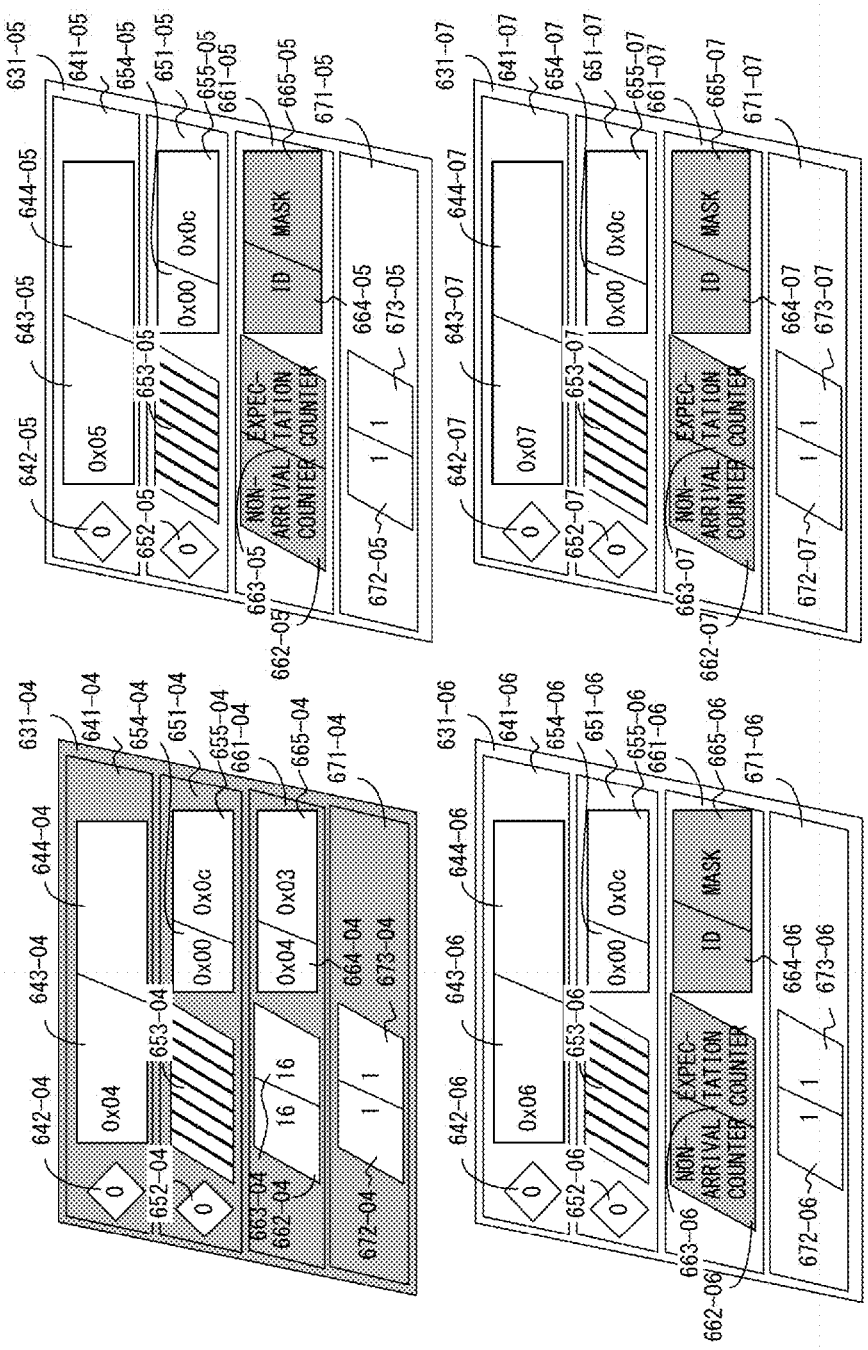
Figure 8C:
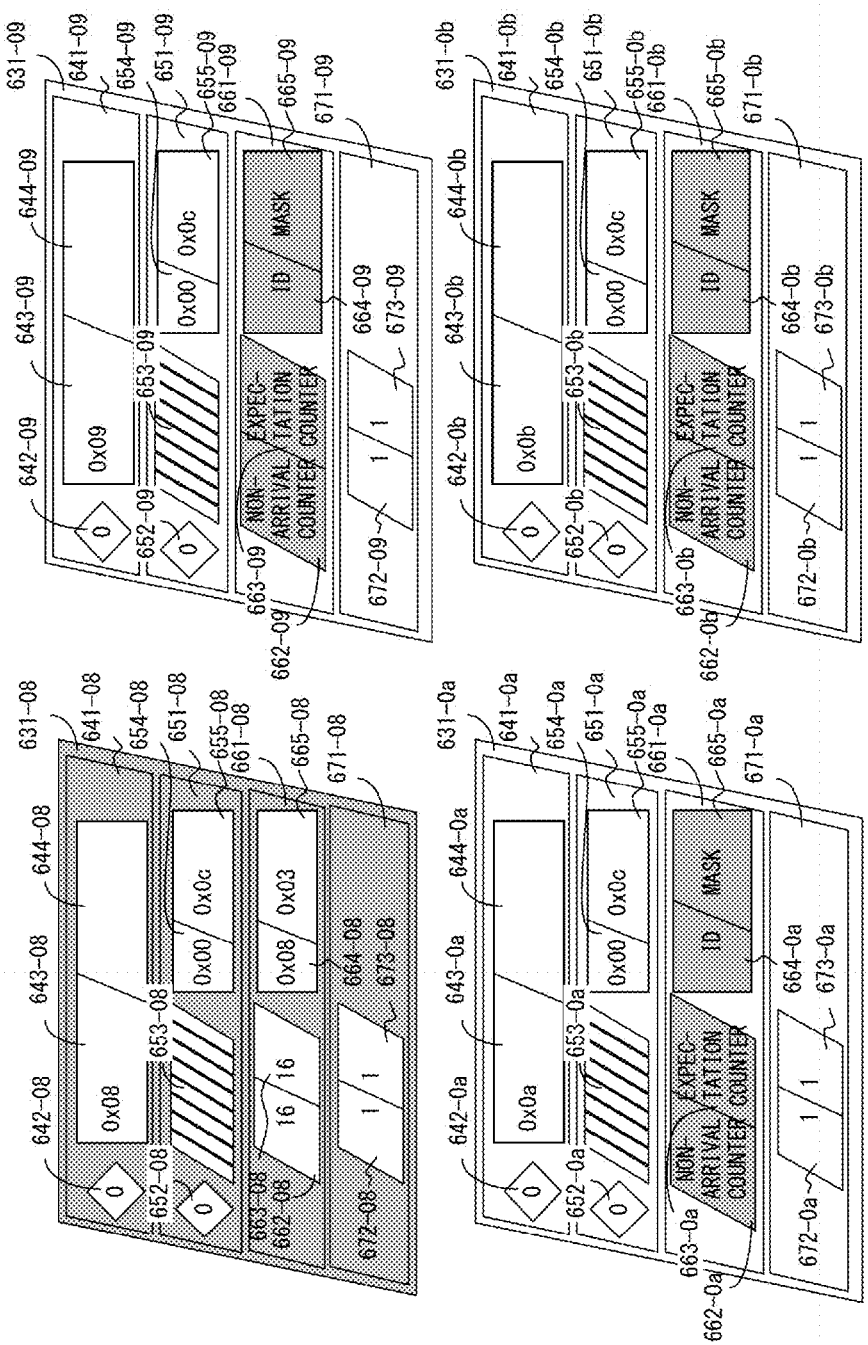
Figure 8D:
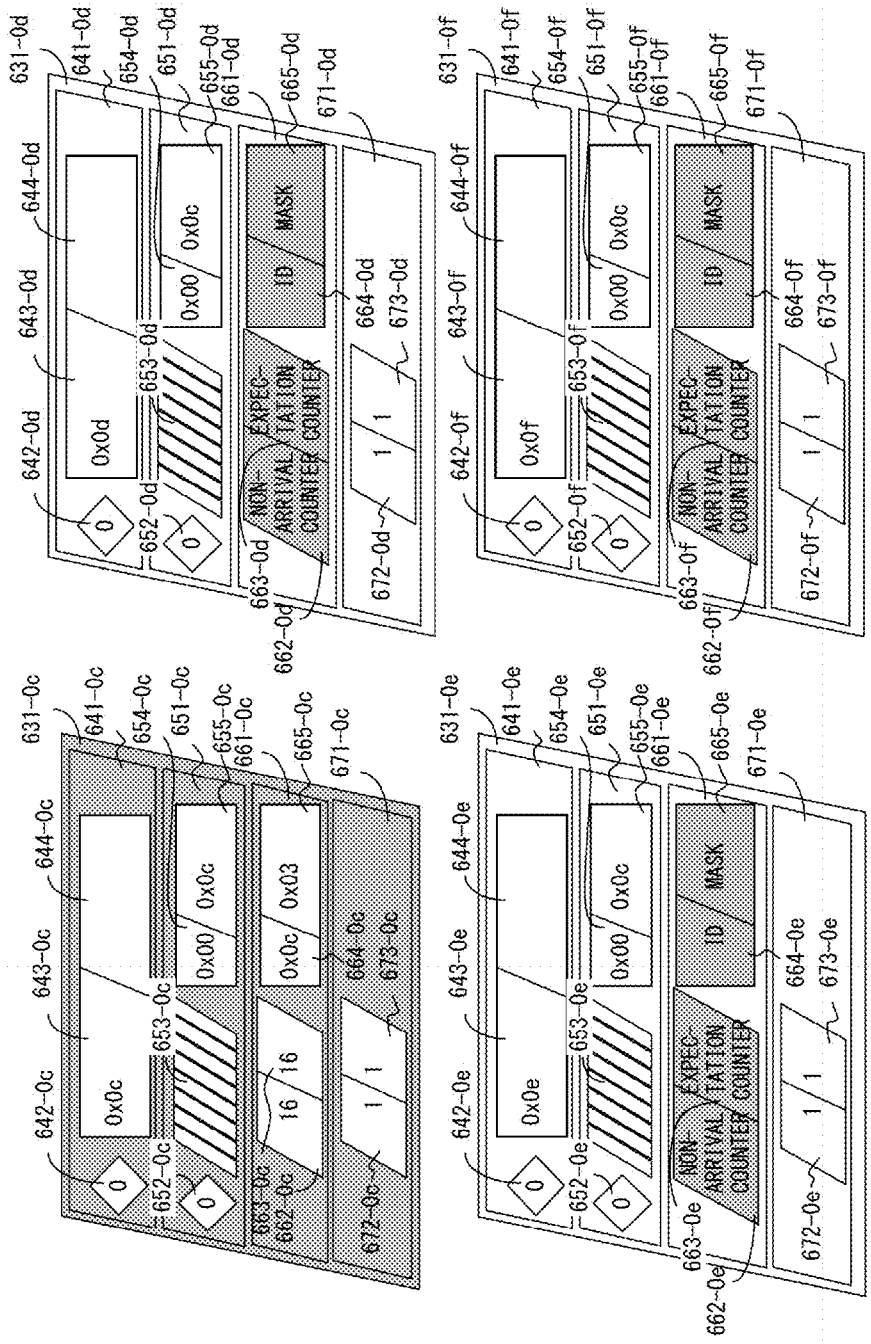
Figure 9A:
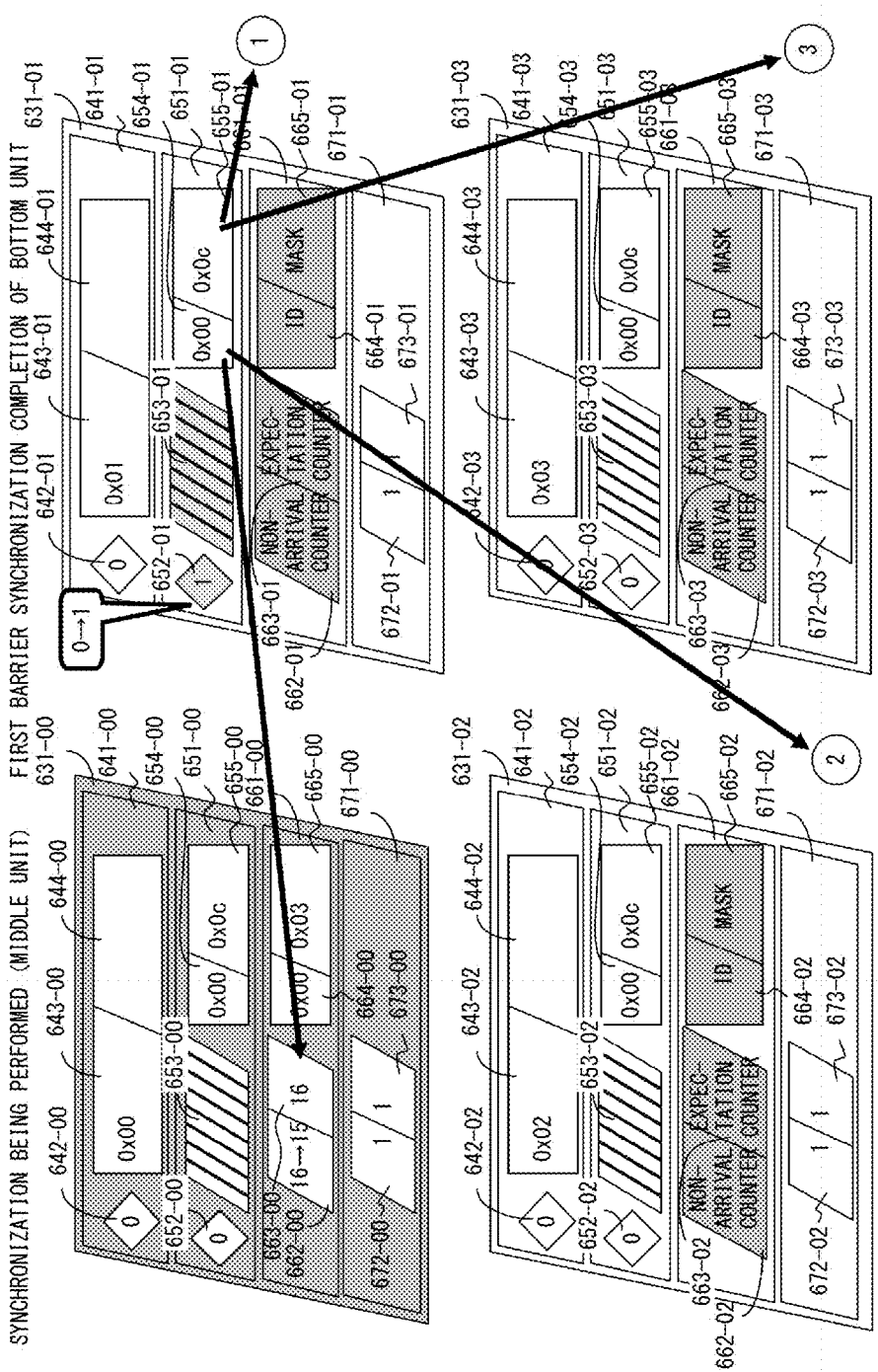
FIGS. 9A to 9D illustrate the synchronization among barrier banks according to the second embodiment.
Figure 9B:
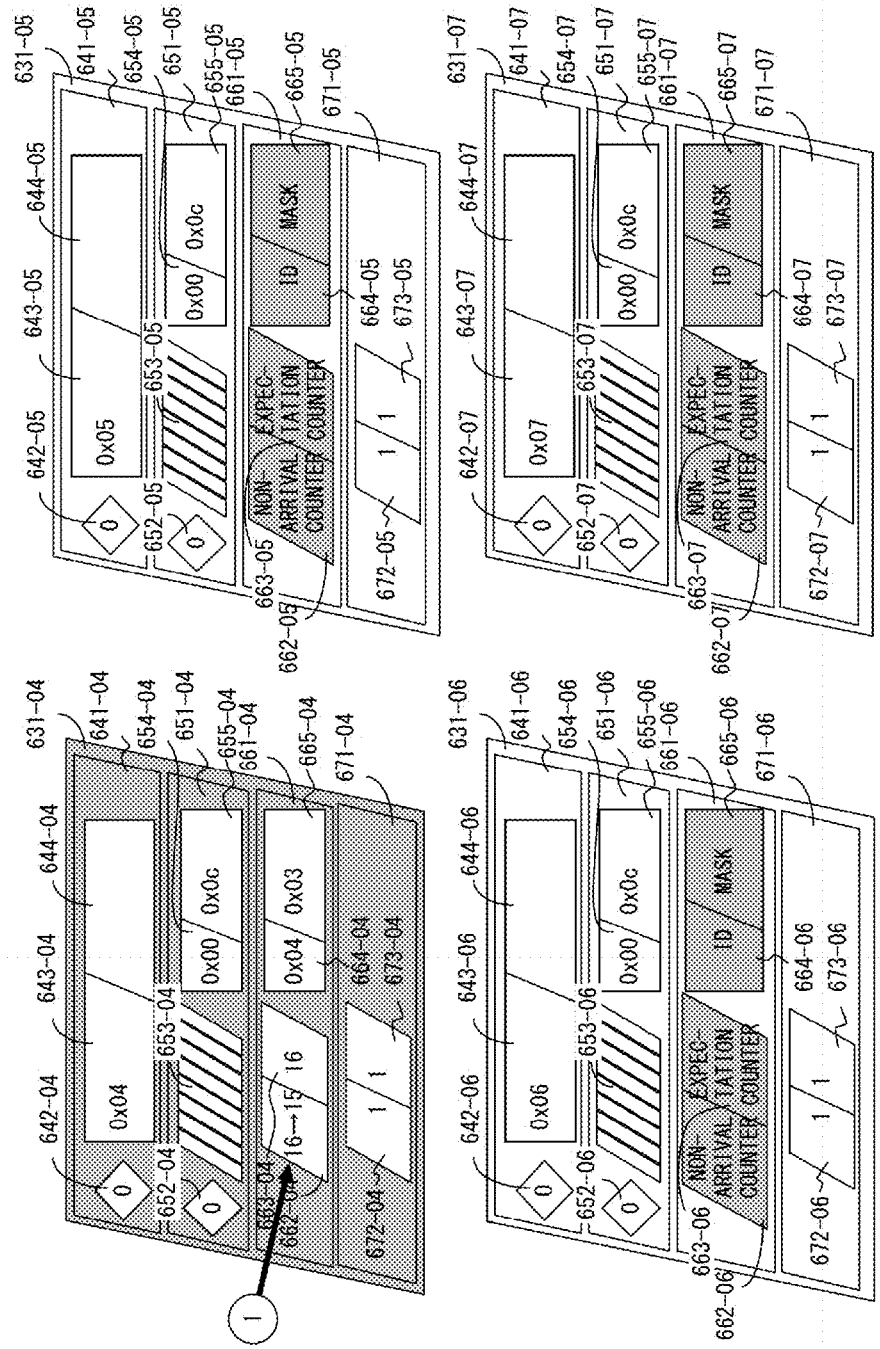
Figure 9C:
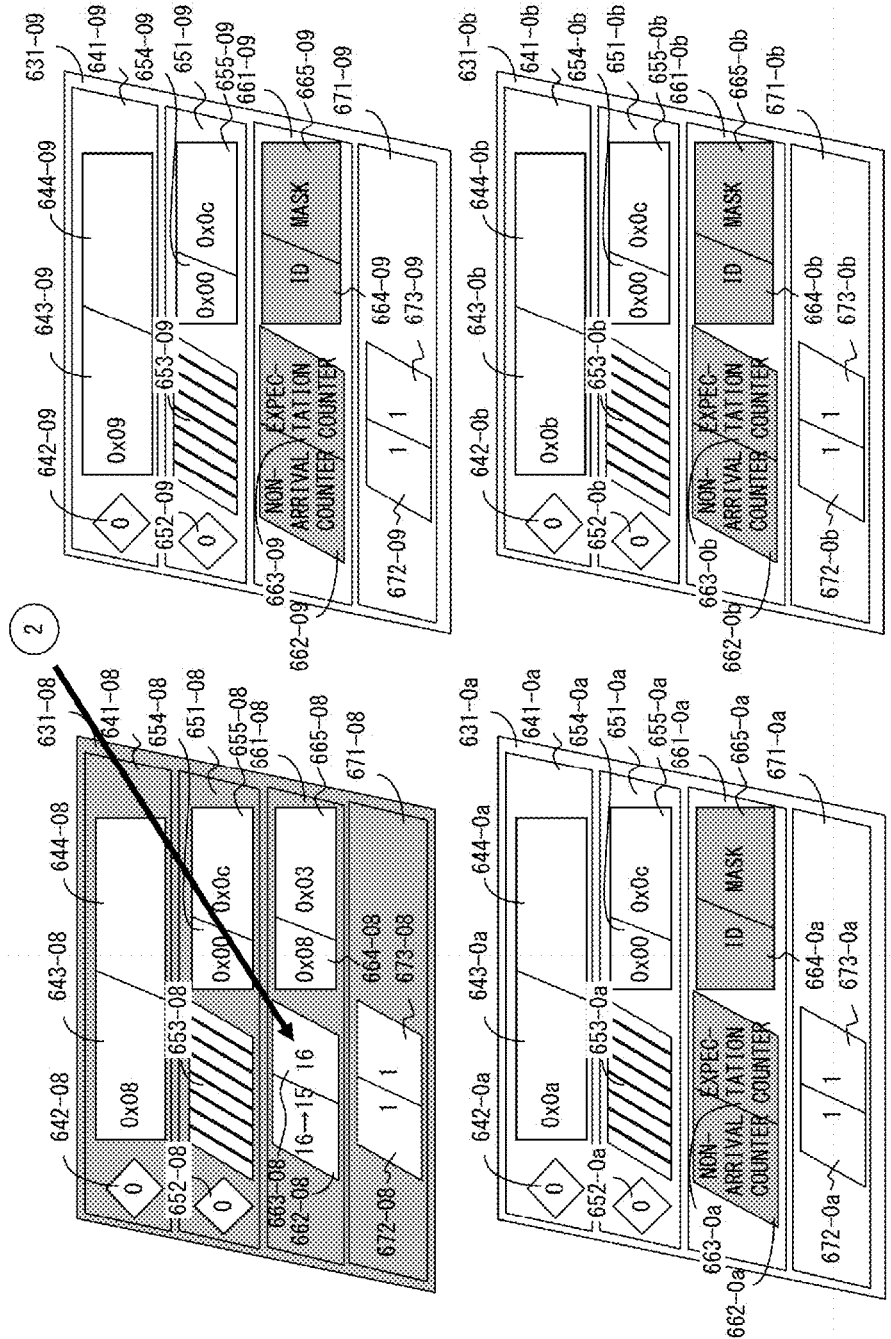
Figure 9D:
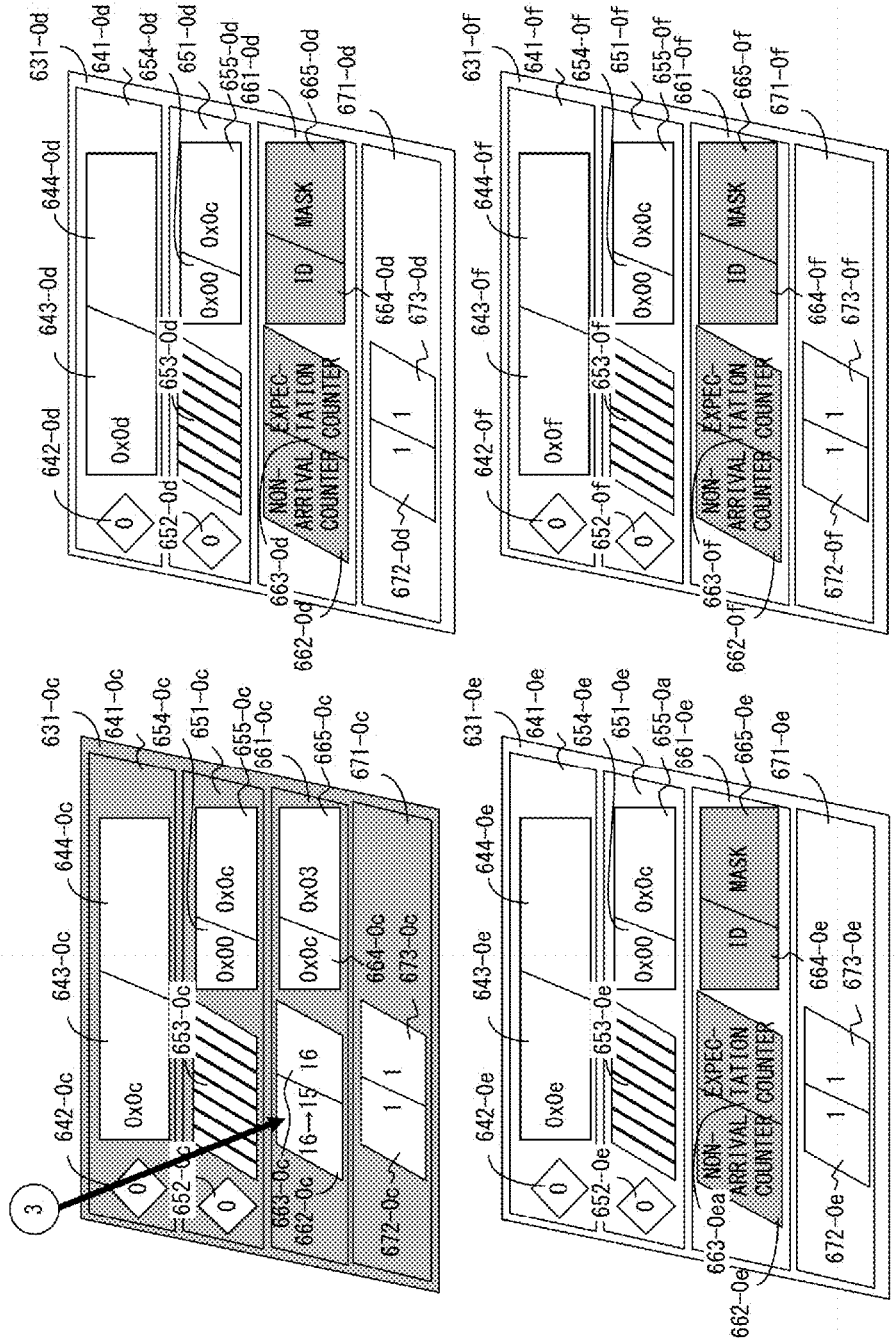
Figure 10B:
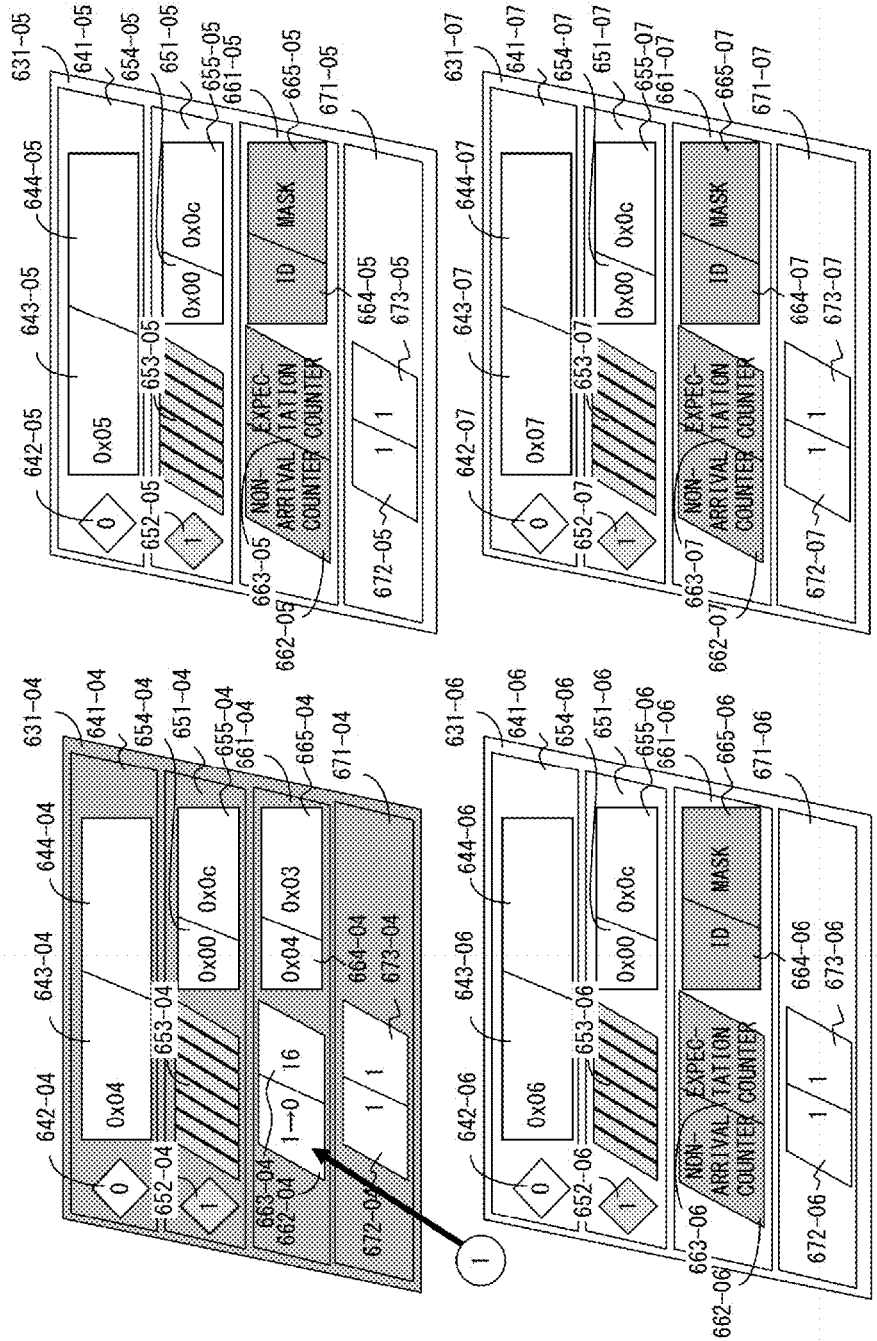
Figure 10C:
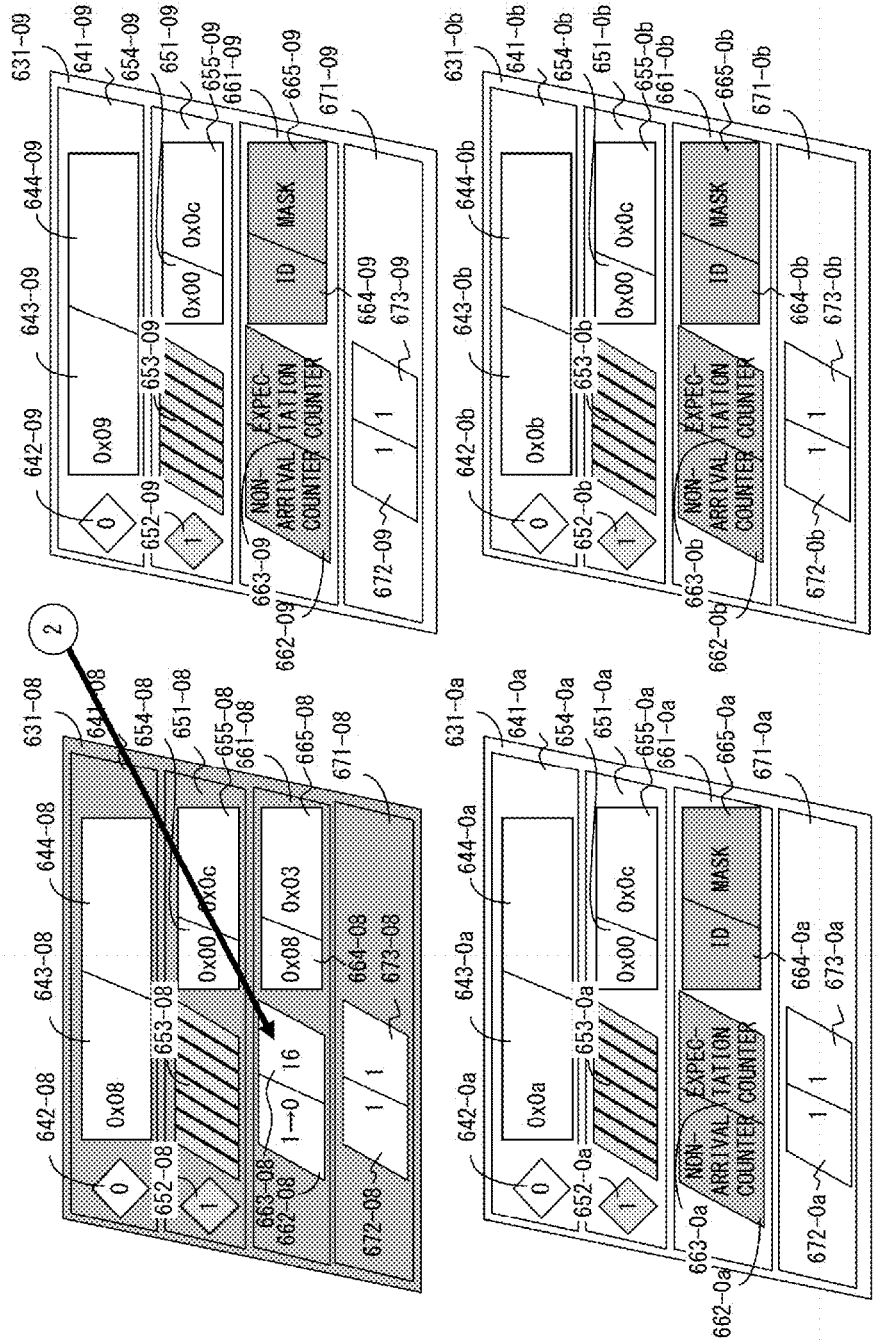
Figure 10D:
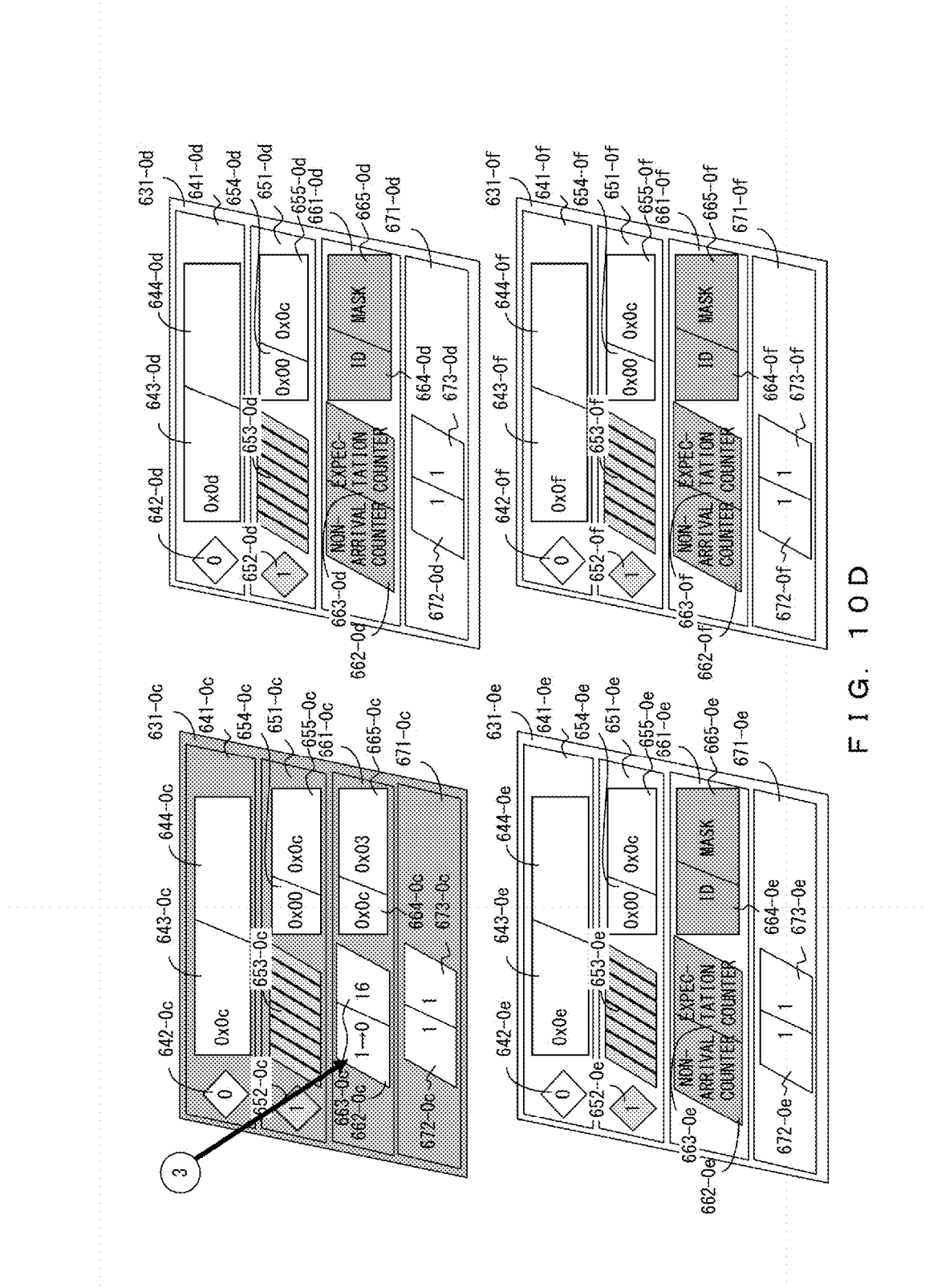
Figure 11A:
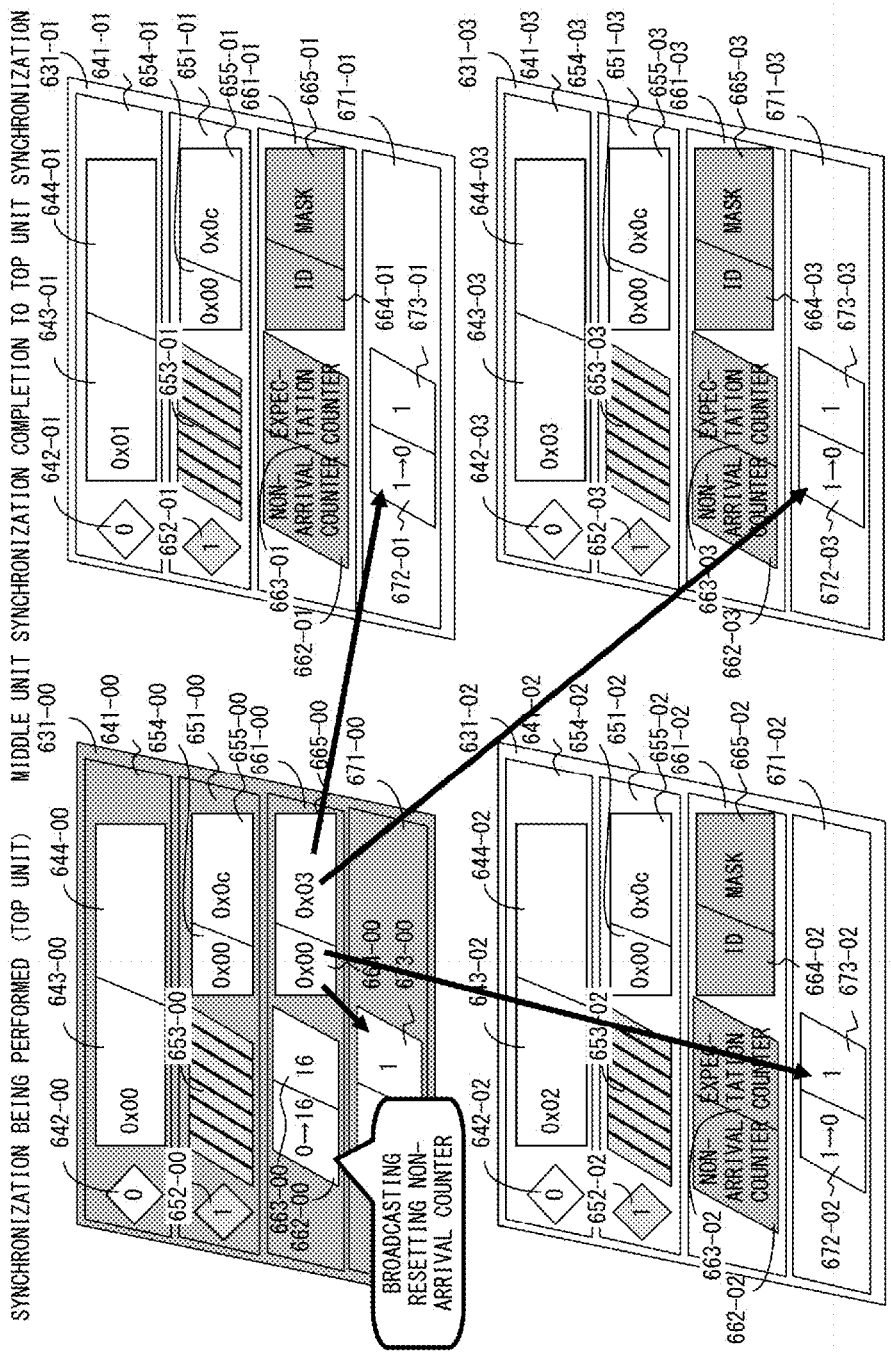
FIGS. 11A to 11D illustrate the synchronization among barrier banks according to the second embodiment.
Figure 11B:
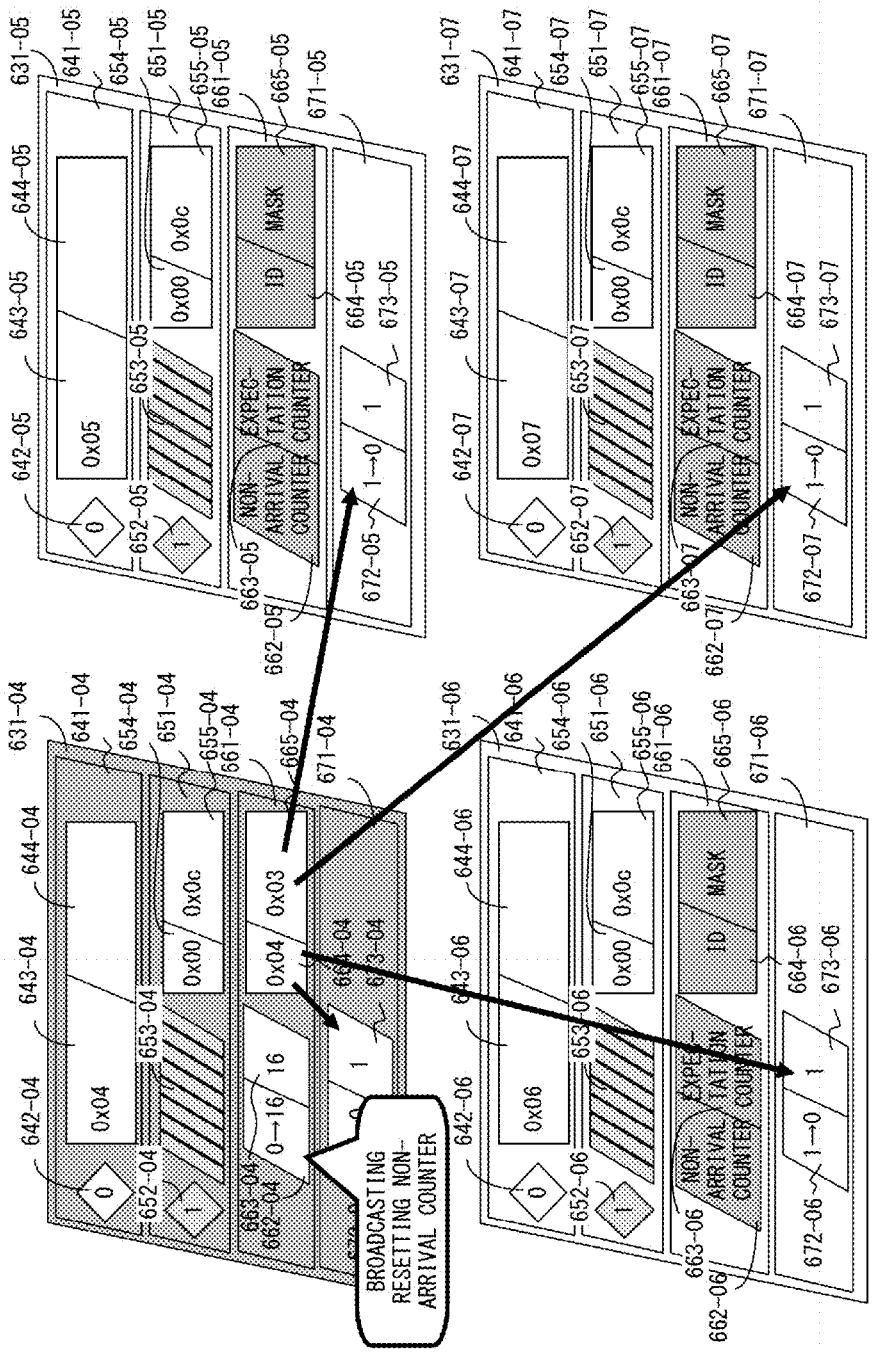
Figure 11C:
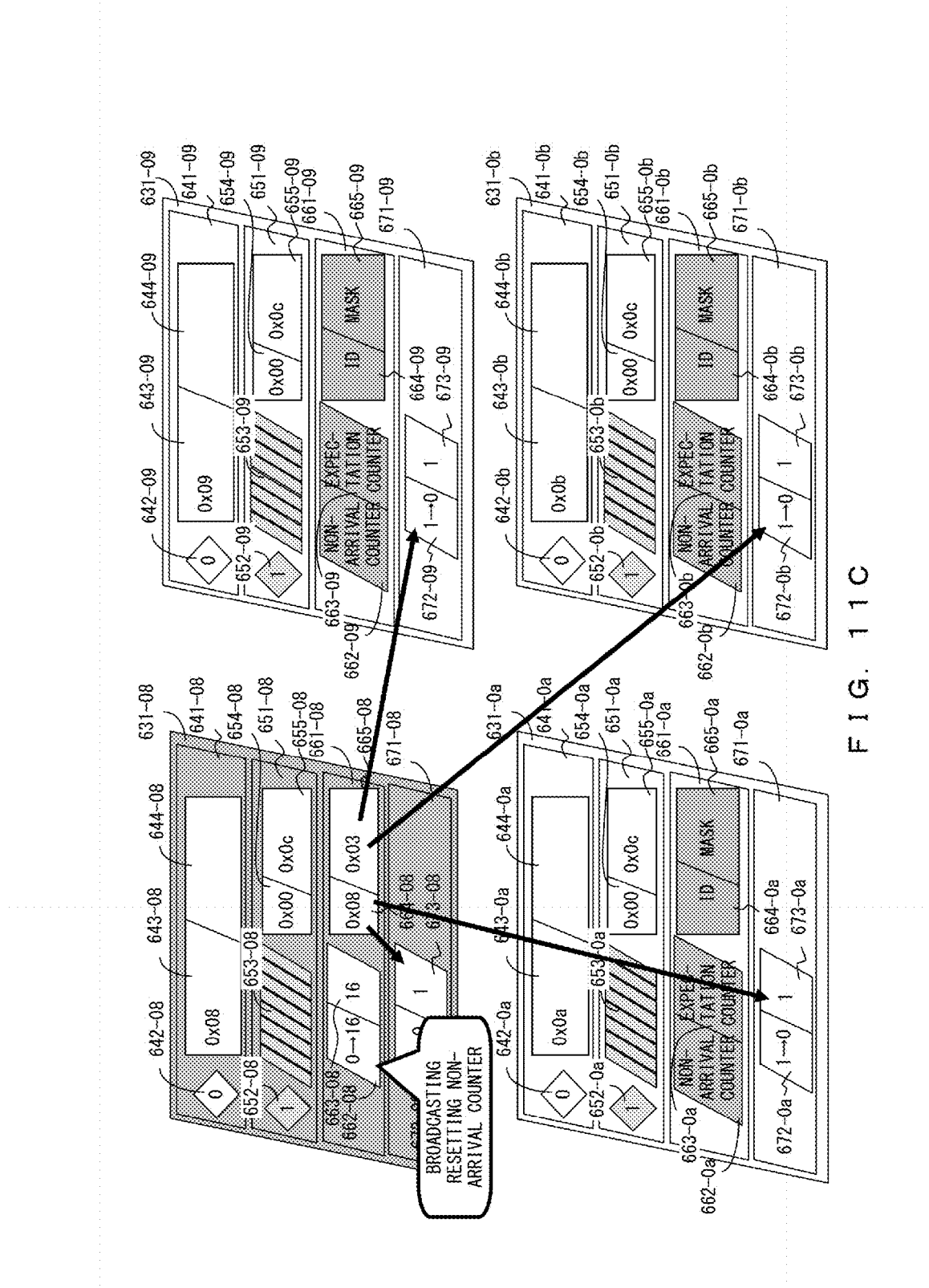
Figure 11D:
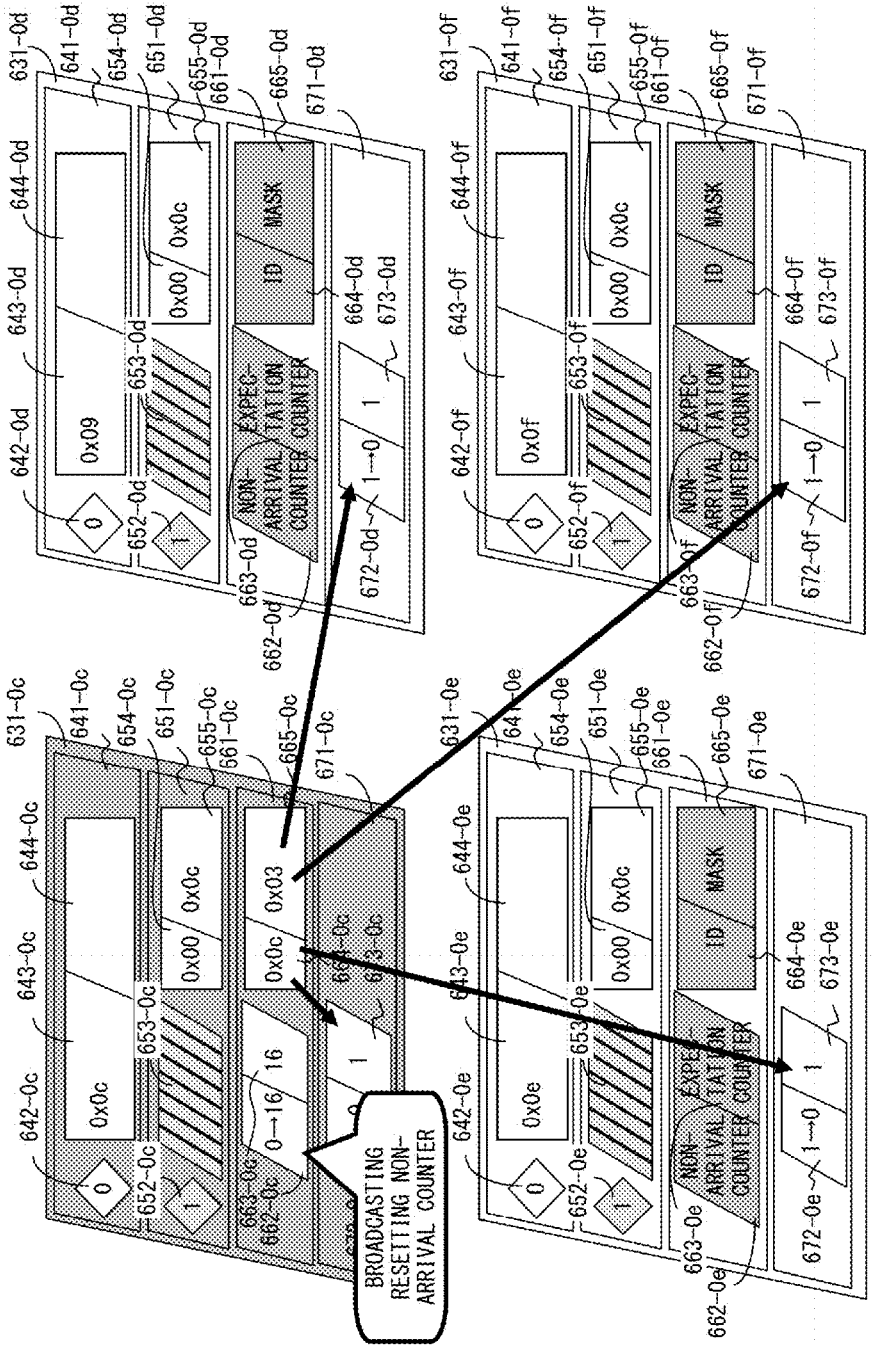
Figure 12A:
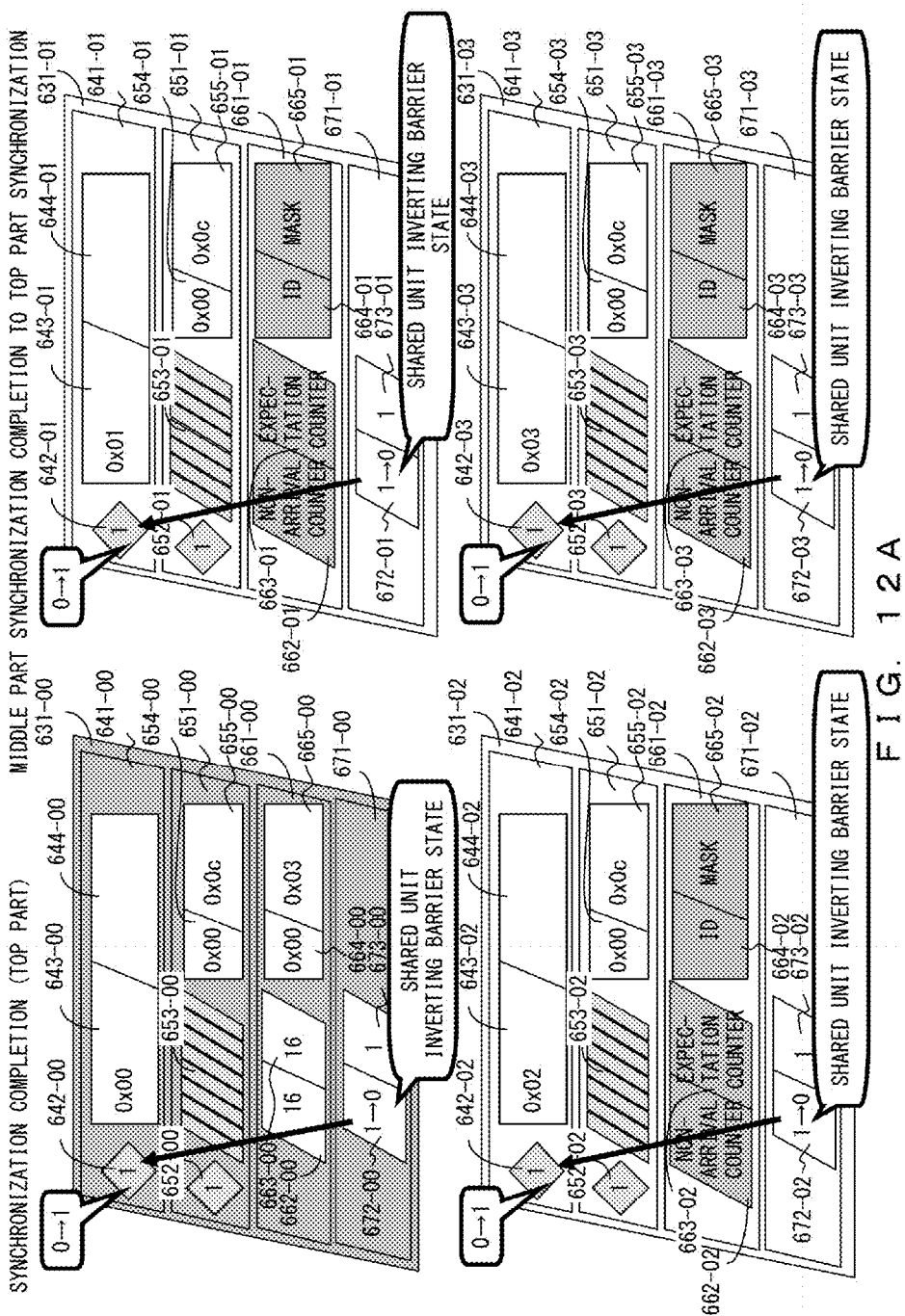
FIGS. 12A to 12D illustrates the synchronization among barrier banks according to the second embodiment.
Figure 12B:
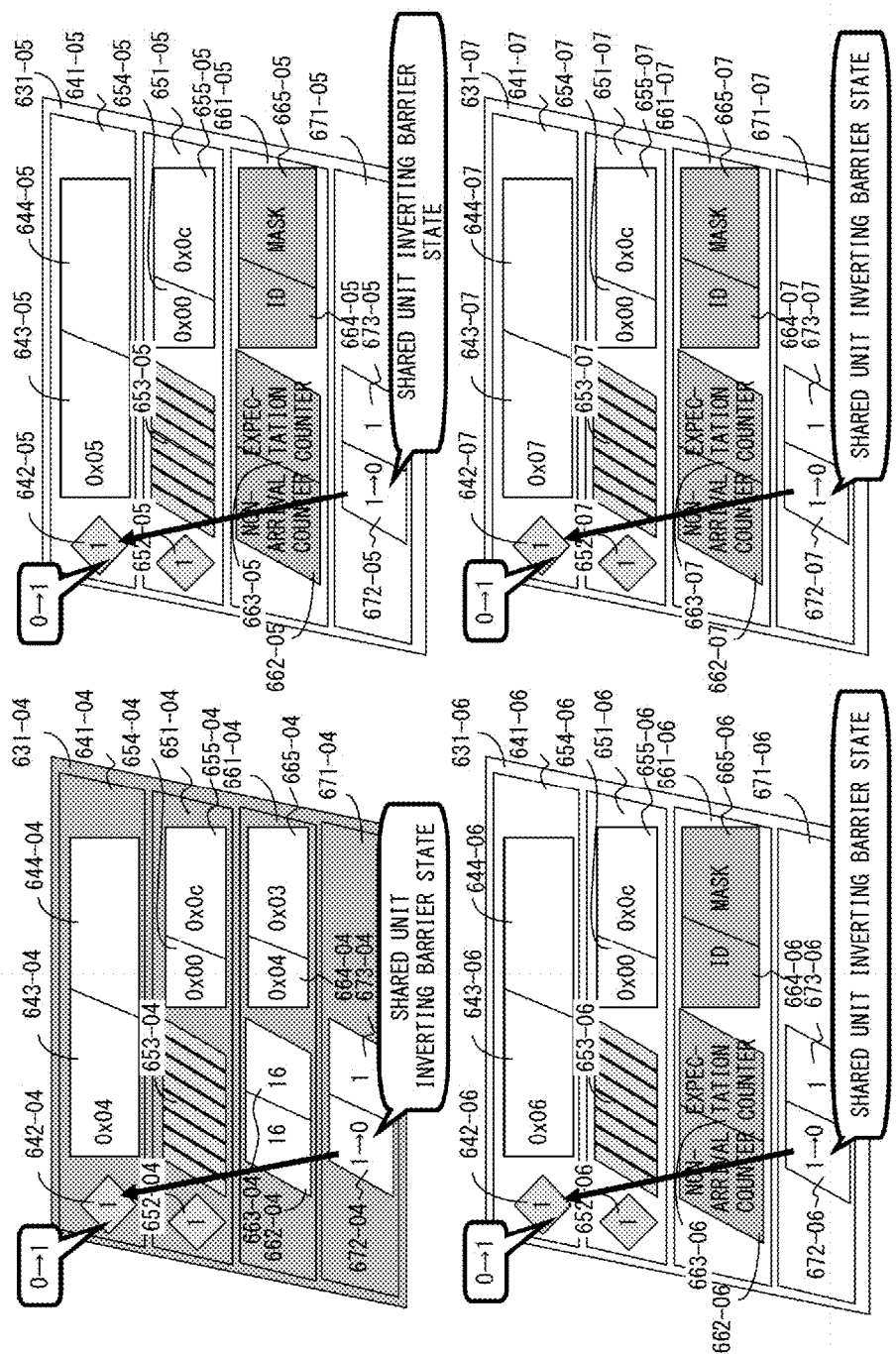
Figure 12C:
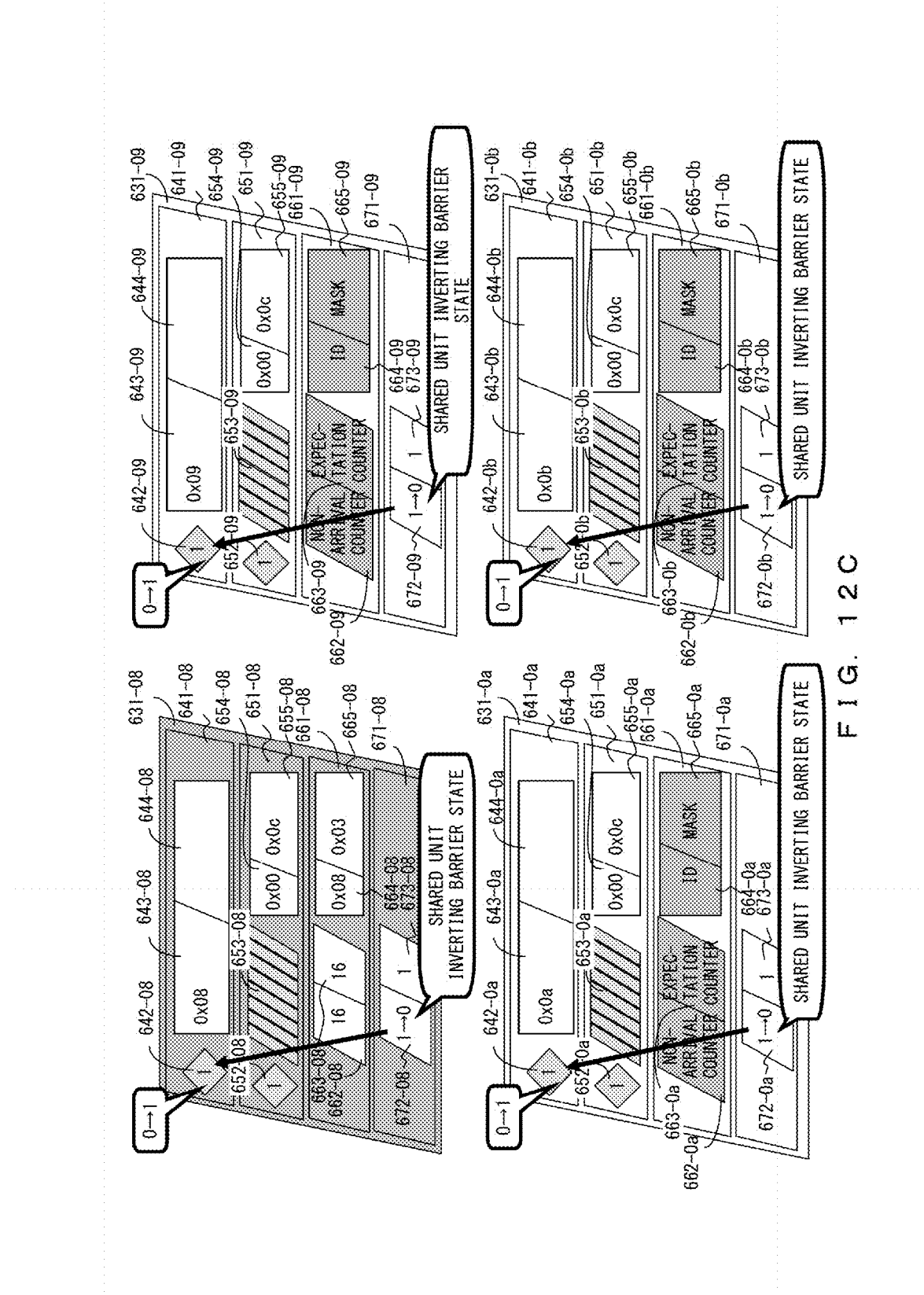
Figure 12D:
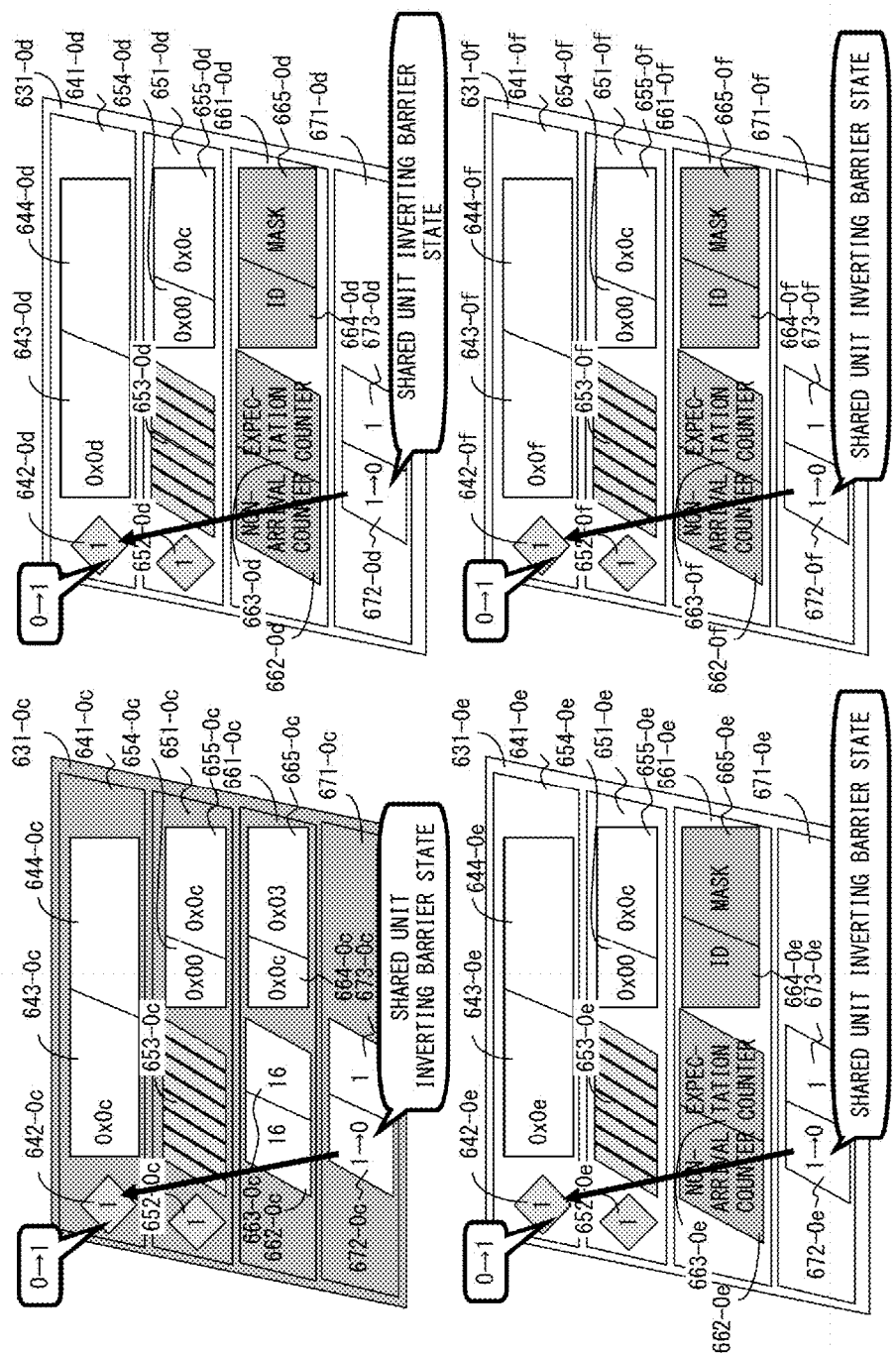

FIGS. 6, 7A, and 7B illustrate the notification of the barrier synchronization completion.

In FIGS. 6, 7A, and 7B, 32 barrier synchronization mechanisms 0xk (k=00 to 1f) are present.

A BANKID of each of the barrier synchronization mechanisms 0xk is 0xk. For example, the BANKID of the barrier synchronization mechanism 0x00 is 0x00. Note that "0x" indicates hexadecimal notation. For example, if 0x00 is represented in binary notation, it is 0000_0000.

Here, a case where the barrier synchronization mechanism 0x00 broadcasts the barrier synchronization completion is described.

The barrier synchronization mechanism 0x00 broadcasts the barrier synchronization completion to barrier synchronization mechanisms specified using a target ID and a target mask.

Assume that the target ID and the target mask are respectively set to 0x00 and 0x14 in the barrier synchronization mechanism 0x00.

If the target ID 0x00 were represented in binary notation, it would be 0000_0000.

If the target mask 0x14 were represented in binary notation, it would be 0001_0100. Namely, this indicates that higher-order fourth and sixth bits of the target ID can take an arbitrary value.

The barrier synchronization mechanism 0x00 calculates a BANKID of barrier synchronization mechanisms (broadcasting range), to which the barrier synchronization completion is broadcast, with a target ID and a target mask.

Since the target ID and the target mask are respectively 0000_0000 and 0001_0100, the barrier synchronization mechanism 0x00 calculates all combinations where the higher-order fourth and sixth bits of the target ID=0000_0000 are arbitrary values.

As a result, 0000_0000, 0000_0100, 0001_0000 and 0000_0100 are calculated. If these results were represented in hexadecimal notation, they would be 0x00, 0x04, 0x10 and 0x14.

Namely, the barrier synchronization mechanisms to which the barrier synchronization completion is broadcast are the barrier synchronization mechanisms 0x00, 0x04, 0x10 and 0x14.

Accordingly, the barrier synchronization mechanism 0x00 broadcasts the barrier synchronization completion to the barrier synchronization mechanisms 0x00, 0x04, 0x10 and 0x14.

If IDs of destinations to which the barrier synchronization completion is reported are managed by using a list, the number of requested resources grows with an increase in the number of barrier banks to which the barrier synchronization completion is reported. By using a target ID and a target mask as described above, the number of resources can be prevented from being increased.

If a destination can be specified using an ID represented in n bits, a broadcasting range is set with two values such as an n-bit target ID and an n-bit target mask.

With this method, an arbitrary set of barrier banks may not be configured, although $2^m$ ($0<=m<=n$) barrier synchronization mechanisms can be specified as a broadcasting range.

A notification of barrier synchronization completion using a SYNCID is described as a method for configuring an arbitrary set of barrier banks.

A case where the barrier synchronization mechanism 0x04 broadcasts the barrier synchronization completion is described in FIG. 7A.

The barrier synchronization mechanism 0x04 broadcasts the barrier synchronization completion to barrier synchronization mechanisms specified using a target ID and a target mask.

Assume that the target ID and the target mask are respectively set to 0x04 and 0x0b in the barrier synchronization mechanism 0x04.

Additionally, the barrier synchronization mechanisms 0x04, 0x05, 0x06, 0x0c, 0x0d and 0x0e have 0x11 as a SYNCID. The barrier synchronization mechanisms 0x07 and 0x0f have 0x00 as a SYNCID. Namely, the barrier synchronization mechanisms 0x04, 0x05, 0x06, 0x0c, 0x0d and 0x0e are set as a first set of barrier banks, whereas the barrier synchronization mechanisms 0x07 and 0x0f are set as a second set of barrier banks.

If the target ID 0x04 were represented in binary notation, it would be 0000_0100.

If the target mask 0x0b were represented in binary notation, it would be 0000_1011. Namely, this indicates that higher-order fifth, seventh and eighth bits of the target ID can take an arbitrary value.

The barrier synchronization mechanism 0x04 calculates a BANKID of the barrier synchronization mechanisms (broadcasting range) to which the barrier synchronization mechanism is broadcast, with a target ID and a target mask.

Since the target ID and the target mask are respectively 0000_0100 and 0000_1011, the barrier synchronization mechanism 0x04 calculates all combinations where higher-order fifth, seventh and eighth bits of the target ID=0000_0100 are arbitrary values.

As a result, 0000_0100, 0000_0101, 0000_0110, 0000_0111, 0000_1100, 0000_1101, 0000_1110 and 0000_1111 are calculated. If these results were represented in hexadecimal notation, they would be 0x04, 0x05, 0x06, 0x07, 0x0c, 0x0d, 0x0e and 0x0f.

Namely, the barrier synchronization mechanisms to which the barrier synchronization completion is broadcast are the barrier synchronization mechanisms 0x04, 0x05, 0x06, 0x07, 0x0c, 0x0d, 0x0e and 0x0f.

Accordingly, the barrier synchronization mechanism 0x04 broadcasts the barrier synchronization completion to which 0x11 is added as a SYNCID to the barrier synchronization mechanisms 0x04, 0x05, 0x06, 0x07, 0x0c, 0x0d, 0x0e and 0x0f.

The barrier synchronization mechanisms that have received the barrier synchronization completion respectively make a comparison between a local SYNCID and the SYNCID added to the barrier synchronization completion. The barrier synchronization mechanisms respectively execute a process by regarding the barrier synchronization completion as a valid signal if the SYNCIDs match, or executes a process by regarding the barrier synchronization completion as an invalid signal if the SYNCIDs do not match.

In FIGS. 7A and 7B, the barrier synchronization mechanisms 0x04, 0x05, 0x06, 0x0c, 0x0d and 0x0e execute a process (for example, decrementing the non-arrival counter) by regarding the barrier synchronization completion as a valid signal since the local SYNCID and the SYNCID added to the barrier synchronization completion match. In contrast, the barrier synchronization mechanisms 0x07 and 0x0f execute a process (for example, ignoring the notification of barrier synchronization completion and not decrementing the non-arrival counter) by regarding the barrier synchronization completion as an invalid signal since the local SYNCID and the SYNCID added to the barrier synchronization completion do not match.

As described above, valid barrier synchronization completion can be broadcast to an arbitrary set of barrier banks by using a target ID, a target mask, and a SYNCID.

The above described calculation of destinations of the barrier synchronization completion by using a target ID and a target mask is adopted similarly in the other embodiments.

FIGS. 8A to 8D, 9A to 9D, 10A to 10D, 11A to 11D, and 12A to 12D illustrate synchronization among barrier banks according to the second embodiment.

FIGS. 8A to 8D illustrate an initial state, FIGS. 9A to 9D, 10A to 10D, and 11A to 11D illustrate synchronization being performed, and FIGS. 12A to 12D illustrates completion of the synchronization.

FIGS. 8A to 8D, 9A to 9D, 10A to 10D, 11A to 11D, and 12A to 12D explain a process of synchronization among 16 barrier banks.

The 16 barrier synchronization mechanisms 631-$m$ (m=00 to 0f) of FIGS. 8A to 8D, 9A to 9D, 10A to 10D, 11A to 11D, and 12A to 12D respectively belong to different barrier banks. The barrier banks may be present within the same CPU or in different CPUs.

Each of the barrier banks of FIGS. 8A to 8D, 9A to 9D, 10A to 10D, 11A to 11D, and 12A to 12D is similar to the barrier bank 611 of FIG. 5. For simplification in the drawing, FIGS. 8A to 8D, 9A to 9D, 10A to 10D, 11A to 11D, and 12A to 12D illustrate only the barrier synchronization mechanisms 631-$m$ within the barrier banks, and does not illustrate processor cores.

Additionally, in FIGS. 8A to 8D, 9A to 9D, 10A to 10D, 11A to 11D, and 12A to 12D, four second-hierarchy groups are set for every four barrier banks. In FIGS. 8A to 8D, 9A to 9D, 10A to 10D, 11A to 11D, and 12A to 12D, the barrier synchronization mechanisms of the first second-hierarchy group are the barrier synchronization mechanisms 631-00 to 631-03, the barrier synchronization mechanisms of the second second-hierarchy group are the barrier synchronization mechanisms 631-04 to 631-07, the barrier synchronization mechanisms of the third second-hierarchy groups are the barrier synchronization mechanisms 631-08 to 631-0$b$, and the barrier synchronization mechanisms of the fourth second-hierarchy group are the barrier synchronization mechanisms 631-0$c$ to 631-0$f$.

Each of the barrier synchronization mechanisms 631-$m$ includes a shared unit 641-$m$, a bottom unit 651-$m$, a middle unit 661-$m$, and a top unit 671-$m$.

The shared unit 641-$m$ includes a shared unit barrier state 642-$m$, a BANKID 643-$m$, and a SYNCID 644-$m$.

The bottom unit 651-$m$ includes a bottom unit barrier state 652-$m$, a bitmap group 653-$m$, a bottom unit target ID 654-$m$, and a bottom unit target mask 655-$m$.

The middle unit 661-$m$ includes a middle unit non-arrival counter 662-$m$, a middle unit expectation counter 663-$m$, a middle unit target ID 664-$m$, and a middle unit target mask 665-$m$.

The top unit 671-$m$ includes a top unit non-arrival counter 672-$m$ and a top unit expectation counter 673-$m$.

The barrier synchronization mechanism 631-$m$, the shared unit 641-$m$, the bottom unit 651-$m$, the middle unit 661-$m$, the top unit 671-$m$, the shared unit barrier state 642-$m$, the BANKID 643-$m$, the SYNCID 644-$m$, the bottom unit barrier state 652-$m$, the bitmap group 653-$m$, the bottom unit target ID 654-$m$, the bottom unit target mask 655-$m$, the middle unit non-arrival counter 662-$m$, the middle unit expectation counter 663-$m$, the middle unit target ID 664-$m$, the middle unit target mask 665-$m$, the top unit non-arrival counter 672-$m$, and the top unit expectation counter 673-$m$ illustrated in FIGS. 8A to 8D, 9A to 9D, 10A to 10D, 11A to 11D, and 12A to 12D, respectively correspond to the barrier synchronization mechanism 631, the shared unit 641, the bottom unit 651, the middle unit 661, the top unit 671, the shared unit barrier state 642, the BANKID 643, the SYNCID 644, the bottom unit barrier state 652, the bitmap group 653, the bottom unit target ID 654, the bottom unit target mask 655, the middle unit non-arrival counter 662, the middle unit expectation counter 663, the middle unit target ID 664, the middle unit target mask 665, the top unit non-arrival counter 672 and the top unit expectation counter 673 illustrated in FIG. 5.

In the initial state illustrated in FIGS. 8A to 8D, the shared-unit barrier state 642-$m$ is 0.

Each BANKID 643-$m$ is set to 0x$m$.

Additionally, the SYNCID 644-$m$ is not set.

The bottom unit barrier state 652-$m$ is 0.

Each of bitmaps of the bitmap group 653-$m$ is 0.

The bottom unit target ID 654-$m$ is 0x00, and the bottom unit target mask 655-$m$ is 0x0c.

The middle unit non-arrival counters 662-0, 662-04, 662-08 and 662-0$c$ are 16.

The middle unit non-arrival counters 662-01 to 662-03, 662-05 to 662-07, 662-09 to 662-0$b$, and 662-0$d$ to 662-0$f$ are not set.

The middle unit expectation counters 663-00, 663-04, 663-08 and 663-0$c$ are 16.

The middle unit expectation counters 663-01 to 663-03, 663-05 to 663-07, 663-09 to 663-0$b$, 663-0$d$ to 663-0$f$ are not set.

The middle unit target IDs 664-00, 664-04, 664-08 and 664-0$c$ are respectively 0x00, 0x04, 0x08 and 0x0c.

The middle unit target IDs 664-01 to 664-03, 664-05 to 664-07, 664-09 to 664-0$b$ and 664-0$d$ to 664-0$f$ are not set.

The middle unit target masks 665-00, 665-04, 665-08 and 665-0$c$ are 0x03.

The middle unit target masks 665-01 to 665-03, 665-05 to 665-07, 665-09 to 665-0$b$, 665-0$d$ to 665-0$f$ are not set.

The top unit non-arrival counter 672-$m$ is 1.

The top unit expectation counter 673-$m$ is 1.

The barrier synchronization mechanism 631 in which the middle unit non-arrival counter 662, the middle unit expectation counter 663, the middle unit target ID 664, and the middle unit target mask 665 are set is referred to as a middle unit valid barrier bank.

The barrier synchronization mechanism 631 in which the middle unit non-arrival counter 662, the middle unit expectation counter 663, the middle unit target ID 664 and the middle unit target mask 665 are not set is referred to as a middle unit invalid barrier bank.

In FIGS. 8A to 8D, 9A to 9D, 10A to 10D, 11A to 11D, and 12A to 12D, the barrier synchronization mechanisms 631-00, 631-04, 631-08 and 631-0$c$ are middle unit valid barrier banks, whereas the barrier synchronization mechanisms 631-01 to 631-03, 631-05 to 631-07, 631-09 to 631-0$b$ and 631-0$d$ to 631-0$f$ are middle unit invalid barrier banks.

In FIGS. 9A to 9D, hardware threads connected to the barrier synchronization mechanisms 631-$m$ are executing a process.

Assume that all bitmaps of the bitmap group 653-01 become "1". Namely, assume that all hardware threads connected to the barrier synchronization mechanism 631-01 have arrived at a barrier synchronization point. The bottom unit 651-01 inverts the value of the bottom unit barrier state 652-01, namely, changes the value to "1".

Then, the bottom unit 651-01 broadcasts bottom unit barrier synchronization completion to the middle units 661-00, 661-04, 661-08 and 661-0$c$ of the barrier synchronization mechanisms 631-00, 631-04, 631-08 and 631-0$c$, which are specified using a bottom unit target ID 654-01 and a bottom unit target mask 655-01.

The middle unit non-arrival counters 662-00, 662-04, 662-08 and 662-0$c$, which have received the bottom unit barrier synchronization completion, respectively decrement their value by 1.

As a result, the value of the middle unit non-arrival counters 662-00, 662-04, 662-08 and 662-0$c$ decrements from "16" to "15".

Similarly, all bitmaps of the bitmap groups 653-00, 653-02, 653-04 to 653-0$f$ change to "1", and the bottom unit barrier states 652-00, 652-02 and 652-04 to 652-0$f$ change to "1".

Then, the bottom units 651-00 and 651-02, 651-04 to 651-0$f$ respectively broadcast bottom unit barrier synchronization completion to the middle units 661-00, 661-04, 661-08 and 661-0$c$.

The middle unit non-arrival counters 662-00, 662-04, 662-08 and 662-0$c$ respectively decrement their value by 1 for each reception of the bottom unit barrier synchronization completion.

In FIGS. 10A to 10D, all bitmaps of the bitmap group 653-03 lastly change to "1". The bottom unit 651-03 inverts the value of the bottom unit barrier state 652-03, namely, changes the value to "1".

Then, the bottom unit 651-03 broadcasts bottom unit barrier synchronization completion to the middle units 661-00, 661-04, 661-08 and 661-0$c$ of the barrier synchronization mechanisms 631-00, 631-04, 631-08 and 631-0$c$, which are specified using the bottom unit target ID 654-03 and the bottom unit target mask 655-03.

The middle unit non-arrival counters 662-00, 662-04, 662-08 and 662-0$c$, which have received the bottom unit barrier synchronization completion, respectively decrement their value by 1.

As a result, the values of the middle unit non-arrival counters 662-00, 662-04, 662-08 and 662-0C are decremented from "1" to "0".

In FIGS. 11A to 11D, the middle units 661-00, 661-04, 661-08 and 661-0$c$ respectively broadcast middle unit barrier synchronization completion to the top unit 671 of the barrier synchronization mechanisms, which are specified using the middle unit target IDs 664-00, 664-04, 664-08, 664-0$c$ and the middle unit target masks 665-00, 665-04, 665-08 and 665-0$c$, upon detecting that the middle unit non-arrival counters 662-00, 662-04, 662-08 and 662-0$c$ decrement to "0".

The middle unit 661-00 broadcasts the middle unit barrier synchronization completion to the top units 671-00 to 671-03 of the barrier bank synchronization mechanisms 631-00 to 631-03, which are specified using the middle unit target ID 664-00 and the middle unit target mask 665-00, upon detecting that the middle unit non-arrival counter 662-00 decrements to "0". Moreover, the middle unit non-arrival counter 662-00 resets the value of the middle unit non-arrival counter 662-00 to that of the middle unit expectation counter 653-00.

The middle unit 661-04 broadcasts the middle unit barrier synchronization completion to the top units 671-04 to 671-07 of the barrier bank synchronization mechanisms 631-04 to 631-07, which are specified using the middle unit target ID 664-04 and the middle unit target mask 665-04, upon detecting that the middle unit non-arrival counter 662-04 decrements to "0". Moreover, the middle unit non-arrival counter 662-04 resets the value of the middle unit non-arrival counter 662-04 to that of the middle unit expectation counter 653-04.

The middle unit 661-08 broadcasts the middle unit barrier synchronization completion to the top units 671-08 to 671-

0b of the barrier bank synchronization mechanisms 631-08 to 631-0b, which are specified using the middle unit target ID 664-08 and the middle unit target mask 665-08, upon detecting that the middle unit non-arrival counter 662-08 decrements to "0". Moreover, the middle unit non-arrival counter 662-08 resets the value of the middle unit non-arrival counter 662-08 to that of the middle unit expectation counter 653-08.

The middle unit 661-0c broadcasts the middle unit barrier synchronization completion to the top units 671-0c to 671-0f the barrier bank synchronization mechanisms 631-0c to 631-0f, which are specified using the middle unit target ID 664-0c and the middle unit target mask 665-0c, upon detecting that the middle unit non-arrival counter 662-0c decrements to "0". Moreover, the middle unit non-arrival counter 662-0c resets the value of the middle unit non-arrival counter 662-0c to that of the middle unit expectation counter 653-0c.

The top unit non-arrival counter 672-m that has received the middle unit barrier synchronization completion decrements its value by 1. As a result, the value of the top unit non-arrival counter 672-m decrements from "1" to "0".

In FIGS. 12A to 12D, the top unit 671-m inverts the value of the shared unit barrier state 642-m upon detecting that the top unit non-arrival counter 672-m decrements to "0". As a result, the value of the shared unit barrier state 642-m changes from "0" to "1".

Additionally, the top unit non-arrival counter 672-m resets the value of the top unit non-arrival counter 672-m to that of the top unit expectation counter 673-m.

Hardware threads connected to the barrier synchronization mechanism 631-m respectively verify that the value of the shared unit barrier state 642-m becomes equal to the value (1) that the shared unit barrier state 642 writes to the bitmap, and execute the process up to the next barrier synchronization point.

With the barrier synchronization mechanism according to the second embodiment, synchronization among barrier banks can be implemented with a simple configuration.

With a conventional centralized barrier synchronization management mechanism, the number of communications that pass through a network grows with an increase in the number of processor cores for which barrier synchronization is performed, thereby causing network congestion.

Assuming that n=the total number of barrier banks in the barrier synchronization of two hierarchies in the first embodiment, $n^2$ communications occur. In contrast, the number of communications in the barrier synchronization of three hierarchies in the second embodiment is $n*(m+1)$ if m=the number of barrier bank groups of the second hierarchy is assumed.

Therefore, the number of communications can be significantly reduced, whereby a network can be prevented from getting congested.

Third Embodiment

A third embodiment refers to synchronization among barrier banks of four hierarchies.

FIG. 13 illustrates a configuration of a CPU according to the third embodiment.

The CPU 701 corresponds to the CPU 401 of FIG. 2.

The CPU 701 includes processor cores 721-a (a=1 to 4) and a barrier synchronization mechanism 731. The processor cores 721-a and the barrier synchronization mechanism 731 are included in a barrier bank 711, which is a minimum unit of barrier bank synchronization. The processor cores 721-a and the barrier synchronization mechanism 731 are interconnected by a bus.

Each of the processor cores 721-a has a simultaneous multi-threading function, and has hardware threads 722-a-b (b=1, 2) for executing a thread.

Since each of the hardware threads 722 has a function similar to the hardware thread 622 of FIG. 5, their explanation is omitted.

The barrier synchronization mechanism 731 controls the barrier synchronization, and is implemented, for example, with a hardware circuit and a processor.

The barrier synchronization mechanism 731 includes a shared unit 741, a bottom unit 751, a middle unit 761 and a top unit 771.

The shared unit 741 includes a shared unit barrier state 742, a BANKID 743 and a SYNCID 744.

Since the shared unit barrier state 742, the BANKID 743 and the SYNCID 744 have a function similar to that of the shared unit barrier state 642, the BANKID 643 and the SYNCID 644 illustrated in FIG. 5, their explanations are omitted.

The bottom unit 751 includes a bottom unit barrier state 752, a bitmap group 753, a bottom unit target ID 754 and a bottom unit target mask 755.

Since the bottom unit 751, the bottom unit barrier state 752, the bitmap group 753, the bottom unit target ID 754 and the bottom unit target mask 755 have a function similar to that of the bottom unit barrier state 652, the bitmap group 653, the bottom unit target ID 654 and the bottom unit target mask 655 illustrated in FIG. 5, their explanations are omitted.

The middle unit 761 includes a middle unit non-arrival counter 762, a middle unit expectation counter 763, a middle unit target ID 764, a middle unit target mask 765, and a middle unit destination hierarchy 766.

The middle unit non-arrival counter 762 counts the number of barrier synchronization mechanisms that have not transmitted bottom unit barrier synchronization completion among barrier synchronization mechanisms for which the barrier synchronization is checked by the middle unit 761, and holds the counted value. The middle unit non-arrival counter 762 decrements its value by 1 upon receipt of the bottom unit barrier synchronization completion. Moreover, the middle unit non-arrival counter 762 decrements its value by 1 upon receipt of the middle unit barrier synchronization completion to which TO_MIDDLE=1 is added.

The middle unit expectation counter 763 is information indicating the number of barrier synchronization mechanisms for which the barrier synchronization is checked by the middle unit 761 and holds its value.

The middle unit target ID 764 is information indicating a barrier synchronization mechanism to which the middle unit 761 broadcasts the barrier synchronization completion.

The middle unit target mask 765 is information for specifying a position of a don't-care bit for the middle unit target ID 764. Namely, the middle unit target mask 765 indicates a position of a bit that can take an arbitrary value in the middle unit target ID 764.

Figure 14:
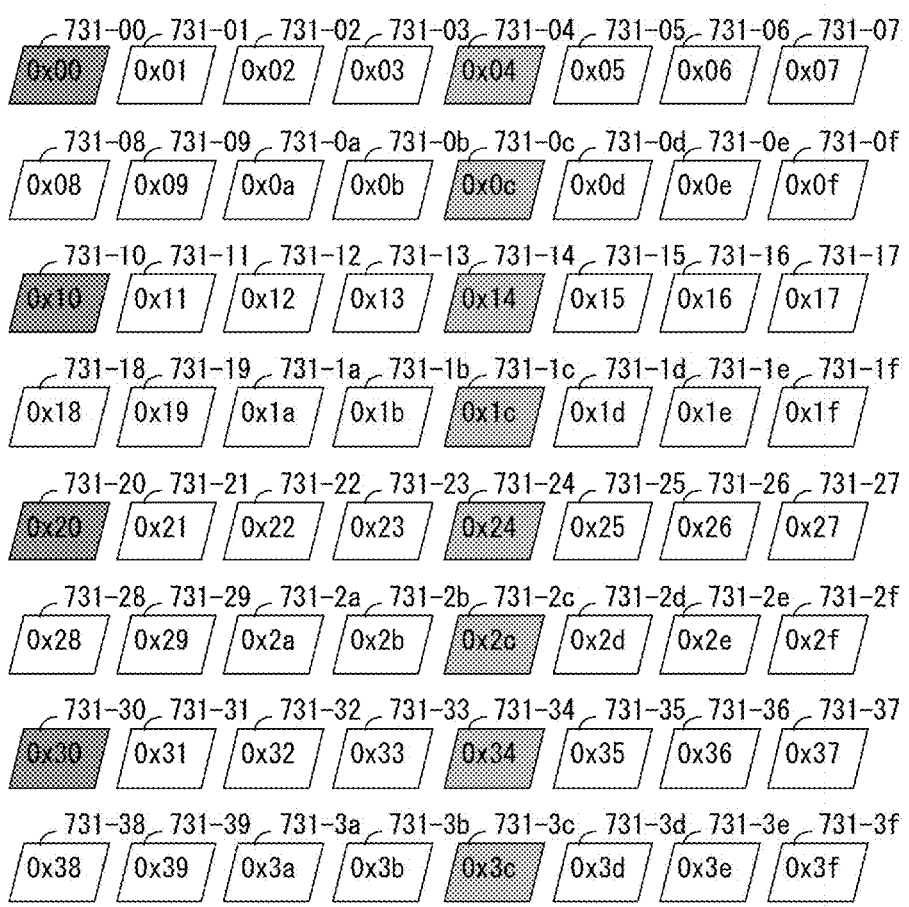
FIG. 14 illustrates synchronization among barrier banks according to the third embodiment.

The middle unit destination hierarchy 766 indicates a processing unit (middle unit or top unit) for processing the received middle unit barrier synchronization completion. The middle unit destination hierarchy 766 is "1" or "0". "1" indicates that the middle unit 761 that has received the middle unit synchronization completion executes a process for the reception of the middle unit synchronization completion. "0" indicates that the top unit 771 that has received the middle unit synchronization completion executes a process for the reception of the middle unit synchronization completion. FIG. 14 and subsequent drawings illustrate "1" and "0" respectively as "MIDDLE" and "TOP".

The middle unit 761 broadcasts the middle unit barrier synchronization completion to barrier synchronization mechanisms specified using a middle unit target ID 764 and a middle unit target mask 765 if the middle unit non-arrival counter 762 decrements to "0". The middle unit 761 adds the value of the middle unit destination hierarchy 766 to the middle unit barrier synchronization completion. For example, the middle unit 761 adds TO_MIDDLE=1 to the middle unit barrier synchronization completion if the middle unit destination hierarchy 766 is "1", or adds TO_MIDDLE=0 to the middle unit barrier synchronization completion if the middle unit destination hierarchy 766 is "0". The middle unit 761 further adds a SYNCID 744 to the middle unit barrier synchronization completion if the SYNCID 744 is set.

Additionally, the middle unit 761 resets the value of the middle unit non-arrival counter 762 to that of the middle unit expectation counter 763 if the middle unit non-arrival counter 762 decrements to "0".

The top unit 771 includes a top unit non-arrival counter 772 and a top unit expectation counter 773.

The top unit non-arrival counter 772 counts the number of barrier synchronization mechanisms that have not transmitted middle unit barrier synchronization completion, to which TO_MIDDLE=0 is added, among barrier synchronization mechanisms for which the barrier synchronization is checked by the top unit 771, and holds the counted value. The top unit non-arrival counter 722 decrements its value by 1 upon receipt of the middle unit barrier synchronization completion to which TO_MIDDLE=0 is added.

Additionally, the top unit non-arrival counter 772 decrements its value by 1 if an added SYNCID matches the SYNCID 744 when the SYNCID is added to the middle unit barrier synchronization completion to which TO_MIDDLE 0 is added. The top unit non-arrival counter 772 does not decrement its value if the added SYNCID does not match the SYNCID 744 when the SYNCID is added to the middle unit barrier synchronization completion to which TO_MIDDLE=0 is added. Namely, the top unit non-arrival counter 772 executes a process by regarding the middle unit barrier synchronization completion as a valid or invalid signal depending on whether or not the SYNCID added to the middle unit barrier synchronization completion matches the SYNCID 744.

The top unit expectation counter 773 is information indicating the number of barrier synchronization mechanisms for which the barrier synchronization is checked by the top unit 771 and holds its value.

The top unit 771 inverts the value of the shared unit barrier state 742 if the top unit non-arrival counter 772 decrements to "0". Moreover, the top unit 771 resets the value of the top unit non-arrival counter 772 to that of the top unit expectation counter 773 if the top unit non-arrival counter 772 decrements to "0".

FIGS. 14, 15A, 15B, 16A, 16B, 17A, 17B, 18A, and 18B illustrate synchronization among barrier banks according to the third embodiment.

Figure 16A:
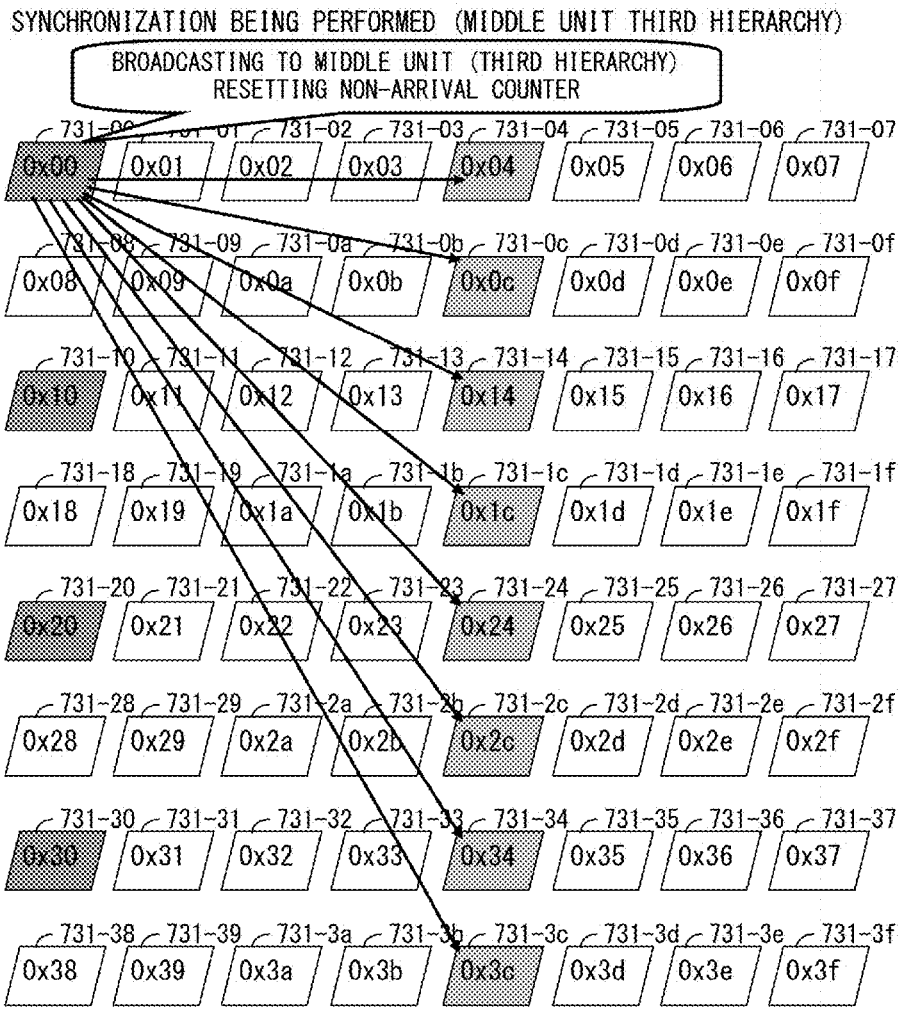
Figure 17B:
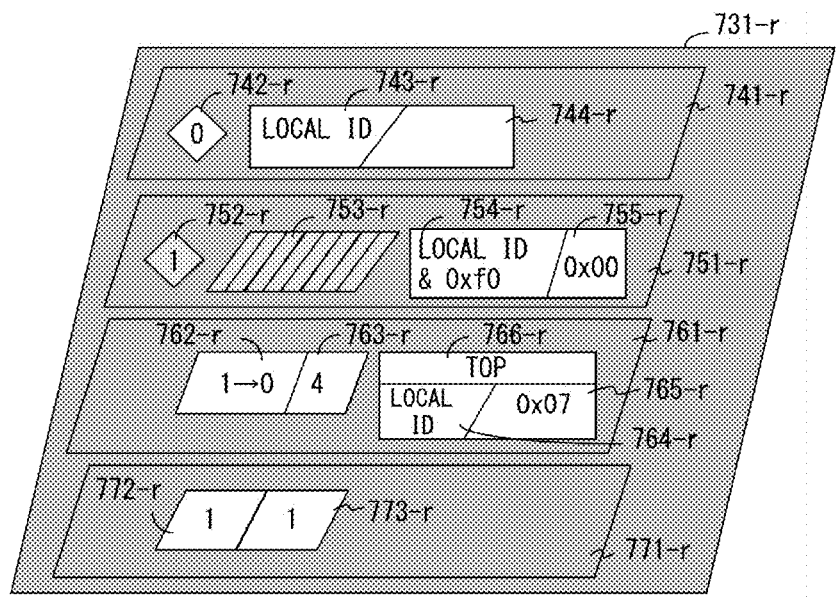
Figure 18A:
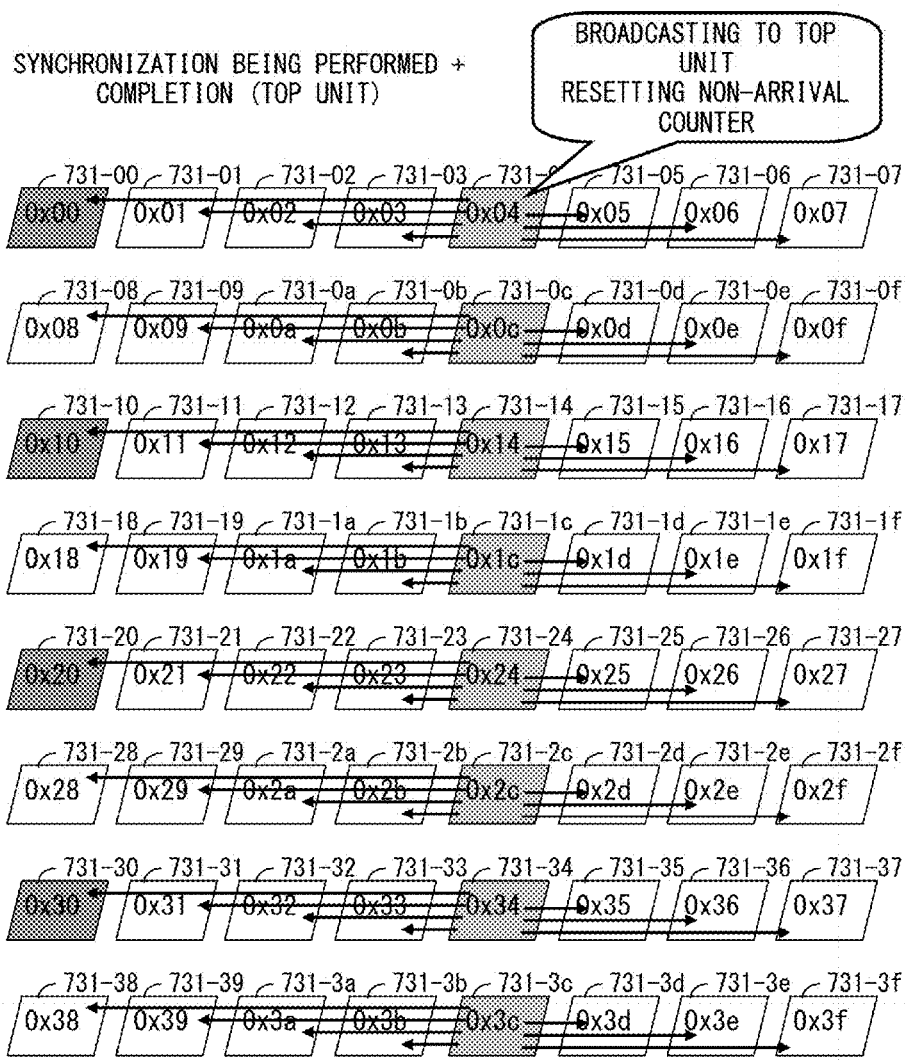
FIGS. 18A and 18B illustrate the synchronization among barrier banks according to the third embodiment.
Figure 18B:
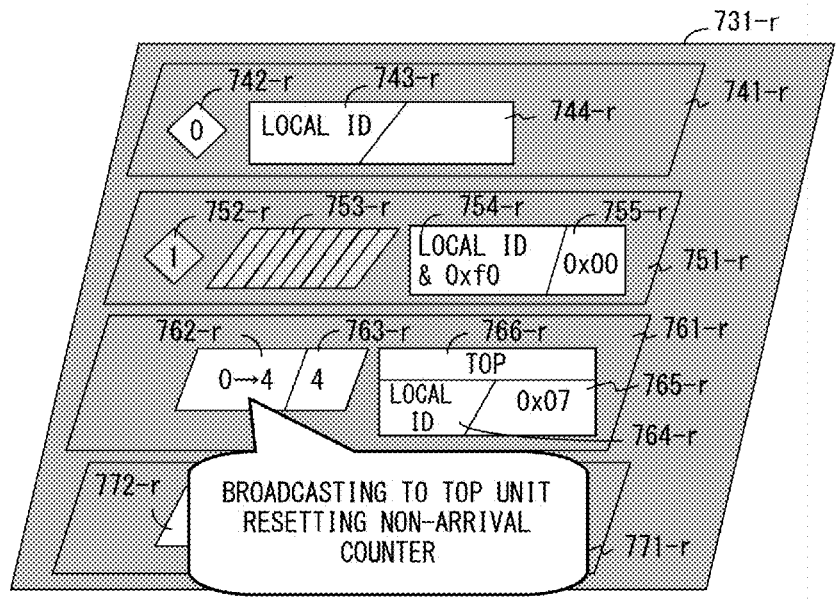
Figure 18B:
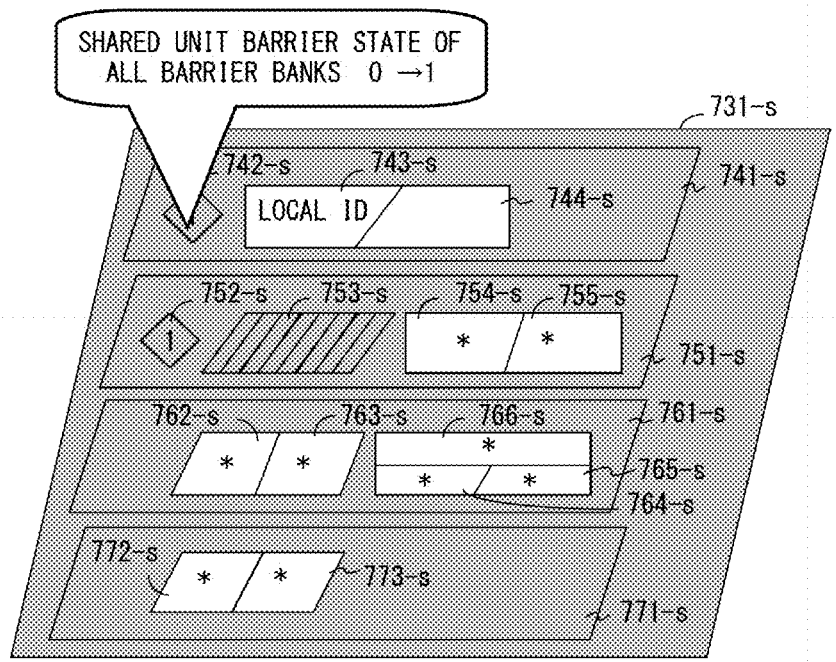

FIG. 14 illustrates an initial state, FIGS. 15A, 15B, 16A, 16B, 17A, and 17B illustrate synchronization being performed, and FIGS. 18A and 18B illustrate completion of the synchronization.

FIGS. 14, 15A, 15B, 16A, 16B, 17A, 17B, 18A, and 18B refer to a process of synchronization among 64 barrier banks.

The 64-barrier synchronization mechanisms 731-$s$ (s=00 to 3f) of FIGS. 14, 15A, 15B, 16A, 16B, 17A, 17B, 18A, and 18B belong to different barrier banks. The barrier banks may be present within the same CPU or in different CPUs.

Each of the barrier banks of FIGS. 14, 15A, 15B, 16A, 16B, 17A, 17B, 18A, and 18B is similar to the barrier bank 611 of FIG. 5. For simplification of the drawing, FIGS. 14, 15A, 15B, 16A, 16B, 17A, 17B, 18A, and 18B illustrate only the barrier synchronization mechanisms 731-$s$ within the barrier banks, and does not illustrate processor cores.

In FIGS. 14, 15A, 15B, 16A, 16B, 17A, 17B, 18A, and 18B, four second-hierarchy groups are set for every 16 barrier banks. Moreover, eight third-hierarchy groups are set for every 8 barrier banks.

Figure 19A:
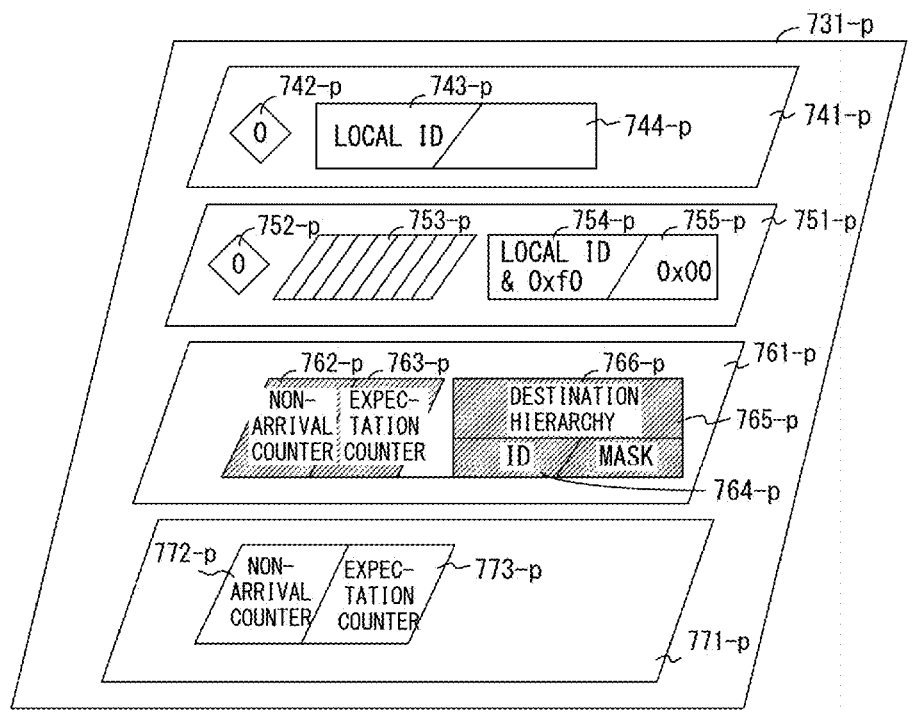
FIG. 19A illustrates a configuration of a barrier synchronization mechanism according to the third embodiment.
Figure 19B:
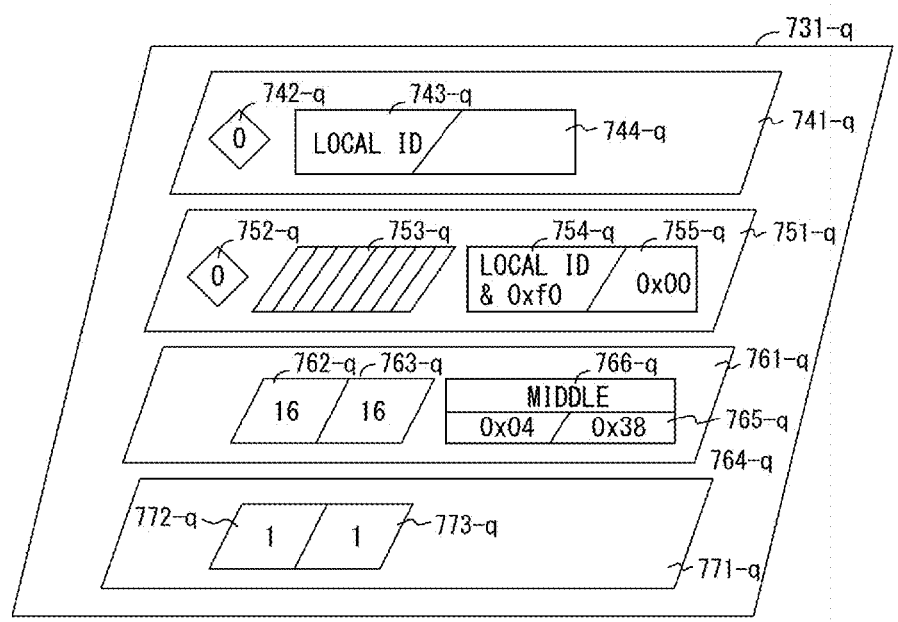
FIG. 19B illustrates a configuration of the barrier synchronization mechanism according to the third embodiment.
Figure 19C:
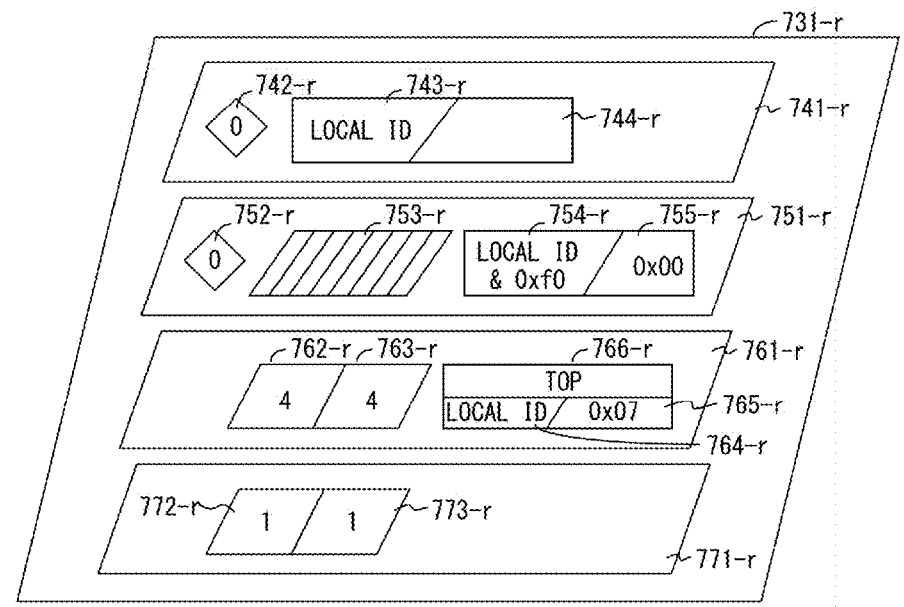
FIG. 19C illustrates a configuration of the barrier synchronization mechanism according to the third embodiment.

FIGS. 19A to 19C illustrate a configuration of the barrier synchronization mechanism according to the third embodiment.

The barrier synchronization mechanism illustrated in FIGS. 19A to 19C is that in the initial state illustrated in FIG. 14.

FIG. 19A illustrates a configuration of the barrier synchronization mechanisms 731-$p$ (p=01 to 03, 05 to 0b, 0d to 0f, 11 to 13, 15 to 1b, 1d to 1f, 21 to 23, 25 to 2b, 2d to 2f, 31 to 33, 35 to 3b and 3d to 3f).

The barrier synchronization mechanism 731-$p$ includes a shared unit 741-$p$, a bottom unit 751-$p$, a middle unit 761-$p$, and a top unit 771-$p$.

The shared unit 741-$p$ includes a shared unit barrier state 742-$p$, a BANKID 743-$p$ and a SYNCID 744-$p$.

The bottom unit 751-$p$ includes a bottom unit barrier state 752-$p$, a bitmap group 753-$p$, a bottom unit target ID 754-$p$, and a bottom unit target mask 755-$p$.

The middle unit 761-$p$ includes a middle unit non-arrival counter 762-$p$, a middle unit expectation counter 763-$p$, a middle unit target ID 764-$p$, a middle unit target mask 765-$p$, and a middle unit destination hierarchy 766-$p$.

The top unit 771-$p$ includes a top unit non-arrival counter 772-$p$ and a top unit expectation counter 773-$p$. The shared unit barrier state 742-$p$, the BANKID 743-$p$, the SYNCID 744-$p$, the bottom unit barrier state 752-$p$, the bitmap group 753-$p$, the bottom unit target ID 754-$p$, the bottom unit target mask 755-$p$, the middle unit non-arrival counter 762-$p$, the middle unit expectation counter 763-$p$, the middle unit target ID 764-$p$, the middle unit target mask 765-$p$, the middle unit destination hierarchy 766-$p$, the top unit non-arrival counter 772-$p$ and the top unit expectation counter 773-$p$ respectively correspond to the shared unit barrier state 742, the BANKID 743, the SYNCID 744, the bottom unit barrier state 752, the bitmap group 753, the bottom unit target ID 754, the bottom unit target mask 755, the middle unit non-arrival counter 762, the middle unit expectation counter 763, the middle unit target ID 764, the middle unit target mask 765, the middle unit destination hierarchy 766, the top unit non-arrival counter 772 and the top unit expectation counter 773 illustrated in FIG. 13.

In an initial state, the shared unit barrier state 742-$p$ is "0". Each BANKID 743-$p$ is set to 0xp. The BANKID 743-$p$ (=0xp) possessed by the barrier synchronization mechanism 731-$p$ is also referred to as a local ID.

Additionally, the SYNCID 744-$p$ is not set.

The bottom unit barrier state 752-$p$ is "0".

Each of the bitmaps of the bitmap group 753-$p$ is "0".

The bottom unit target ID 754-$p$ is BANKID 743-$p$ & 0xf0, and the bottom unit target mask 755-$p$ is 0x00. "&"

indicates a logical AND. The BANKID 743-$p$ & 0xf0 is a logical AND between the value of the BANKID 743-$p$ and 0xf0.

The middle unit non-arrival counter 762-$p$ is not set.
The middle unit expectation counter 763-$p$ is not set.
The middle unit target ID 764-$p$ is not set.
The middle unit target mask 765-$p$ is not set.
The middle unit destination hierarchy 766-$p$ is not set.
The top unit non-arrival counter 672-$p$ is "1".
The top unit expectation counter 673-$p$ is "1".

The barrier synchronization mechanism 731-$p$ where the middle unit non-arrival counter 762-$p$, the middle unit expectation counter 763-$p$, the middle unit target ID 764-$p$, the middle unit target mask 765-$p$, and the middle unit destination hierarchy 766-$p$ are not set is referred to as a middle unit invalid barrier bank.

FIG. 19B illustrates a configuration of the barrier synchronization mechanism 731-$q$ ($q$=00, 10, 20, 30).

The barrier synchronization mechanism 731-$q$ includes a shared unit 741-$q$, a bottom unit 751-$q$, a middle unit 761-$q$ and a top unit 771-$q$.

The shared unit 741-$q$ includes a shared unit barrier state 742-$q$, a BANKID 743-$q$ and a SYNCID 744-$q$.

The bottom unit 751-$q$ includes a bottom unit barrier state 752-$q$, a bitmap group 753-$q$, a bottom unit target ID 754-$q$ and a bottom unit target mask 755-$q$.

The middle unit 761-$q$ includes a middle unit non-arrival counter 762-$q$, a middle unit expectation counter 763-$q$, a middle unit target ID 764-$q$, a middle unit target mask 765-$q$ and a middle unit destination hierarchy 766-$q$.

The top unit 771-$q$ includes a top unit non-arrival counter 772-$q$ and a top unit expectation counter 773-$q$.

The shared unit barrier state 742-$q$, the BANKID 743-$q$, the SYNCID 744-$q$, the bottom unit barrier state 752-$q$, the bitmap group 753-$q$, the bottom unit target ID 754-$q$, the bottom unit target mask 755-$q$, the middle unit non-arrival counter 762-$q$, the middle unit expectation counter 763-$q$, the middle unit target ID 764-$q$, the middle unit target mask 765-$q$, the middle unit destination hierarchy 766-$q$, the top unit non-arrival counter 772-$q$ and the top unit expectation counter 773-$q$ respectively correspond to the shared unit barrier state 742, the BANKID 743, the SYNCID 744, the bottom unit barrier state 752, the bitmap group 753, the bottom unit target ID 754, the bottom unit target mask 755, the middle unit non-arrival counter 762, the middle unit expectation counter 763, the middle unit target ID 764, the middle unit target mask 765, the middle unit destination hierarchy 766, the top unit non-arrival counter 772 and the top unit expectation counter 773 illustrated in FIG. 13.

In an initial state, the shared unit barrier state 742-$q$ is "0".
Each BANKID 743-$q$ is set to 0x$q$. The BANKID 743-$q$ (=0x$p$) possessed by the barrier synchronization mechanism 731-$q$ is also referred to as a local ID.
Additionally, the SYNCID 744-$q$ is not set.
The bottom unit barrier state 752-$q$ is "0".
Each of the bitmaps of the bitmap group 753-$q$ is "0".
The bottom unit target ID 754-$q$ is BANKID 743-$q$ & 0xf0, and the bottom unit target mask 755-$q$ is 0x00.
The middle unit non-arrival counter 762-$q$ is 16.
The middle unit expectation counter 763-$q$ is 16.
The middle unit target ID 764-$q$ is 0x04.
The middle unit target mask 765-$q$ is 0x38.
The middle unit destination hierarchy 766-$q$ is "1".
The top unit non-arrival counter 672-$q$ is "1".
The top unit expectation counter 673-$q$ is "1".

FIG. 19C illustrates a configuration of a barrier synchronization mechanism. 731-$r$ ($r$=04, 0c, 14, 1c, 24, 2c, 34, 3c).

The barrier synchronization mechanism 731-$r$ includes a shared unit 741-$r$, a bottom unit 751-$r$, a middle unit 761-$r$ and a top unit 771-$r$.

The shared unit 741-$r$ includes a shared unit barrier state 742-$r$, a BANKID 743-$r$ and a SYNCID 744-$r$.

The bottom unit 751-$r$ includes a bottom unit barrier state 752-$r$, a bitmap group 753-$r$, a bottom unit target ID 754-$r$ and a bottom unit target mask 755-$r$.

The middle unit 761-$r$ includes a middle unit non-arrival counter 762-$r$, a middle unit expectation counter 763-$r$, a middle unit target ID 764-$r$, a middle unit target mask 765-$r$ and a middle unit destination hierarchy 766-$r$.

The top unit 771-$r$ includes a top unit non-arrival counter 772-$r$ and a top unit expectation counter 773-$r$.

The shared unit barrier state 742-$r$, the BANKID 743-$r$, the SYNCID 744-$r$, the bottom unit barrier state 752-$r$, the bitmap group 753-$r$, the bottom unit target ID 754-$r$, the bottom unit target mask 755-$r$, the middle unit non-arrival counter 762-$r$, the middle unit expectation counter 763-$r$, the middle unit target ID 764-$r$, the middle unit target mask 765-$r$, the middle unit destination hierarchy 766-$r$, the top unit non-arrival counter 772-$r$ and the top unit expectation counter 773-$r$ respectively correspond to the shared unit barrier state 742, the BANKID 743, the SYNCID 744, the bottom unit barrier state 752, the bitmap group 753, the bottom unit target ID 754, the bottom unit target mask 755, the middle unit non-arrival counter 762, the middle unit expectation counter 763, the middle unit target ID 764, the middle unit target mask 765, the middle unit destination hierarchy 766, the top unit non-arrival counter 772 and the top unit expectation counter 773 illustrated in FIG. 13.

In an initial state, the shared unit barrier state 742-$r$ is "0".
Each BANKID 743-$r$ is set to 0x$r$. The BANKID 743-$r$ (=0x$r$) possessed by the barrier synchronization mechanism 731-$r$ is referred to also as a local ID.
Additionally, the SYNCID 744-$r$ is not set.
The bottom unit barrier state 752-$r$ is "0".
Each of the bitmaps of the bitmap group 753-$r$ is "0".
The bottom unit target ID 754-$r$ is BANKID 743-$r$ & 0xf0, and the bottom unit target mask 755-$r$ is 0x00.
The middle unit non-arrival counter 762-$r$ is 4.
The middle unit expectation counter 763-$r$ is 4.
The middle unit target ID 764-$r$ is 0x$r$. Namely, the value of the middle unit target ID 764$r$ is equal to the BANKID 743-$r$.
The middle unit target mask 765-$r$ is 0x07.
The middle unit destination hierarchy 766-$r$ is "0".
The top unit non-arrival counter 672-$r$ is "1".
The top unit expectation counter 673-$r$ is "1".

Firstly, in the initial state of FIG. 14, hardware threads of each barrier bank start a process.

Figure 15A:
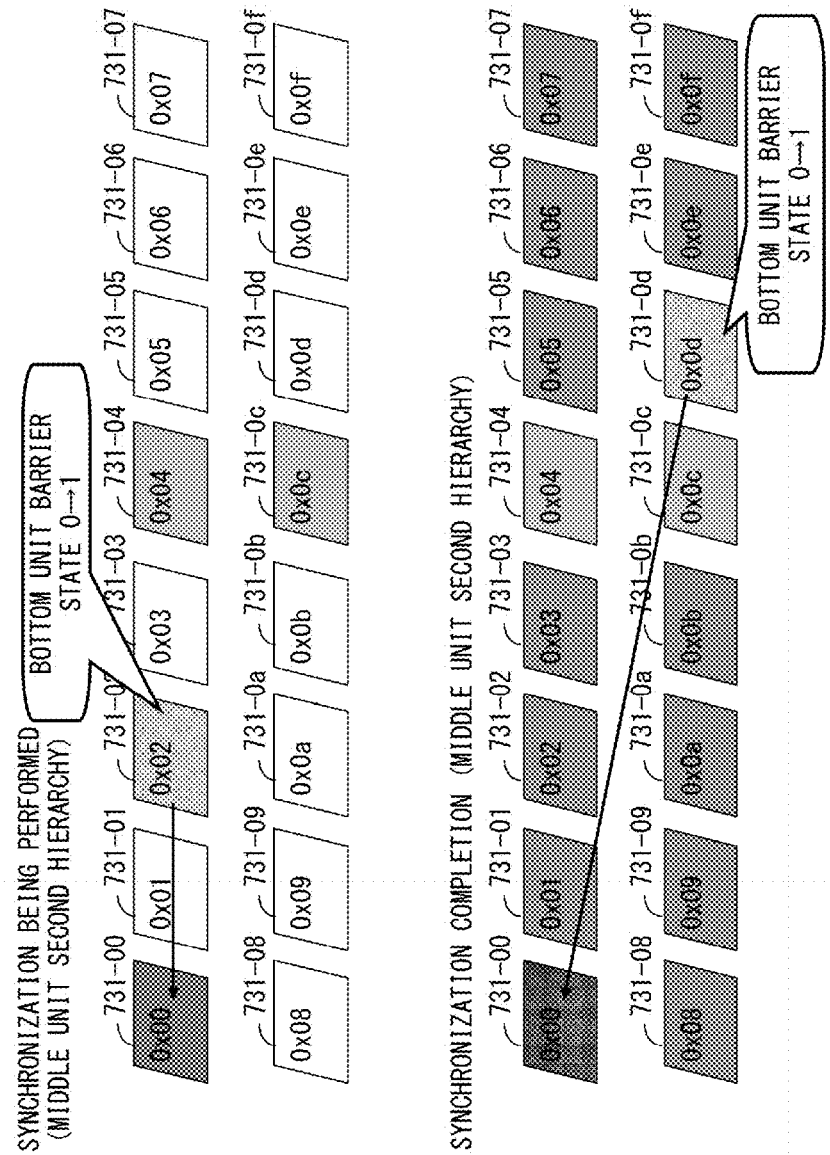
FIGS. 15A and 15B illustrate the synchronization among barrier banks according to the third embodiment.
Figure 15B:
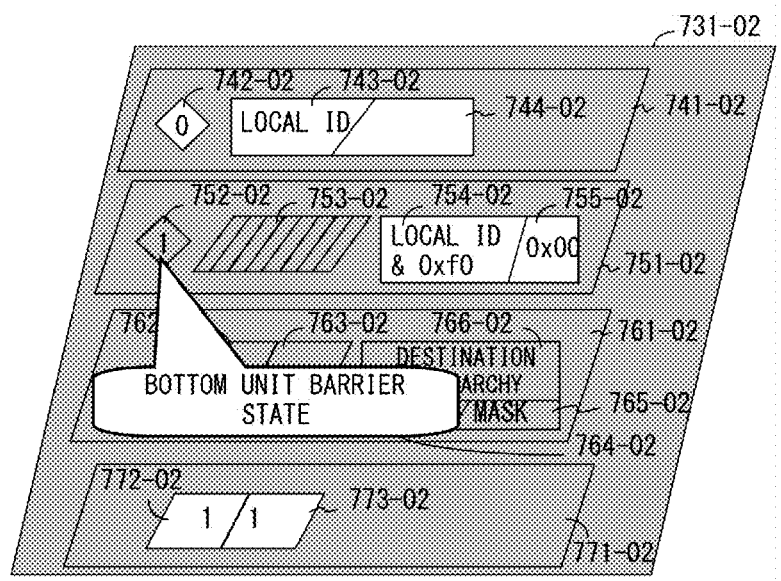

Assume that all the bitmaps of the bitmap group 753-02 of the barrier synchronization mechanism 731-02 have been changed to "1" and the bottom unit barrier state 752-02 have been changed from "0" to "1" as illustrated in an upper portion of FIGS. 15A and 15B.

The bottom unit 751-02 notifies the barrier synchronization mechanism 731-00 of bottom unit barrier synchronization completion.

The middle unit non-arrival counter 762-00 that has received the bottom unit barrier synchronization completion decrements its value by 1.

Assume that all the bitmaps of the bitmap groups 753-00 to 753-01, 753-03 to 753-0$c$, 753-0$e$ to 753-0$f$ the barrier synchronization mechanisms 731-00 to 731-01, 731-03 to 731-0$c$, 731-0$e$ to 731-0$f$ have been changed to "1", and the bottom unit barrier states 752-00 to 752-01, 752-03 to 752-0c and 752-0e to 752-0f have been changed from "0" to "1" in a similar manner.

The bottom units 751-00 to 751-01, 751-03 to 751-0c and 751-0 to 751-0f notify the barrier synchronization mechanism 731-00 of bottom unit barrier synchronization completion.

The middle unit non-arrival counter 762-00 decrements its value by 1 for each reception of the bottom unit barrier synchronization completion.

Assume that all the bitmaps of the bitmap group 753-0d of the barrier synchronization mechanism 731-0d have been changed to "1" and the bottom unit barrier state 752-0d have been changed from "0" to "1" as illustrated in a lower portion of FIGS. 15A and 15B.

The bottom unit 751-0d notifies the barrier synchronization mechanism 731-00 of the bottom unit barrier synchronization completion.

The middle unit non-arrival counter 762-00 that has received the bottom unit barrier synchronization completion decrements its value by 1. As a result, the value of the middle unit non-arrival counter 762-00 decrements to "0".

In FIGS. 16A and 16B, the middle unit 761-00 of the barrier synchronization mechanism 731-00 detects that the middle unit non-arrival counter 762-00 decrements to "0", and broadcasts middle unit synchronization completion to the barrier synchronization mechanism 731-r. Note that the middle unit 761-00 adds a destination hierarchy 766-00 (TO_MIDDLE=1) to the middle unit synchronization completion.

Additionally, the middle unit non-arrival counter 762-00 resets the middle unit non-arrival counter 762-00 to the value (16) of the middle unit expectation counter 763-00.

The middle unit 761-r that has received the middle unit synchronization completion to which TO_MIDDLE=1 is added decrements the middle unit non-arrival counter 762-r by 1.

Assume that all bitmaps of the bitmap groups 753-10 to 753-3f of the barrier synchronization mechanisms 731-10 to 731-3f have changed to "1" and the bottom unit barrier states 752-10 to 752-3f have been changed from "0" to "1" in a similar manner.

The bottom units 751-10 to 751-1f notify the barrier synchronization mechanism 731-10 of bottom unit barrier synchronization completion.

The bottom units 751-20 to 751-2f notify the barrier synchronization mechanism 731-20 of bottom unit barrier synchronization completion.

The bottom units 751-30 to 751-3f notify the barrier synchronization mechanism 731-30 of bottom unit barrier synchronization completion.

The middle unit non-arrival counters 762-10, 762-20 and 762-30 respectively decrement their value by 1 for each reception of the bottom unit barrier synchronization completion.

The middle units 761-10 and 761-20 of the barrier synchronization mechanisms 731-10 and 731-20 respectively detect that the middle unit non-arrival counters 762-10 and 762-20 decrement to "0", and broadcast the middle unit synchronization completion to the barrier synchronization mechanism 731-r. The middle units 761-10 and 761-20 respectively add destination hierarchies 766-10 and 766-20 (TO_MIDDLE=1) to the middle unit synchronization completion.

Additionally, the middle unit non-arrival counters 762-10 and 762-20 respectively reset the middle unit non-arrival counters 762-10 and 762-20 to the value (16) of the middle unit expectation counter 763-10 and 763-20.

The middle unit 761-r decrements the middle unit non-arrival counter 762-r by 1 for each reception of the middle unit synchronization completion to which TO_MIDDLE=1 is added.

The middle unit 761-30 of the barrier synchronization mechanism 731-30 detects that the middle unit non-arrival counter 762-30 decrements to "0", and broadcasts middle unit synchronization completion to the barrier synchronization mechanism. 731-r in FIGS. 17A and 17B. Note that the middle unit 761-30 adds a destination hierarchy 766-30 (TO_MIDDLE=1) to the middle unit synchronization completion.

Additionally, the middle unit non-arrival counter 762-30 resets the middle unit non-arrival counter 762-30 to the value (16) of the middle unit expectation counter 763-30.

The middle unit 761-r that has received the middle unit synchronization completion to which TO_MIDDLE=1 is added decrements the middle unit non-arrival counter 762-r by 1. As a result, the middle unit non-arrival counter 762-r decrements to "0".

In FIGS. 18A and 18B, the middle unit 761-r of the barrier synchronization mechanism 731-r detects that the middle unit non-arrival counter 762-r decrements to "0", and broadcasts middle unit synchronization completion to the barrier synchronization mechanism 731-r specified using the middle unit target ID 764-r and the middle unit target mask 765-r. Note that the middle unit 761-r adds a destination hierarchy 766-r (TO_MIDDLE=0) to the middle unit synchronization completion.

More specifically, the middle unit 761-04 broadcasts the middle unit synchronization completion to the barrier synchronization mechanisms 731-00 to 731-07.

The middle unit 761-0c broadcasts the middle unit synchronization completion to the barrier synchronization mechanisms 731-08 to 731-0f.

The middle unit 761-14 broadcasts middle unit synchronization completion to the barrier synchronization mechanisms 731-10 to 731-17.

The middle unit 761-1c broadcasts middle unit synchronization completion to the barrier synchronization mechanisms 731-18 to 731-1f.

The middle unit 761-24 broadcasts middle unit synchronization completion to the barrier synchronization mechanisms 731-20 to 731-27.

The middle unit 761-2c broadcasts middle unit synchronization completion to the barrier synchronization mechanisms 731-28 to 731-2f.

The middle unit 761-34 broadcasts middle unit synchronization completion to the barrier synchronization mechanisms 731-30 to 731-37.

The middle unit 761-3c broadcasts middle unit synchronization completion to the barrier synchronization mechanisms 731-38 to 731-3f.

The middle unit non-arrival counter 762-r resets the middle unit non-arrival counter 762-r to the value (4) of the middle unit expectation counter 763-r.

The top unit 771-s that has received the middle unit synchronization completion to which TO_MIDDLE=0 is added decrements the top unit non-arrival counter 772-s by 1. As a result, the top unit non-arrival counter 772-s decrements to "0".

The top unit 771-s inverts the value of the shared unit barrier state 742-s upon detecting that the top unit non-arrival counter 772-s decrements to "0". As a result, the value of the shared unit barrier state 742-s changes from "0" to "1".

Each of the hardware threads checks the shared unit barrier state 742-s of the barrier synchronization mechanism 731-s, including a bitmap written when the hardware thread arrives at a barrier synchronization point, verifies that the value of the shared unit barrier state 742-s becomes equal to that written to the bitmap, determines that the barrier synchronization is complete, and resumes the process up to the next barrier synchronization point.

With the barrier synchronization mechanism according to the third embodiment, synchronization among barrier banks can be implemented with a simple configuration.

As described above, in the barrier synchronization of two hierarchies in the first embodiment, n^2 communications occur if n=the total number of barrier banks is assumed, and the number of communications of the barrier synchronization of 3 hierarchies in the second embodiment is n*(m2+1) if m2=the number of barrier bank groups of the second hierarchy is assumed.

The number of communications in synchronization among barrier banks of 4 hierarchies in the third embodiment is 2n+m2*m3 if m3=the number of barrier bank groups of the third hierarchy is assumed, whereby the number of communications is further reduced.

With the barrier synchronization according to the third embodiment, the number of communications can be further reduced by performing synchronization among barrier banks of 4 hierarchies, whereby a network can be prevented from getting congested.

Fourth Embodiment

Figure 20:
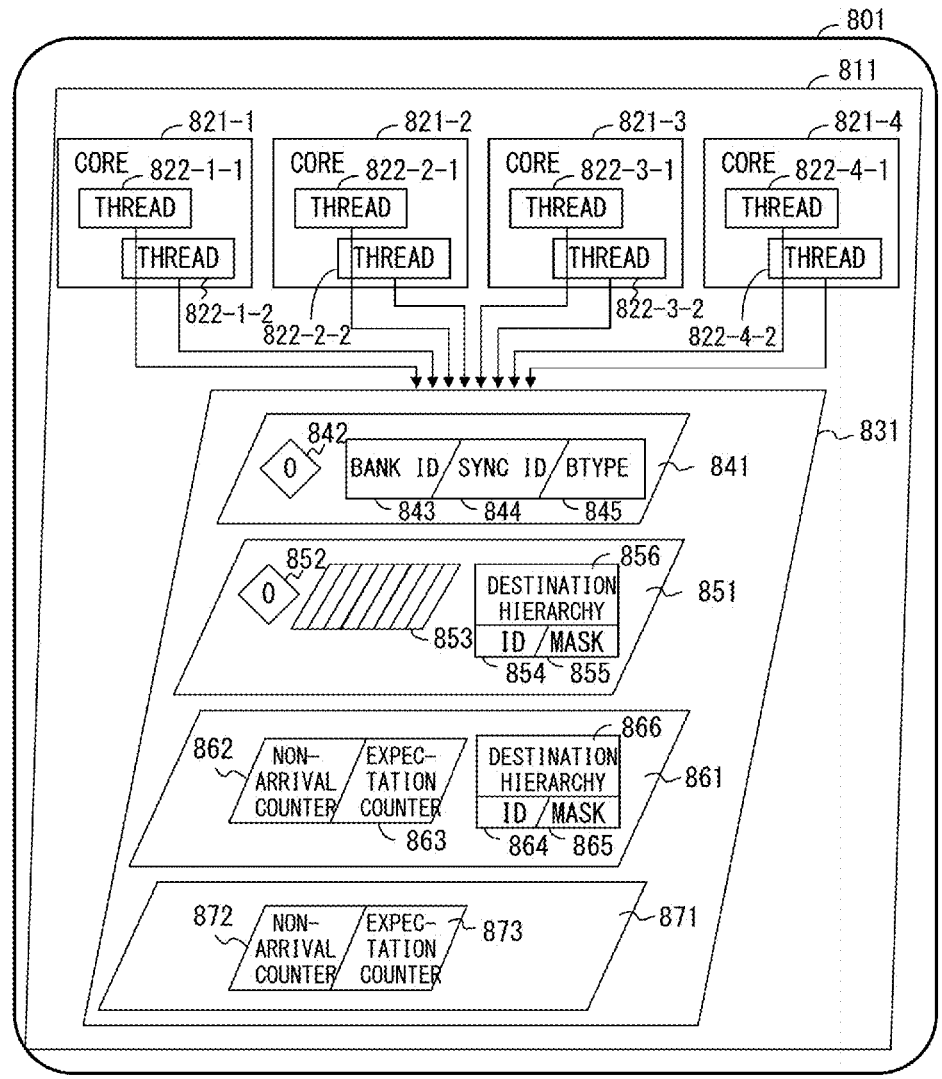
FIG. 20 illustrates a configuration of a CPU according to a fourth embodiment.

FIG. 20 illustrates a configuration of a CPU according to a fourth embodiment.

The CPU 801 corresponds to the CPU 401 of FIG. 2.

The CPU 801 includes processor cores 821-a (a=1 to 4) and a barrier synchronization mechanism 831. Moreover, the processor cores 821-a and the barrier synchronization mechanism 831 are included in a barrier bank 811, which is a minimum unit of barrier bank synchronization. The processor cores 821-a and the barrier synchronization mechanism 831 are interconnected by a bus.

Each of the processor cores 821-a has a simultaneous multi-threading function, and includes hardware threads 822-a-b (b=1, 2) for executing a thread.

Since the hardware threads 822 have a function similar to that of the hardware threads 622 of FIG. 5, their explanations are omitted.

The barrier synchronization mechanism 831 controls the barrier synchronization, and is implemented, for example, with a hardware circuit and a processor.

The barrier synchronization mechanism 831 includes a shared unit 841, a bottom unit 851, a middle unit 861 and a top unit 871.

The shared unit 841 includes a shared unit barrier state 842, a BANKID 843, a SYNCID 844 and a barrier type (BTYPE) 845.

Since the shared unit barrier state 842, the BANKID 843 and the SYNCID 844 have a function similar to that of the shared unit barrier state 642, the BANKID 643 and the SYNCID 644 illustrated in FIG. 5, their explanations are omitted.

The barrier type 845 indicates a type of barrier synchronization performed by the barrier synchronization mechanism 831. The barrier synchronization mechanism 831 executes a barrier synchronization process according to the barrier type 845. Namely, the bottom unit 851, the middle unit 861 and the top unit 871 execute a process according to the barrier type 845. The barrier type 845 is, for example, "intra-bank", indicating that synchronization within a barrier bank is performed, or "inter-bank", indicating that synchronization among barrier banks is performed.

The bottom unit 851 includes a bottom unit barrier state 852, a bitmap group 853, a bottom unit target ID 854, a bottom unit target mask 855, and a bottom unit destination hierarchy 866.

Since the bottom unit barrier state 852, the bitmap group 853, the bottom unit target ID 854 and the bottom unit target mask 855 respectively have a function similar to that of the bottom unit barrier state 652, the bitmap group 653, the bottom unit target ID 654 and the bottom unit target mask 655 illustrated in FIG. 5, their explanations are omitted.

The bottom unit destination hierarchy 866 indicates a processing unit (middle unit or top unit) for processing received bottom unit barrier synchronization completion. The bottom unit destination hierarchy 866 is "1" or "0". "1" indicates that the middle unit 861 that has received the bottom unit synchronization completion executes a process for the reception of the bottom unit synchronization completion. "0" indicates that the top unit 871 that has received the bottom unit synchronization completion executes a process for the reception of the bottom unit synchronization completion.

The bottom unit 851 inverts the value of the bottom unit barrier state 852 if values of all bitmaps of the bitmap group 853 become equal and different from the bottom unit barrier state 852. Namely, the bottom unit barrier state 852 becomes equal to the values of the bitmaps of the bitmap group 653.

Moreover, the bottom unit 851 executes the following process (1) or (2) according to the barrier type 845.

(1) Case where the Barrier Type 845 is "Intra-Bank"

The bottom unit 851 inverts the value of the shared unit barrier state 842. Namely, the value of the shared unit barrier state 842 and that of the bottom unit barrier state 852 become equal.

(2) Case where the Barrier Type 845 is "Inter-Bank"

The bottom unit 851 broadcasts bottom unit barrier synchronization completion to barrier synchronization mechanisms specified using the bottom unit target ID 854 and the bottom unit target mask 855. If a SYNCID 844 is set, the bottom unit 851 adds the SYNCID 844 to the bottom unit barrier synchronization completion, and broadcasts the bottom unit barrier synchronization completion. Moreover, the bottom unit 851 adds a value of the bottom unit destination hierarchy 856 to the bottom unit barrier synchronization completion. For example, if the bottom unit destination hierarchy 856 is "1", the bottom unit 851 adds TO_MIDDLE=1 to the bottom unit barrier synchronization completion. Alternatively, if the bottom unit destination hierarchy 856 is "0", the bottom unit 851 adds TO_MIDDLE=0 to the bottom unit barrier synchronization completion.

The middle unit 861 includes a middle unit non-arrival counter 862, a middle unit expectation counter 863, a middle unit target ID 864, a middle unit target mask 865, and a middle unit destination hierarchy 866.

The middle unit non-arrival counter 862 counts the number of barrier synchronization mechanisms that have not transmitted the bottom unit barrier synchronization completion among barrier synchronization mechanisms for which the barrier synchronization is checked by the middle unit 861, and holds the counted value. The middle unit non-arrival counter 862 decrements its value by 1 upon receipt of the bottom unit barrier synchronization completion to which TO_MIDDLE=1 is added. Moreover, the middle unit non-arrival counter 862 decrements its value by 1 upon receipt of the middle unit barrier synchronization completion to which TO_MIDDLE=1 is added.

Additionally, the middle unit non-arrival counter 862 decrements its value by 1 if an added SYNCID matches the SYNCID 844 when the SYNCID is added to the middle unit barrier synchronization completion to which TO_MIDDLE=1 is added or the bottom unit barrier synchronization completion to which TO_MIDDLE=1 is added. The middle unit non-arrival counter 862 does not decrement its value if the added SYNCID does not match the SYNCID 844 when the SYNCID is added to the middle unit barrier synchronization completion to which TO_MIDDLE=1 is added or the bottom unit barrier synchronization completion to which TO_MIDDLE=1 is added. Namely, the middle unit non-arrival counter 862 executes a process by regarding the bottom unit barrier synchronization completion and the middle unit barrier synchronization completion as a valid or invalid signal depending on whether or not the SYNCID added to the middle unit barrier synchronization completion or the bottom unit barrier synchronization completion matches the SYNCID 844.

The middle unit expectation counter 863 is information indicating the number of barrier synchronization mechanisms for which the barrier synchronization is checked by the middle unit 861 and holds its value.

The middle unit target ID 864 is information indicating a barrier synchronization mechanism to which the middle unit 861 broadcasts barrier synchronization completion.

The middle unit target mask 865 is information for specifying a position of a don't-care bit for the middle unit target ID 864. Namely, the middle unit target mask 865 indicates a position of a bit that can take an arbitrary value in the middle unit target ID 864.

The middle unit destination hierarchy 866 indicates a processing unit (middle unit or top unit) for processing received middle unit barrier synchronization completion. The middle unit destination hierarchy 866 is "1" or "0". "1" indicates that the middle unit 861 that has received the middle unit synchronization completion executes a process for the reception of the middle unit synchronization completion. "0" indicates that the top unit 871 that has received the middle unit synchronization completion executes a process for the reception of the middle unit synchronization completion.

The middle unit 861 broadcasts the middle unit barrier synchronization completion to barrier synchronization mechanisms specified using the middle unit target ID 864 and the middle unit target mask 865 if the middle unit non-arrival counter 862 decrements to "0". The middle unit 861 adds the value of the middle unit destination hierarchy 866 to the middle unit barrier synchronization completion. For example, if the middle unit destination hierarchy 866 is "1", the middle unit 761 adds TO_MIDDLE=1 to the middle unit barrier synchronization completion. Alternatively, if the middle unit destination hierarchy 866 is "0", the middle unit 761 adds TO_MIDDLE=0 to the middle unit barrier synchronization completion. Moreover, the middle unit 861 further adds a SYNCID 844 to middle unit barrier synchronization completion if the SYNCID 844 is set.

Additionally, the middle unit 861 resets the value of the middle unit non-arrival counter 862 to that of the middle unit expectation counter 863 if the middle unit non-arrival counter 862 decrements to "0".

The middle unit 861 does not run even when barrier synchronization completion is received since the middle unit 861 is invalid if the barrier type 845 is "intra-bank". Further, the middle unit 861 does not run even when barrier synchronization completion is received since the middle unit 861 is invalid if the barrier type 845 is "inter-bank" and the bottom unit destination hierarchy 856 is "0".

The top unit 871 includes a top unit non-arrival counter 872 and a top unit expectation counter 873.

The top unit non-arrival counter 872 counts the number of barrier synchronization mechanisms that have not transmitted middle unit barrier synchronization completion to which TO_MIDDLE=0 is added or bottom unit barrier synchronization completion to which TO_MIDDLE=0 is added among barrier synchronization mechanisms for which the barrier synchronization is checked by the top unit 871, and holds the counted value.

The top unit non-arrival counter 872 decrements its value by 1 upon receipt of the middle unit barrier synchronization completion to which TO_MIDDLE=0 is added or the bottom unit barrier synchronization completion to which TO_MIDDLE=0 is added.

Additionally, the top unit non-arrival counter 872 decrements its value by 1 if an added SYNCID matches the SYNCID 844 when the SYNCID is added to the middle unit barrier synchronization completion to which TO_MIDDLE=0 is added or the bottom unit barrier synchronization completion to which TO_MIDDLE=0 is added. Alternatively, the top unit non-arrival counter 872 does not decrement its value if the added SYNCID does not match the SYNCID 844 when the SYNCID is added to the middle unit barrier synchronization completion to which TO_MIDDLE=0 is added or the bottom unit barrier synchronization completion to which TO_MIDDLE=0 is added. Namely, the top unit non-arrival counter 872 executes a process by regarding the bottom unit barrier synchronization completion and the middle unit barrier synchronization completion as a valid or invalid signal depending on whether or not a SYNCID added to the middle unit barrier synchronization completion or the bottom unit barrier synchronization completion matches the SYNCID 84.

The top unit expectation counter 873 is information indicating the number of barrier synchronization mechanisms for which the barrier synchronization is checked by the top unit 871 and holds its value.

The top unit 871 inverts the value of the shared unit barrier state 842 if the top unit non-arrival counter 872 decrements to "0". Moreover, the top unit 871 resets the value of the top unit non-arrival counter 872 to that of the top unit expectation counter 873 if the top unit non-arrival counter 872 decrements to "0".

The top unit 871 is invalid if the barrier type 845 is "intra-bank", and does not run even upon receipt of barrier synchronization completion.

With the barrier bank mechanism according to the fourth embodiment, both conventional synchronization within a barrier bank and synchronization among barrier banks according to the first to the third embodiments can be performed by settings.

Namely, the barrier synchronization mechanism 831 executes a process similar to the barrier synchronization mechanisms 1003, 531, 631 and 731 by setting the barrier type 845, the bottom unit destination hierarchy 856 and the middle unit destination hierarchy 866.

Accordingly, a user makes suitable settings according to a configuration of a server, whereby an optimum barrier synchronization hierarchy and an optimum set of barrier banks can be set.

A plurality of examples of setting the barrier type 845, the bottom unit destination hierarchy 856 and the middle unit destination hierarchy 866 in the barrier synchronization mechanism 831 according to the fourth embodiment, and a plurality of examples of operations of the barrier synchronization mechanism 831 are described next.

FIG. 21A illustrates a first setting example of the barrier synchronization mechanism according to the fourth embodiment.

The first setting example is used to perform synchronization within a barrier bank.

In the first setting example, the barrier type 845 is "intra-bank".

Assume that the BANKID 843 and the SYNCID 844 are set to suitable values according to the barrier synchronization mechanism 831.

Additionally, since the barrier type 845 is "intra-bank", the middle unit 861 and the top unit 871 are invalid.

The bottom unit 851 inverts the value of the bottom unit barrier state 852 if values of all bitmaps of the bitmap group 853 become equal and different from the bottom unit barrier state 852. Namely, the value of the bottom unit barrier state 852 becomes equal to the bitmaps of the bitmap group 653.

Then, the bottom unit 851 inverts the value of the shared unit barrier state 842. Namely, the value of the shared unit barrier state 842 and that of the bottom unit barrier state 852 become equal.

By using the first setting example, barrier synchronization within a barrier bank, which is described in BACKGROUND, can be performed.

Figure 21B:
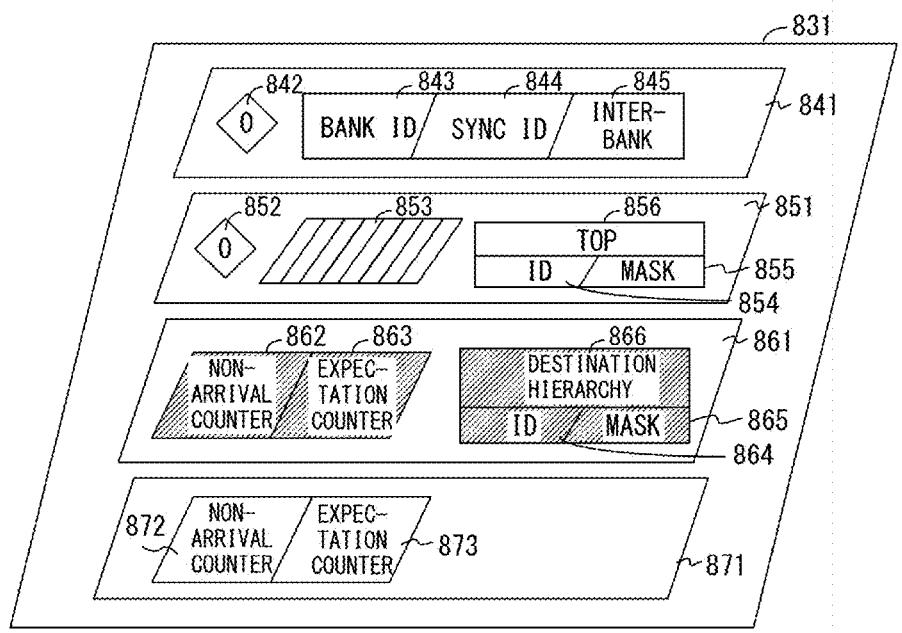
FIG. 21B illustrates a second setting example of the barrier synchronization mechanism according to the fourth embodiment.

FIG. 21B illustrates a second setting example of a barrier synchronization mechanism according to the fourth embodiment.

The second setting example is used to perform synchronization among barrier banks of two hierarchies.

In the second setting example, the barrier type 845 is "inter-bank".

Additionally, the bottom unit destination hierarchy 856 is "0".

Furthermore, assume that the BANKID 843, the SYNCID 844, the bottom unit target ID 854, the bottom unit target mask 855, the top unit non-arrival counter 872, and the top unit expectation counter 873 are set to suitable values according to the barrier synchronization mechanism 831.

Since the barrier type 845 is "inter-bank" and the bottom unit destination hierarchy 856 is "0", the middle unit 861 is invalid.

The bottom unit 851 inverts the value of the bottom unit barrier state 852 if values of all bitmaps of the bitmap group 853 become equal and different from the bottom unit barrier state 852.

The bottom unit 851 broadcasts bottom unit barrier synchronization completion to barrier synchronization mechanisms specified using the bottom unit target ID 854 and the bottom unit target mask 855. The bottom unit 851 adds a SYNCID 844 and TO_MIDDLE=0 to the bottom unit barrier synchronization completion, and broadcasts the bottom unit barrier synchronization completion.

The top unit non-arrival counter 872 receives the bottom unit barrier synchronization completion to which TO_MIDDLE=0 is added. The top unit non-arrival counter 872 decrements its value by 1 if the SYNID added to the bottom unit barrier synchronization completion matches the SYNCID 844. Alternatively, the top unit non-arrival counter 872 does not decrement its value if the SYNCID added to the bottom unit barrier synchronization completion does not match the SYNCID 844.

The top unit 871 inverts the value of the shared unit barrier state 842 if the top unit non-arrival counter 872 decrements to "0". Moreover, the top unit 871 resets the value of the top unit non-arrival counter 872 to that of the top unit expectation counter 873 if the top unit non-arrival counter 872 decrements to "0".

With the second setting example, synchronization among barriers of two hierarchies referred to in the first embodiment can be performed.

Figure 21C:
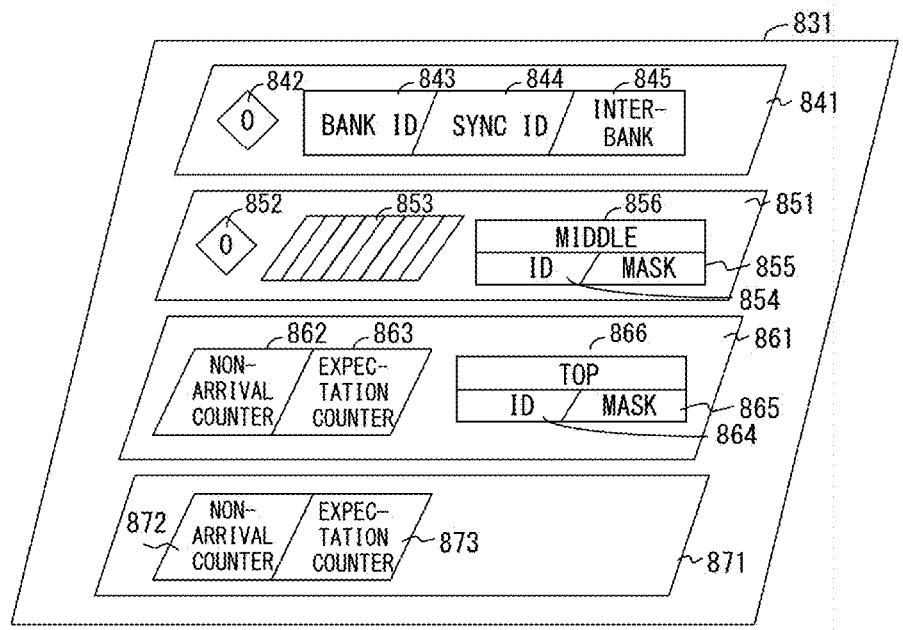
FIG. 21C illustrates a third setting example of the barrier synchronization mechanism according to the fourth embodiment.

FIG. 21C illustrates a third setting example of a barrier synchronization mechanism according to the fourth embodiment.

The third setting example is used to perform synchronization among barrier banks of 3 hierarchies.

In the third setting example, the barrier type 845 is "inter-bank".

The bottom unit destination hierarchy 856 is "1".

The middle unit destination hierarchy 866 is "0".

Assume that the BANKID 843, the SYNCID 844, the bottom unit target ID 854, the bottom unit target mask 855, the middle unit non-arrival counter 862, the middle unit expectation counter 863, the middle unit target ID 864, the middle unit target mask 865, the top unit non-arrival counter 872, and the top unit expectation counter 873 are set to suitable values according to the barrier synchronization mechanism 831.

The bottom unit 851 inverts the value of the bottom unit barrier state 852 if values of all bitmaps of the bitmap group 853 become equal and different from the bottom unit barrier state 852.

The bottom unit 851 broadcasts bottom unit barrier synchronization completion to barrier synchronization mechanisms specified using the bottom unit target ID 854 and the bottom unit target mask 855. The bottom unit 851 adds a SYNCID 844 and TO_MIDDLE=1 to the bottom unit barrier synchronization completion, and broadcasts the bottom unit barrier synchronization completion.

The middle unit non-arrival counter 862 receives the bottom unit barrier synchronization completion to which TO_MIDDLE=1 is added. The middle unit non-arrival counter 862 decrements its value by 1 if the SYNCID added to the bottom unit barrier synchronization completion matches the SYNCID 844. Alternatively, the middle unit non-arrival counter 862 does not decrement its value if the SYNCID added to the bottom unit barrier synchronization completion does not match the SYNCID 844.

The middle unit 861 broadcasts middle unit barrier synchronization completion to barrier synchronization mechanisms specified using the middle unit target ID 864 and the middle unit target mask 865 if the middle unit non-arrival counter 862 decrements to "0". The middle unit 861 adds a SYNCID 844 and TO_MIDDLE=0 to the middle unit barrier synchronization completion. Moreover, the middle unit 861 resets the value of the middle unit non-arrival counter 862 to that of the middle unit expectation counter 863 if the middle unit non-arrival counter 862 decrements to "0".

The top unit non-arrival counter 872 receives the middle unit barrier synchronization completion to which TO_MIDDLE=0 is added. The top unit non-arrival counter 872 decrements its value by 1 if the SYNCID added to the middle unit barrier synchronization completion matches the SYNCID 844. The top unit non-arrival counter 872 does not decrement its value if the SYNCID added to the middle unit barrier synchronization completion does not match the SYNCID 844.

The top unit 871 inverts the value of the shared unit barrier state 842 if the top unit non-arrival counter 872 decrements to "0". Moreover, the top unit 871 resets the value of the top unit non-arrival counter 872 to that of the top unit expectation counter 873 if the top unit non-arrival counter 872 decrements to "0".

With the third setting example, the synchronization among barriers of three hierarchies referred to in the second embodiment can be performed.

Here, a range and the number of communications (a notification of barrier synchronization completion), which occur when various types of barrier synchronizations are performed, in the server according to the embodiment illustrated in FIG. 2 are described.

Figure 22A:
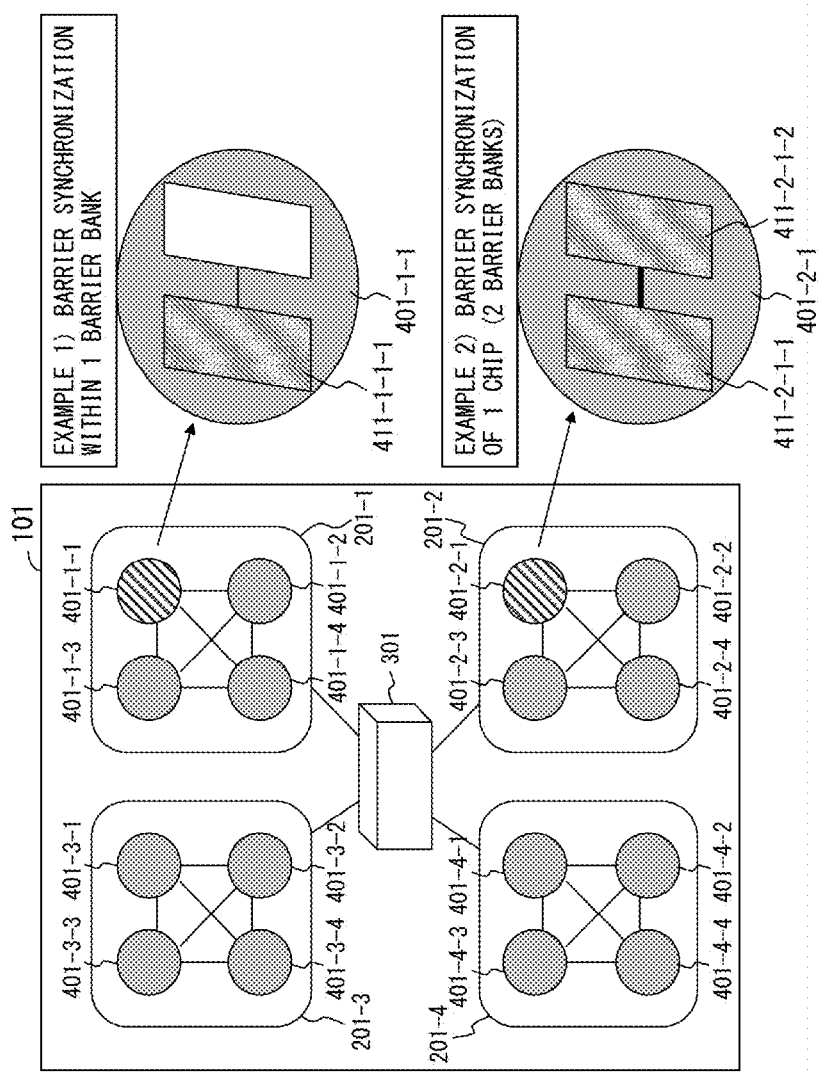
FIG. 22A illustrates barrier synchronization in the server according to the embodiments.
Figure 22B:
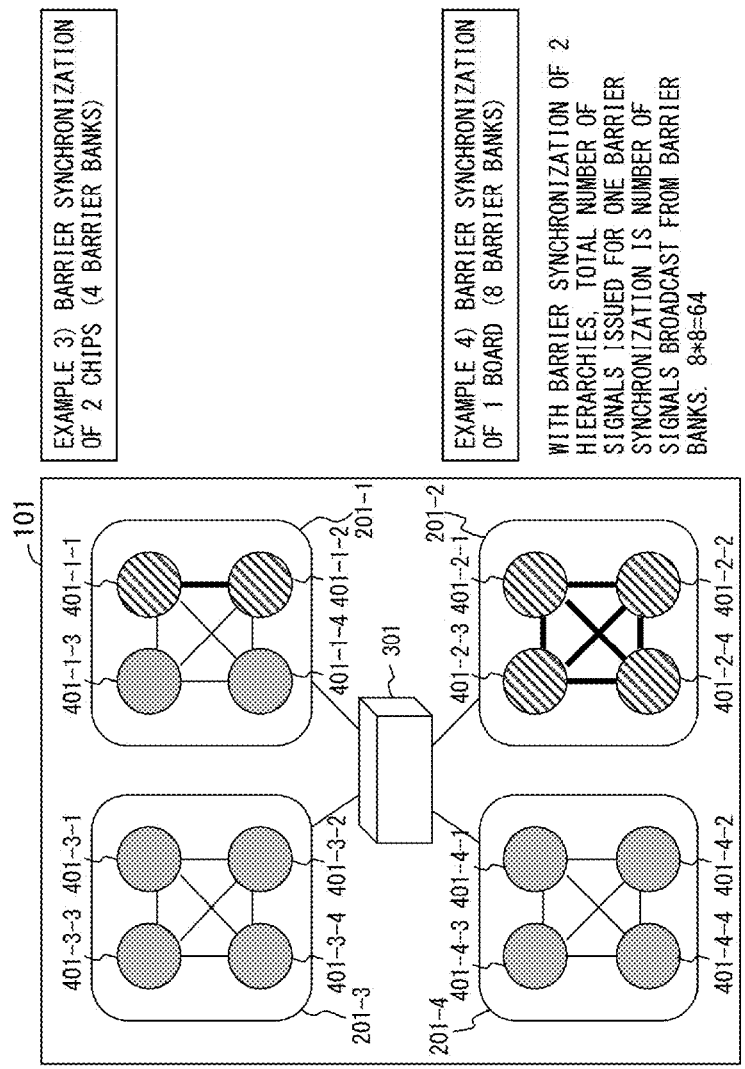
FIG. 22B illustrates barrier synchronization in the server according to the embodiments.
Figure 22C:
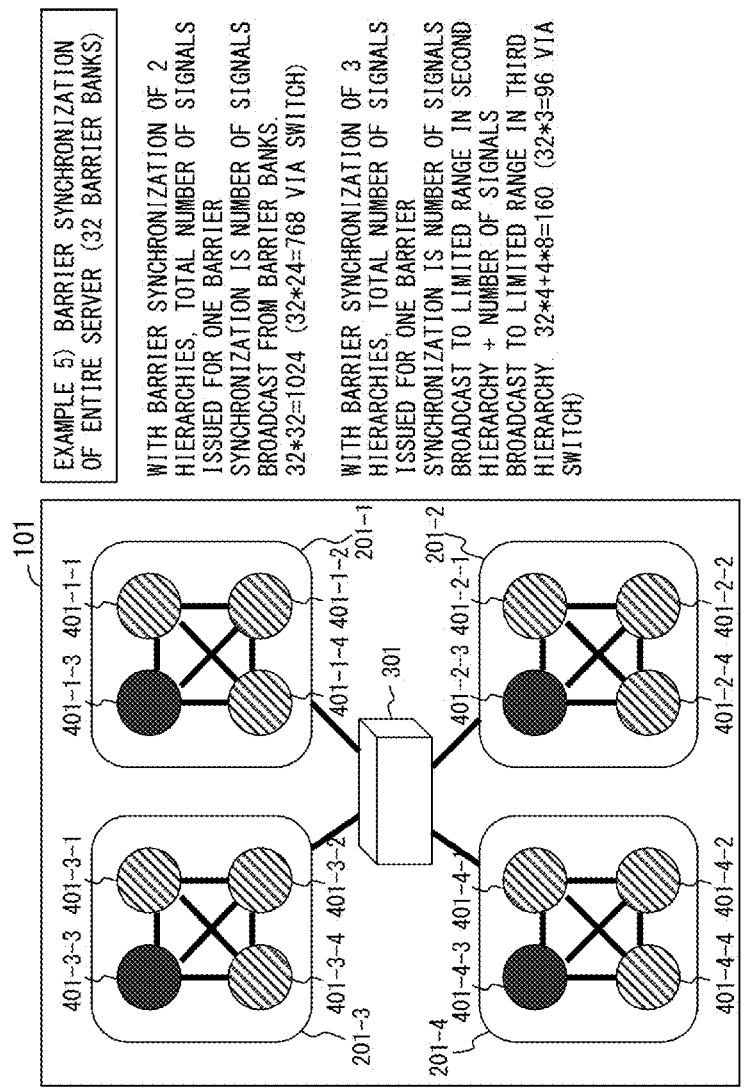
FIG. 22C illustrates barrier synchronization in the server according to the embodiments.

FIGS. 22A to 22C illustrate barrier synchronization in the server according to the embodiment.

In FIGS. 22A to 22C, the CPUs 401-*i*-*j* respectively include two barrier banks.

Note that a CPU is also referred to as a chip.

In FIG. 22A, example 1) barrier synchronization within one barrier bank, and example 2) barrier synchronization of 1 chip (two barrier banks) are described.

Example 1

Barrier Synchronization within One Barrier Bank

In example 1, barrier synchronization is performed within the barrier bank 411-1-1-1. In this case, a communication outside the barrier bank 411-1-1-1 does not occur.

Example 2

Barrier Synchronization of 1 Chip (Two Barrier Banks)

In example 2, synchronization among barrier banks is performed between the barrier banks 411-2-1-1 and 411-2-1-2. In this case, the barrier banks can be synchronized within the CPU 401-2-1.

Accordingly, a communication outside the CPU 401-2-1 does not occur.

In FIG. 22B, example 3) barrier synchronization of chips (4 barrier banks), and example 4) barrier synchronization of 1 board (8 barrier banks) are described.

Example 3

Barrier Synchronization of 2 Chips (4 Barrier Banks)

In example 3, synchronization among barrier banks is performed between two barrier banks within the CPU 401-1-1 and two barrier banks within the CPU 401-1-2. Namely, barrier synchronization among 4 barrier banks is performed.

If barrier synchronization among 4 barrier banks is performed with barrier synchronization of two hierarchies, a communication except the communication between the CPUs 401-1-1 and 401-1-2 does not occur.

Example 4

Barrier Synchronization of 1 Board (8 Barrier Banks)

In example 4, barrier synchronization among 8 barrier banks within the system board 201-2 is performed. Here, the barrier synchronization of two hierarchies is performed.

With the barrier synchronization of two hierarchies, the total number of signals issued for one barrier synchronization is a total of the number of broadcast from the barrier banks.

Accordingly, the total number of signals issued for one barrier synchronization is 8*8=64.

In FIG. 22C, example 5) barrier synchronization (32 barrier banks) of the entire server is described.

Example 5

Barrier Synchronization in the Entire Server (32 Barrier Banks)

In example 5, the barrier synchronization is performed in the entire server 101.

If the barrier synchronization of the entire server 101 is performed with the barrier synchronization of two hierarchies, the total number of signals issued for one barrier synchronization is the number of broadcast from the barrier banks.

Accordingly, the total number of signals issued for one barrier synchronization is 32*32=1024. Moreover, the number of signals transmitted via the switch 301 among issued signals is 32*24=768.

With the barrier synchronization of 3 hierarchies, the total number of signals issued for one barrier synchronization is the number of broadcast to a limited range in the second hierarchy (one barrier bank within each of the CPUs 401-1-3, 401-2-3, 401-3-3 and 401-4-3)+the number of broadcast to a limited range in the third hierarchy (barrier banks within the same system board).

Namely, the 32 barrier banks notify four barrier banks of the second hierarchy of barrier synchronization completion, and the four barrier banks of the second hierarchy notify eight barrier banks within the system board where the local barrier bank is present of the barrier synchronization completion.

Accordingly, the total number of signals issued for one barrier synchronization is 32*4+4*8=160. Moreover, the number of signals transmitted via the switch 301 among issued signals is 32*3=96.

If barrier synchronization is performed among many barrier banks, a hierarchy is added as in the barrier synchronization of 3 hierarchies in the above described example 5, so that the number of barrier synchronization signals issued in the entire system can be reduced. This effectively works in a case where a shared communication path exists such as the above described switch tends to become a performance bottleneck.

Since the barrier synchronization mechanism according to the fourth embodiment can perform a plurality of synchronization methods, an optimum synchronization method can be selected according to a latency and a bandwidth of a communication path.

All examples and conditional language provided herein are intended for pedagogical purposes to aid the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing device, comprising:
a plurality of barrier banks; and
one or more processors including at least one of the plurality of barrier banks, wherein
each of the plurality of barrier banks comprises
one or more hardware threads configured to execute a thread, and
a barrier synchronization mechanism configured to perform barrier synchronization of the plurality of barrier banks,
the barrier synchronization mechanism comprises
a shared unit comprising a barrier state indicating whether or not the synchronization is complete,
a bottom unit comprising a bitmap indicating that each of the one or more hardware threads has arrived at a synchronization point, and
a top unit comprising a non-arrival counter indicating the number of barrier banks yet to be synchronized among the plurality of barrier banks for which barrier synchronization is to be performed,
the bottom unit checks the bitmap, and notifies a barrier bank specified using target information, and mask information which is information for specifying a position of a don't-care bit for the target information of bottom unit synchronization completion when all the one or more hardware threads have arrived at a barrier synchronization point,
the non-arrival counter decrements a value of the non-arrival counter by 1 upon receipt of the bottom unit synchronization completion, and
the top unit sets the barrier state to a value indicating synchronization completion when the non-arrival counter decrements to 0.

2. A barrier synchronization method executed by an information processing device, including a plurality of barrier banks and one or more processors including at least one of the plurality of barrier banks, for performing synchronization of the plurality of barrier banks, each of the plurality of barrier banks including one or more hardware threads configured to execute a thread and a barrier synchronization mechanism configured to perform barrier synchronization of the plurality of barrier banks, the method comprising:
checking a bitmap indicating that each of the one or more hardware threads has arrived at a synchronization point;
notifying a barrier bank specified using target information, and mask information which is information for specifying a position of a don't-care bit for the target information of bottom unit synchronization completion when all the one or more hardware threads have arrived at a barrier synchronization point;
decrementing, by 1, a non-arrival counter indicating the number of barrier banks yet to be synchronized among the plurality of barrier banks for which the barrier synchronization is to be performed upon receipt of the bottom unit synchronization completion; and
setting a barrier state included in a shared unit and indicating whether or not the barrier synchronization of the plurality of barrier banks is complete to a value indicating synchronization completion when the non-arrival counter decrements to 0.

* * * * *